United States Patent [19]
Hardy et al.

[11] Patent Number: 5,287,270
[45] Date of Patent: Feb. 15, 1994

[54] BILLING SYSTEM

[75] Inventors: Robert M. Hardy, Carmel; John M. Cauffman; Lynn S. Cauffman, both of Indianapolis; Robert C. Lovell, Jr., Greenwood; Murray B. Frazier, Indianapolis; Michael L. Johnson, Indianapolis; James W. Dohrenwend, Jr., Indianapolis, all of Ind.

[73] Assignee: Compucom Communications Corp., Indianapolis, Ind.

[21] Appl. No.: 984,374

[22] Filed: Dec. 2, 1992

Related U.S. Application Data
[63] Continuation of Ser. No. 393,699, Aug. 14, 1989.

[51] Int. Cl.$^5$ ............... G06F 15/20; G06G 7/52
[52] U.S. Cl. ...................... 364/408; 364/467; 364/464.01
[58] Field of Search ........... 364/401, 406, 408, 464.01, 364/467, 464.03; 902/24; 395/650; 379/90–109, 111

[56] References Cited

U.S. PATENT DOCUMENTS
| | | | |
|---|---|---|---|
| 4,491,725 | 1/1985 | Pritchard | 235/375 |
| 4,511,793 | 4/1985 | Racanelli | 364/464.03 |
| 4,750,201 | 6/1988 | Hodgson et al. | 379/144 |
| 4,883,948 | 11/1989 | Sunyich | 235/382 |

FOREIGN PATENT DOCUMENTS
2070829 of 0000 United Kingdom.

OTHER PUBLICATIONS
Datapro Research articles, Datapro Research, Delran, N.J., published by McGraw-Hill Inc., Telephone Management Systems & Software, dates vary from Jul. 1987 thru Jun. 1989, TC09-001-101 thru TC09-993-106.
Data Sources® Listing of Telephone Management Software Packages, Data Sources, Cherry Hill, N.J., published by Ziff-Davis Publishing Co., Datacomm/Telecomm/2nd Edition 1989, 0-104 through 0-116.
"Carrier Watch": Pacific Bell, *Networld World*, Oct. 1, 1990, 13.
GTE Automatic Electric World-Wide Communications Journal; D. Mazzola vol. 21, No. 2, 1983, Melrose Park, Ill., pp. 45-50.
Proceedings of the International Switching Symposium; J. C. Martin et al., Part 2, Session 42 A Paper 5, May 7-11, 1984, AEI, Milano, Italy, pp. 1-7.
Proceedings of the National Electronics Conference; J. Mazor, vol. 37, 1983, Oak Brook, Ill. pp. 151-152.
Japan Telecommunication Review; T. Sano, vol. 30, No. 2, Apr. 1988, Tokyo, Japan, pp. 46-50.

*Primary Examiner*—Roy N. Envall, Jr.
*Assistant Examiner*—Laura Brutman
*Attorney, Agent, or Firm*—Jones, Day, Reavis & Pogue

[57] ABSTRACT

Telecommunications or similar bills are prepared on diskette in an optimal format for further processing, display, and analysis on popularly-available, inexpensive personal computers. A telecommunications carrier provides, for participating customers, appropriately selected billing records at the stage in the carrier's ordinary billing process after the carrier has completed all billing activities except actually printing a paper bill. This ensures that the information ultimately supplied on diskette will exactly correspond to that on the paper bill. In a first step, preferably performed on a large computer, the records are sorted, edited and reformatted into an optimal organization for further processing on a personal computer. In addition, a variety of preprocessed summary reports and graphs are prepared for rapid retrieval on the customer's computer. In a second step, preferably performed on a network of smaller computers, the reorganized records and summary reports for each customer are separated, compressed, and recorded on diskettes compatible with each customer's personal computer. A user application program on the customer's computer displays and analyzes the billing information supplied on diskette, including the billing records, preprocessed summary reports and graphs, and prepares new summary reports on demand.

85 Claims, 52 Drawing Sheets
Microfiche Appendix Included
(5 Microfiche, 454 Pages)

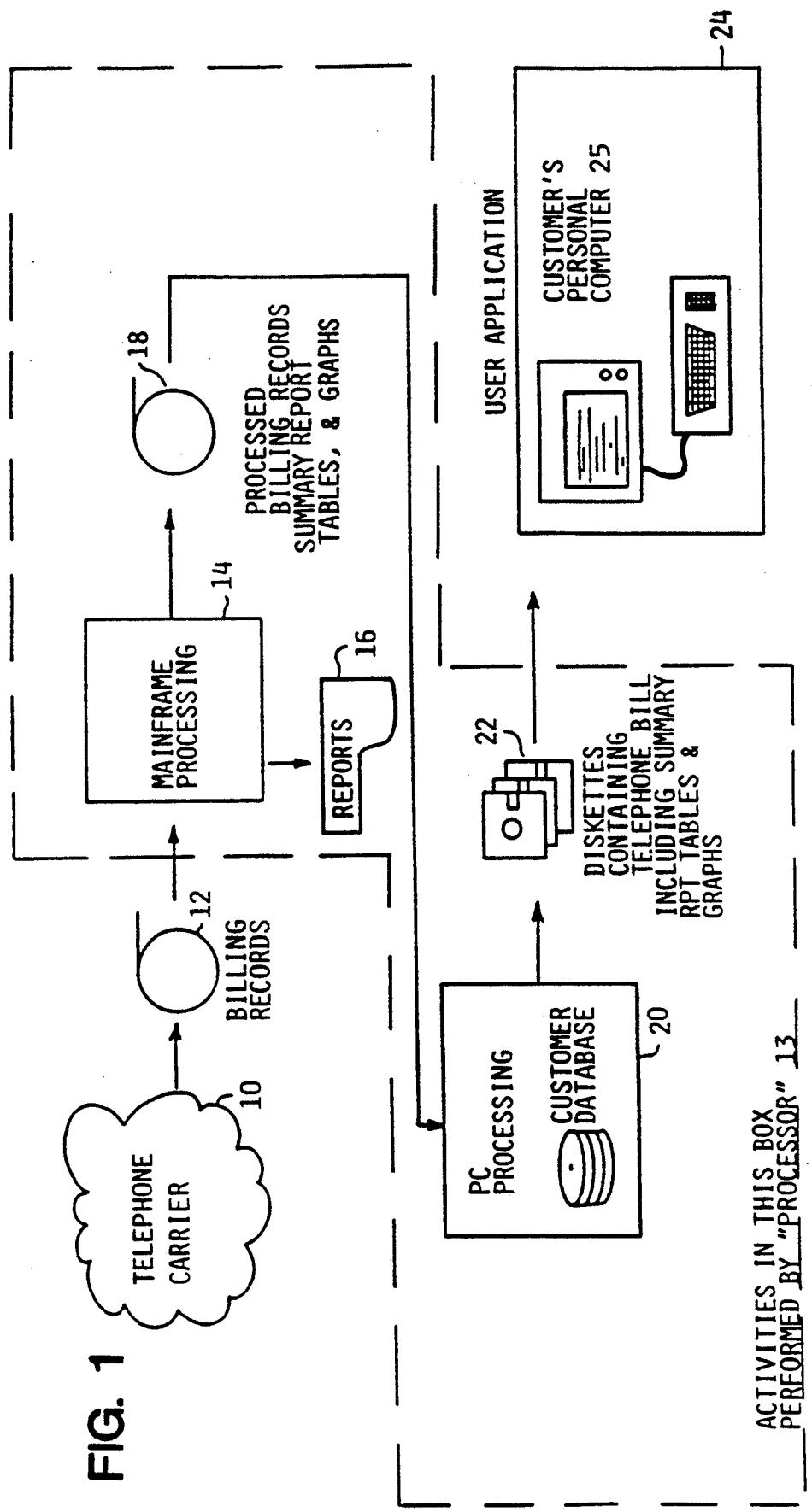

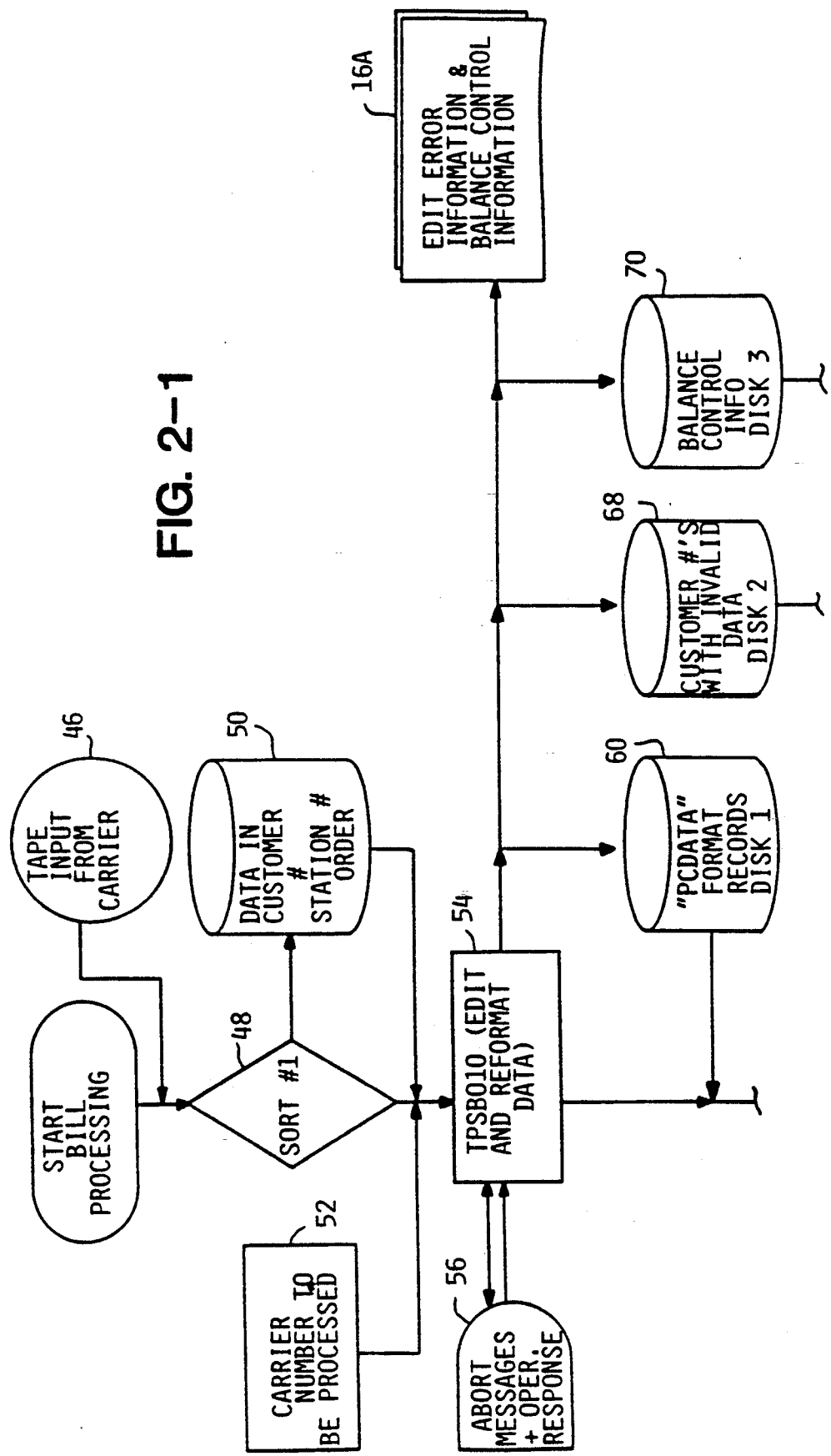

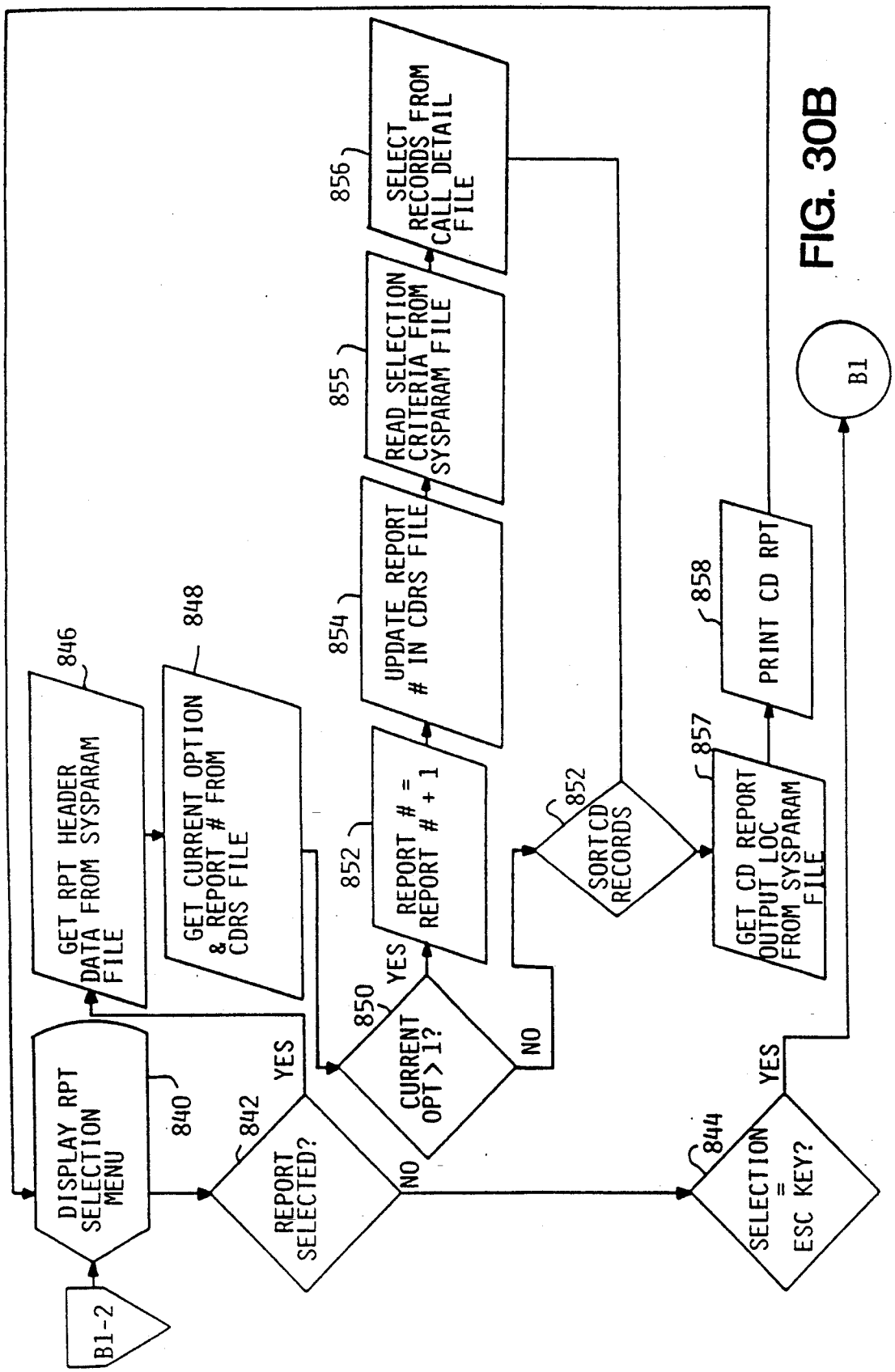

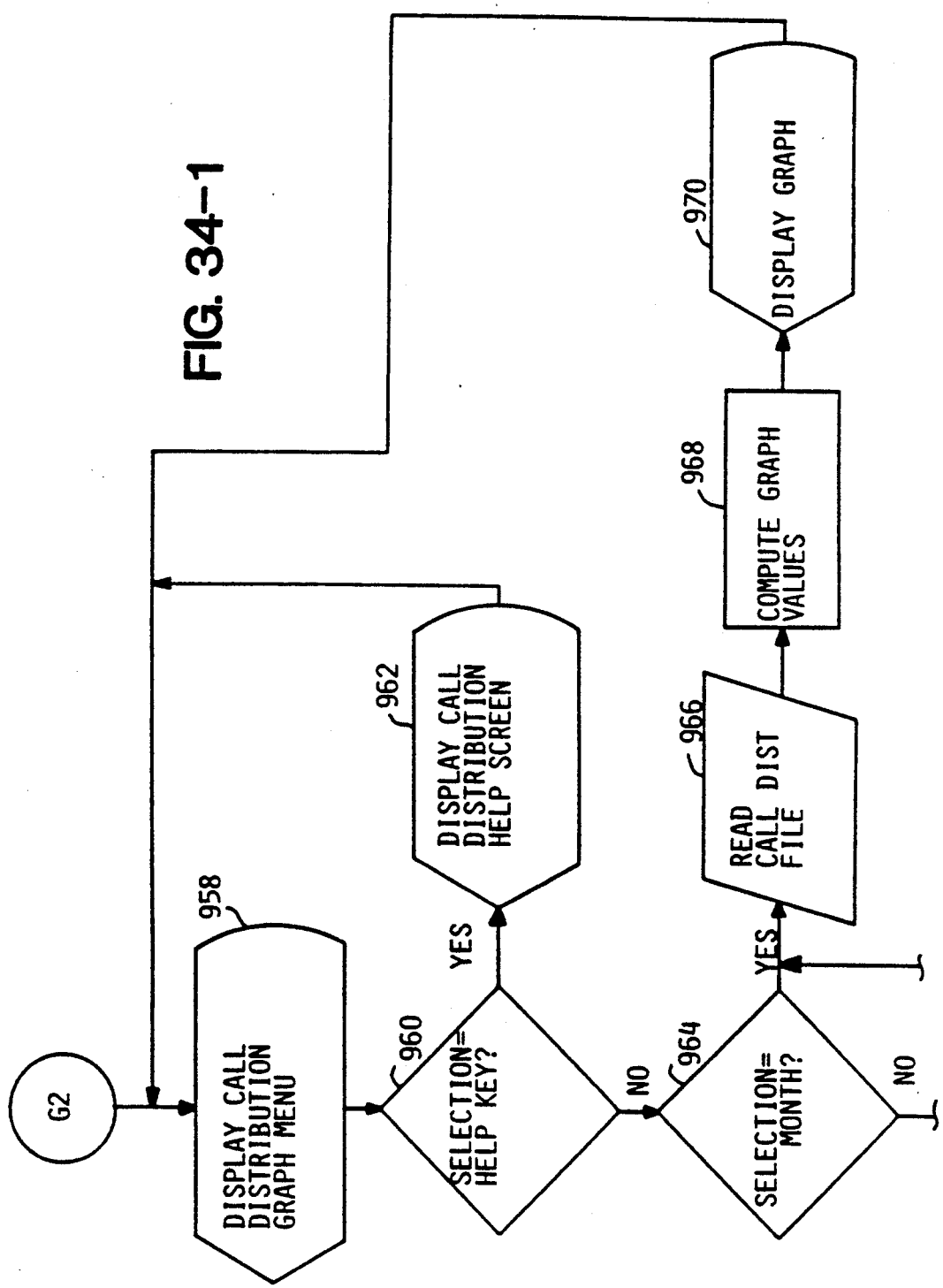

BILLING SYSTEM

This application is a continuation of application Ser. No. 07/393,699 filed Aug. 14, 1989.

REFERENCE TO MICROFICHE APPENDIX

A Microfiche Appendix to this patent application, comprising 5 sheets of microfiche, contains 454 frames of computer program listings illustrating a preferred embodiment of the computer software code contemplated by the invention disclosed herein.

FIELD OF THE INVENTION

This invention relates generally to billing systems, and more particularly to systems for processing and displaying, under the control of a service customer, usage and cost information for services rendered to a customer by a service provider such as a telecommunications company, credit card company, or the like.

The invention relates particularly to systems for processing and displaying, under the control of a telecommunications service customer, usage and cost information for telecommunications services rendered to the customer by a telecommunications service provider, and to systems for providing telecommunications billing information in a form compatible with popularly available personal computers and popularly available personal computer operating systems and database management programs to permit selection, processing and display of usage and cost information under control of the telecommunications customer.

BACKGROUND OF THE INVENTION

Telecommunications costs have become a major expense for many large businesses and other organizations. Today's competitive business climate requires immediate communications between components of an organization and between the organization and its suppliers and customers. This need alone has produced over the last twenty years a dramatic increase in the use of traditional telecommunications services such as ordinary switched telephone service, leased-line telephone service and telex, typically provided by wireline common carriers. In addition, many non-traditional modes of electronic communications, such as facsimile and a variety of computer networking schemes use, as a transmission medium, either traditional or new telecommunications services offered by wireline carriers.

Organizations are under great pressure to reduce telecommunications costs while continuing to make available to their personnel and correspondents telecommunications services of acceptable quality and quantity. In order to minimize costs, attention is increasingly focused on analysis and processing of call-detail records to discover waste, unauthorized use, and savings opportunities which may arise from more efficient selection of carrier facilities.

For example, lengthy calls from a particular station may indicate inappropriate or inefficient use of the telephone by authorized personnel. A large number of calls to a particular geographical region may indicate that leased lines or tie-lines are economically justified. Since many telecommunications services are priced on a distance- and time-of-day-sensitive basis, and since several telecommunications carriers provide differing calling and volume discount plans, customers may avail themselves of additional savings opportunities by appropriately routing traffic over the lowest cost facilities and by contracting for special discounts based on usage information obtained from such analyses. A further requirement for call-detail record processing is to permit large organizations to pass along telecommunications charges to the originating department or other internal unit.

Such analysis and processing is hampered, because even large-volume telecommunications customers typically now receive a paper bill itemizing long-distance calls and other telecommunications charges by originating station. This paper bill is often the exclusive means by which the customer may obtain detailed information concerning telephone calls and other transactions from which charges arise. Further analysis is usually not provided by the carrier.

In order to process and analyze call-detail information on their own, customers have adopted a variety of techniques, but each of these has significant disadvantages. The information on a bill may be analyzed using non-automated methods, but these methods are not feasible for large customers, and even for the smallest customers are extremely expensive and error-prone. Since automated processing is preferred, some customers manually key-punch or machine-scan the paper bill into a computer system. While this approach somewhat reduces the cost of the analysis, the data entry steps remain expensive and error-prone.

Other customers may receive from the carrier a machine-readable tape containing call-detail records, but to the inventors' knowledge these tapes either carry unrated call information (i.e. the records do not include the cost of the call) or lack certain rating details without which it is impossible to exactly reconcile information on the tape with the paper bill. In addition, the type of tape media used, and the manner in which the information is organized on such tapes, require that an expensive mainframe-class computer be used to analyze the data.

Apparatus has also been developed which may be continuously connected to each outgoing station, telephone line or similar facility used by the customer and which records certain details concerning every outgoing transaction or call made over that facility. The records thereby produced may then be processed by a computer to apply an appropriate rating algorithm and arrive at an approximate cost for each transaction. However, since the customer's recording equipment is not identical to the equipment used by the carrier to acquire call-detail records, some discrepancies are virtually sure to occur, and these discrepancies will be propagated to the final results of the analysis. In addition, since the carrier's calling plans and tariffs may change frequently, a great deal of effort is required on the part of the customer to maintain up-to-date and otherwise accurate rating algorithms for processing the records.

Accordingly, the need exists for a system which provides to large-volume telecommunications customers the ability to conveniently and affordably analyze and manipulate call-detail and other telecommunications transaction information by computer, and which provides results which exactly correspond with the information printed on the customer's paper bill.

SUMMARY OF THE INVENTION

This invention contemplates a system combining standard data processing hardware and specially designed software for distributing to large-volume telecommunications or other service customers telephone bills, credit card bills, and the like on diskettes compatible with commonly available small and inexpensive personal computers for customer-directed display and in-depth analysis. In brief, telecommunications or other service customers wishing to receive a diskette telephone or credit card bill subscribe for this service with their carrier or credit card company. A participating telecommunications carrier or credit card company (more generally: a "service provider," or simply "provider") extracts from its data processing facilities appropriately selected billing information for such subscriber. The provider then supplies this information to a "processor", who, according to the invention, segregates the billing data by subscriber, appropriately preprocesses the billing data to produce a variety of in-depth billing analyses in the form of graphs and summary reports, and reorganizes both raw and analyzed billing data into an optimal format for storage, manipulation, and display on commonly-available personal computers. The "processor" writes this information onto one or more diskettes compatible with the subscriber's personal computer, and distributes these diskettes to the subscriber. The subscriber, using an inexpensive personal computer and compatible software according to the invention, can display and analyze the telephone bill with greater efficiency, accuracy and flexibility than possible using the conventional paper bill. By appropriately selecting the billing information obtained from the service provider, the invention provides a telephone, credit card or other bill on diskette which is exactly reconciled with the paper bill.

One aspect of the invention includes an application software package, capable of running on a small computer (such as an IBM Personal Computer or compatible computer), which under the direction of the user can:

1. display the telephone bill (or selected subsets thereof) in its ordinary (paper-like) format;
2. display the bill (or selected subsets thereof) sorted in non-conventional order (e.g. call detail records sorted by length of call);
3. display a variety of preprocessed summary reports and graphs useful in analyzing telecommunications costs; and
4. display non-preprocessed reports according to user-formulated ad-hoc queries.

The information listed above may also be printed or written to a disk file in the user's computer for further processing by other software, such as a commercially available database management program which runs on an IBM-compatible personal computer. Information displayed by the inventive customer software is exactly reconciled with that printed on the customer's paper bill through means described below.

Another aspect of the invention involves the use of appropriate method steps and apparatus and control software for obtaining appropriate billing information from carriers and physically rearranging this information in such a manner that it is optimally pre-processed and reformatted into a form appropriate for efficient and rapid use in subscribers' personal computers, and writing the information in this format on compatible diskettes containing for distribution to subscribers These functions may be performed by a third party processor engaged in the business of providing such services to service providers and their subscribers, or by the provider itself or perhaps even by a large corporate subscriber.

In the specific case of telephone billing, the bulk of the billing information used or supplied by a telecommunications carrier to the third-party processor for the purpose of preparing customer bills would consist of telephone-call-detail records including a carrier-assigned customer identification code, the originating station number, the called station number, a billing code classifying the type of call (e.g., night, evening or day), the length of the call, and the actual billed cost of the call according to the carrier's tariffs, volume discounts, and other billing plans. The carrier provides additional billing records to account for equipment rental charges, monthly service fees, payments, adjustments, taxes, and any other items affecting the amount billed to the customer.

According to the invention, the processor receives a subscriber's billing records from the carrier at a stage in the carrier's ordinary billing process after the carrier has posted to the subscriber's account all charges and credits, has performed all billing-related calculations for that subscriber, and is ready to print a paper bill. By selecting this specific stage of carrier bill processing from which to extract billing information, the invention ensures that the information supplied on diskette will exactly correspond to that on the paper bill.

Extensive processing is required to put the information received from a carrier into an optimal form for use on a personal computer. According to the invention, this processing is divided into two stages.

The first stage reformats data received from the carrier, segregates the records pertaining to each subscriber, analyzes billing data for each subscriber to generate a variety of preprocessed summary reports and graphs, and organizes the data into a table format suitable for loading into the particular database system used to manage this data on the subscriber's personal computer. In practice, since it is expected that the processor will receive a large number of records from carriers and the analysis performed on these records is extensive, this first stage of processing would be preferably performed on a mainframe-class computer, and is accordingly referred to hereafter as "mainframe processing."

The second stage of processing receives the information processed by the first stage, compresses this information into a more space-efficient format, for each subscriber writes this information on a diskette compatible with that subscriber's personal computer, and generates quality-control information useful in managing and tracking the production of diskette bills. These second-stage functions can be performed on a network of PC-class computers and is accordingly referred to hereafter as "PC processing."

Once diskette bills are produced in the "PC Processing" system, the resulting diskettes are mailed to customers who may use PC-compatible software according to the invention (the "user application") to display and analyze their bill. When the user receives the diskettes, the information thereon must be decompressed and loaded into a PC database using facilities provided by a user application program according to the invention. This user application preferably uses commercially available database software, such as "RBASE", a popular database package available for IBM-PC-compatible computers, to manage the billing records received on diskette. Except for a small amount of historical information used for certain graphs and summary reports, the database can contain only one "bill" at any time. When a new bill is received, the previous bill may be archived to a non-database file (flat file) on the user's disk for convenient retrieval. The new bill then replaces the old bill in the user application database.

When writing information into the database, the user application employs commercially available software routines, such as RBASE-specific database interface routines. When reading information from the database, the user application either uses the commercially available interface routines, or a set of proprietary tree traversal routines (disclosed in the Microfiche Appendix) which substantially improve retrieval efficiency when reading sorted data from keyed tables. Thus, while the user application stores information in a database according to the RBASE storage model, the RBASE program per se is not required. However, a customer who happens to own a copy of RBASE could use it to obtain information from the database in ways not provided by the user application.

BRIEF DESCRIPTION OF THE DRAWINGS

These and other features of this invention will be best understood by reference to the following detailed description of a preferred embodiment of the invention, taken in conjunction with the accompanying drawings, in which:

FIG. 1 is a block diagram showing an overview of the data flow in a telephone billing system according to the present invention;

FIGS. 2-1 and 2-2 are a block diagram showing an overview of the data flow in the "Mainframe Processing" segment of the system of FIG. 1;

FIGS. 6-1 and 6-2 are a flow chart of the "initialization" section for the aforesaid first processing program used in the "Mainframe Processing" segment of FIG. 2;

FIGS. 7-1 and 7-2 are a flow chart of the "input data editing" section for the first processing program used in the "Mainframe Processing" segment of FIG. 2;

FIGS. 15-1 and 15-2 are a flow chart of the "write PC transfer tape records" section for the second processing program used in the "Mainframe Processing" segment of FIG. 2;

FIGS. 17-1 and 17-2 are a flow chart of a program used in the "PC Processing" segment of FIG. 3 for reading a mainframe-produced tape;

FIGS. 18-1 and 18-2 are a flow chart of a program used in the "PC Processing" segment of FIG. 3 for loading billing data onto PC-compatible diskettes;

FIGS. 28-1 and 28-2 are a flow chart of the "main menu" section for the aforesaid "User Application" program of FIG. 4;

FIGS. 29-1 and 29-2 are is a flow chart of the "display billing inquiry" section for the "User Application" program of FIG. 4; FIGS. 30A-1, 30A-2, and 30B are flow charts of the "display call detail" subsection of the "display billing inquiry" section for the "User Application" program of FIG. 4;

FIGS. 31A-1, 31A-2 and 31-B are flow charts of the "display call summary" subsection of the "display billing inquiry" section for the "User Application" program of FIG. 4;

FIG. 33-1 and 33-2 are a flow chart of the "graph historical usage" subsection of the "graph data" section for the "User Application" program of FIG. 4;

FIG. 34-1 and 34-2 are a flow chart of the "graph hourly call distribution" subsection of the "graph data" section for the "User Application Program" segment of FIG. 4;

FIGS. 35-1 and 35-2 are a flow chart of the "system utilities" section for the "User Application" program of FIG. 4;

FIGS. 36-1 and 36-2 are a flow chart of the "load new data" subsection of the "system utilities" section for the "User Application Program" segment of FIG. 4.

DETAILED DESCRIPTION OF THE PREFERRED EMBODIMENT

Overall System Summary

Figure 2:
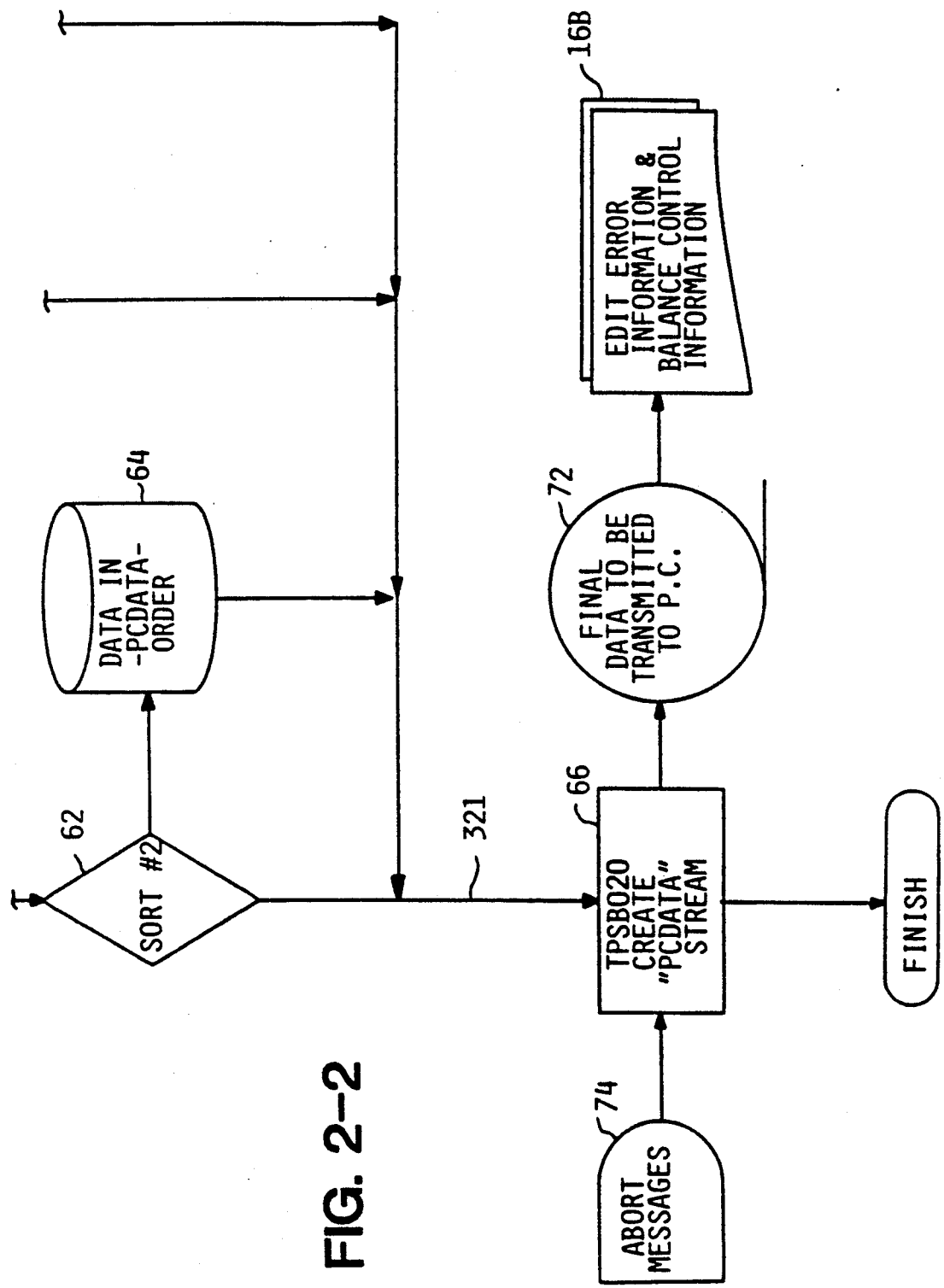

The mainframe processing aspect of the invention involves four major activities: a first sort, an editing and table accumulation program, a second sort, and transfer tape production program. The billing information may be received from one or more telecommunications carriers via magnetic tape, disk, or data communications lines (referred to hereafter for simplicity as "billing tape" or simply "tape"). The information is received in formats roughly corresponding to the logical record layouts according to which that information is stored in each carrier's data processing facilities. Because this information will be obtained from the carrier as unstructured (flat-file) dumps of their accounting databases, records for a particular customer may appear in several files and consequently may be widely distributed along the tape. Therefore, in the first sort, the system first sorts all billing data received on the carrier tape by customer identification code and originating station number to group all records for a specific customer together.

The editing and table accumulation program performs the bulk of the mainframe processing work. This program handles the entire set of records received on the carrier tape in one pass, processing one record at a time. Since these records have been previously sorted by customer identification code and originating station number, each record is edit-checked to ensure that the appropriate type of data is contained in each field. Since the invention contemplates receiving billing information from multiple carriers, a generic internal record format is defined, to which each billing record received from various telecommunications carriers is converted according to a carrier-specific algorithm. For most records in the input stream (and particularly call-detail records), the editing and table accumulation program generates a corresponding output record in the generic format. In addition, this program accumulates data to produce for each customer a variety of precalculated summary reports and graphs which are included on the diskette bill and are thus available for display on the user's personal computer with minimal additional personal computer processing. These include the following:

- number of calls, length, and total call cost for each accounting or project code;
- number of calls, length, and total cost for day, evening and night calls for each carrier;
- number of calls, length, and total cost of calls of each call type;
- number of calls, length, and total cost for day, evening, and night calls to each terminating area code;
- number of calls, length, and total cost for calls of each product type (i.e. carrier's marketing plan);
- number of calls, length, and total cost for day, evening, and night calls from each site or location identifier;
- number of calls, length, and total cost for calls made from each originating station and authorization code;
- graphs showing historical usage by month; and
- graph showing number of calls made by hour of the day.

While these tables could be generated on the subscriber's personal computer by conventional methods using information present in call-detail records without the mainframe preprocessing contemplated by this invention, this would require a time-consuming front-to-back scan of the entire contents of the database. By preprocessing these tables on a computer with greater processing and storage resources, the present invention optimally makes the most commonly-needed reports and graphs immediately available upon the user's request, at the relatively modest expense of additional mainframe processing and additional PC database storage requirements.

In order to pass the preprocessed report information along to the user's personal computer via the diskette bill, the editing and table accumulation program generates new information records in addition to those from the input stream which are merely edited and reformatted. The ultimate target of the carrier-supplied billing information is a database located on the user's personal computer, which database is organized, at the logical level, into a number of tables. To permit subsequent processing steps to identify the information contained in records, each record which is outputted by the editing and table accumulation program has a record-type identifier, specifying the particular database table to which the record belongs.

Two additional activities are performed during the mainframe processing segment to prepare the data for transfer to a "PC Processing" network. After the editing and table accumulation program has completed, a second sorting step sorts the output file by customer identification code and record-type identifier to place the records in an optimal order for creating diskette bills and for loading the information on the diskette into the database on the user's personal computer. At this point, a file exists on the "mainframe" computer in which, for each customer whose billing information appeared on the carrier billing tape, all records are grouped consecutively, and among the records for a particular customer, all records of a specific type are grouped consecutively. A transfer tape production program adds control records expected by the "PC Processing" software at the beginning and end of this file, and surrounding the data for each carrier, customer, and table within the file. The output of the transfer tape production program is then written to a tape which will be transported to the "PC Processing" network.

In order for the customer to display and further analyze this edited and preprocessed information using the customer's personal computer, it must be placed on PC-compatible diskettes. According to the invention, the production of such diskettes is optimally performed using a network of PC-class computers. The diskette production segment is therefore referred to as "PC processing."

The "PC Processing" network reads the tape containing mainframe-processed billing records, and for each customer represented thereon produces one or more diskettes compatible with the customer's personal computer and containing that customer's telephone bill information. The network is preferably implemented using commercially available IBM Token-Ring hardware and Novelle network software. A Tape Controller PC (TCPC) with a disk drive and a 9-track tape drive is used to read the tapes produced by the mainframe. Two File Server PC's (FSPC's) with large disk drives temporarily store billing information read from mainframe tapes until diskette bills have been successfully prepared. Also stored on the FSPC's is a master database used to track tapes and diskette bills which have been prepared by the system. Several Loader Controller PCs (LCPC's), each controlling an automated diskette loader, manage production of diskette bills. The automated diskette loader includes a diskette drive connected to the LCPC and a mechanical arrangement controlled by the LCPC which can insert and remove diskettes without operator assistance.

The "PC Processing" network operates under the control of several programs which manage the production of diskette bills. A transfer tape transcription program reads information from the mainframe-produced transfer tape. For each tape read, an entry identifying the tape is placed in the master database. For each customer found on the tape, the transfer tape transcription program looks up the customer's record in the master database to determine which size and capacity diskette that customer requires. The transfer tape transcription program then determines which of the automated diskette loaders is capable of producing that diskette, and identifies the least busy loader. The transfer tape transcription program obtains the next available disk control number (DCN) (a tracking number uniquely and serially assigned to each set of diskettes produced by the system) from the master database. The transfer tape transcription program then copies all the data for the current customer from the tape onto a file server subdirectory assigned to the identified loader. The transfer tape transcription program makes a number of housekeeping entries in various database tables and begins processing the next customer's data from the mainframe tape.

On each loader controller PC, an automated loader control program manages the actual production of diskette bills. The automated loader control program continually examines the file server subdirectory assigned to the automated diskette loader it controls. When the automated loader control program finds a file in this subdirectory, it copies the file onto a disk in the loader controller PC, applying a data compression algorithm. Data compression reduces the number of diskettes which must be produced for customers with large numbers of call-detail records. In addition, compression enhances security, since without facilities provided by the user application on the customer's personal computer, the information would be difficult to decode. The automated loader control program then copies the compressed data onto one or more diskettes, instructing the automated loader to insert and remove diskettes as required. When the automated loader control program finishes preparing diskettes for a particular customer, it automatically examines its assigned file server subdirectory to determine if files for additional customers are available.

The master database on the "PC processing" network maintains an inventory of tapes received, diskettes produced, and other customer-service related information. A package of inquiry and update programs is available to customer service agents enabling them to maintain and query this database. When new customers subscribe to the service, entries are made in the master database. An export tape production program extracts certain customer information from this database (particularly the customer's carrier-assigned identification number and a separate customer ID assigned by the "processor") to produce an export tape which may be sent to the mainframe computer to update customer databases which may be stored thereon.

Detailed System Description

Figures 1, 6:
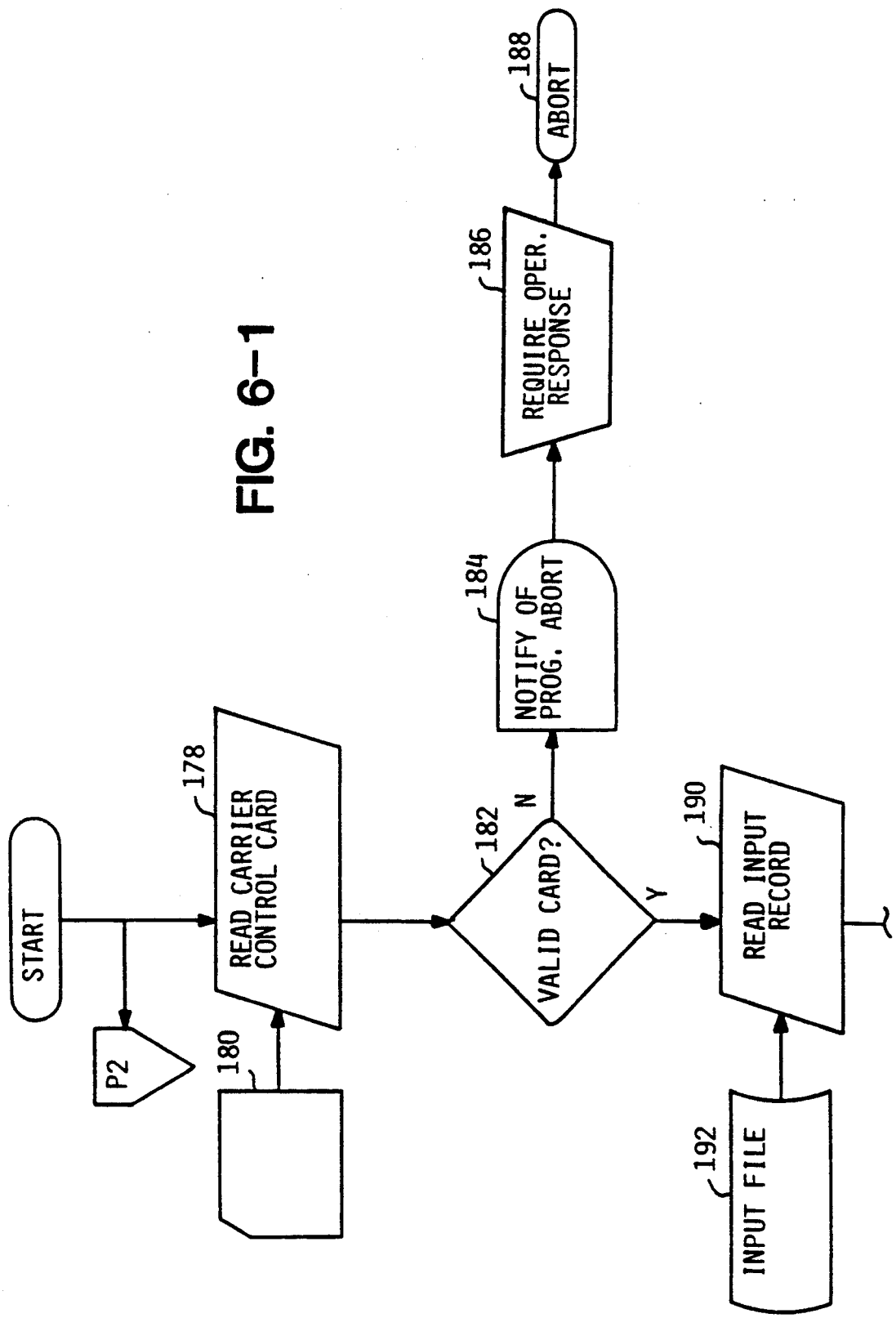
Figures 2, 6:
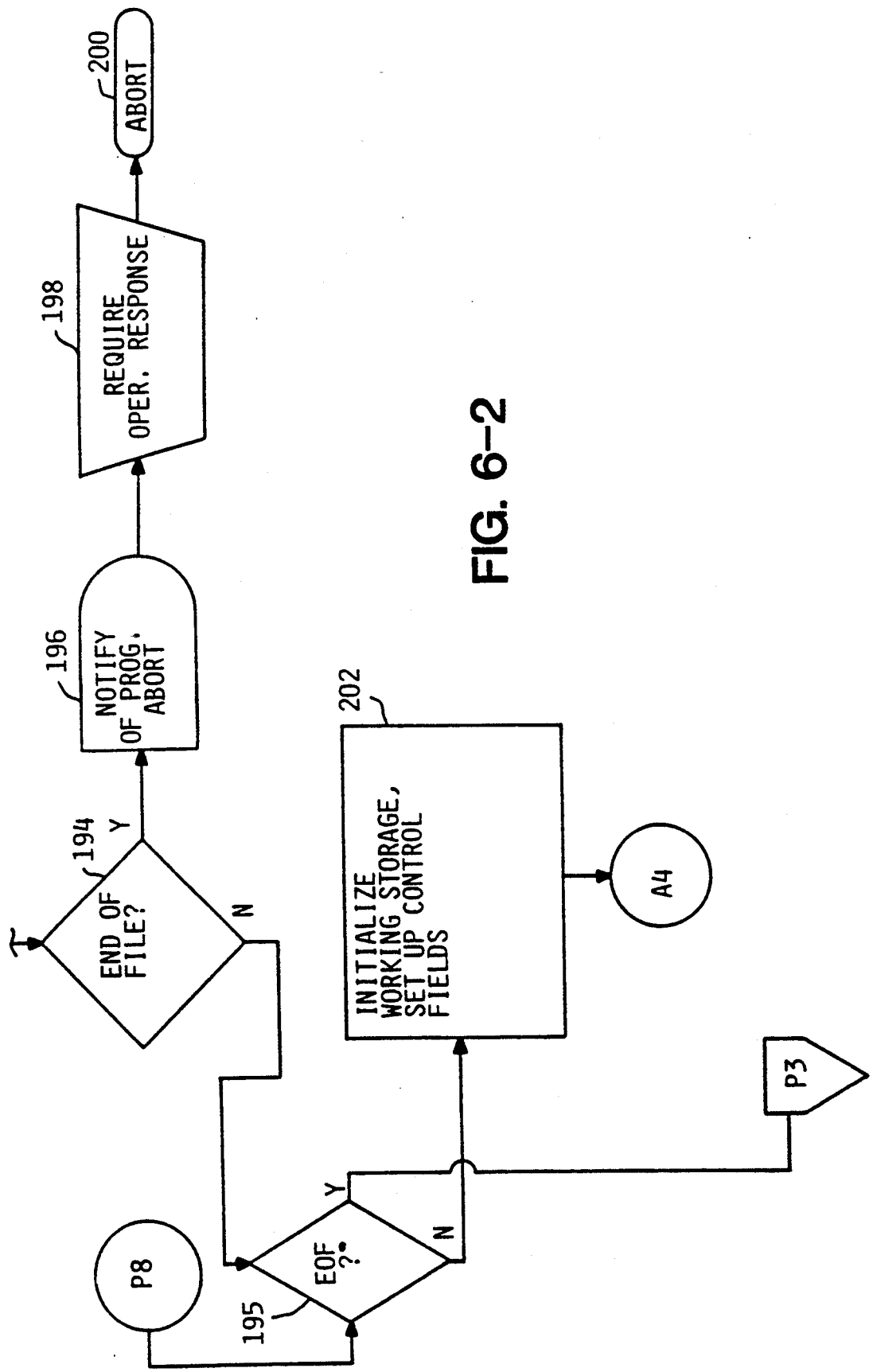

FIG. 1 is a data flow overview of a system in accordance with this invention for distributing PC-compatible diskette telephone bills to large-volume telecommunications customers. In brief, telephone communications customers 24 wishing to receive diskette telephone bills subscribe for this service with their telephone carrier 10. Participating carriers 10 provide appropriately selected billing information 12 for such all participating subscribers to a "processor" company 13 which, according to one aspect of the invention, segregates the billing data by subscriber, performs a mainframe computer preprocessing step 14 to produce a variety of in-depth billing analyses in the form of graphs and summary reports 16, and reorganizes both raw and analyzed billing data into an optimal format 18 for storage, manipulation, and display on commonly available personal computers (referred to herein as "PC's"). The processor 13 then performs a PC processing step 20 which writes this information onto one or more diskettes 22 which are compatible with the subscriber's personal computer, and distributes these diskettes to the subscribers 24. Then the subscriber, using an inexpensive personal computer 25 and PC-compatible software according to another aspect of the invention, can display and analyze a telephone bill with greater efficiency and flexibility than possible using the conventional paper bill. By appropriately selecting the billing information 12 which is obtained from the subscriber's carrier, however, the invention provides a telephone bill on diskette which is exactly reconciled with a standard paper bill supplied by the carrier.

The PC aspect of the invention includes an application software package, capable of running on an IBM-PC-compatible computer 25 and capable (under the direction of the end user) of: 1) displaying the telephone bill or any portions of the telephone bill in its ordinary or paper bill format; 2) displaying the bill or selected portions of the bill sorted in a non-conventional order (for example, call detail records sorted by length of call); 3) displaying a variety of pre-processed summary reports and graphs useful in analyzing the subscriber's telecommunications costs; and 4) displaying non-preprocessed reports according to user-formulated ad-hoc query requests.

But extensive processing is required to put the information 12 received from the carrier into an optimal form for use in a personal computer 25, and it is this processing which is carried out on the mainframe class computer 14. The steps of obtaining and rearranging appropriate billing information obtained from the carrier 10 are outlined in FIGS. 2-1 and 2-2, which is a block diagram showing an overview of the data flow in the "mainframe processing" segment 14 of FIG. 1.

Mainframe Processing

FIGS. 2-1 and 2-2 illustrates a batch program in which billing information from one or more telecommunications carriers 10 is received via magnetic media or telephone communications channels in formats roughly corresponding to the logical record layouts according to which the information is presently stored in each carrier's data processing facilities. Appropriate data is selected from the carrier's accounting databases and written to tape 46 in an unstructured, flat-file format. The invention contemplates that the records for any given communications customer will most likely appear in several files in a non-serial fashion and consequently will be widely distributed along the length of the tape. Accordingly, a program TPSB010 is responsible for retrieving the information from the tape and performing an extensive and complex mainframe processing procedure in order to reduce the information to a form which is sufficiently compact and compatible to be subsequently manipulated on a personal computer.

The operation of FIGS. 2-1 and 2-2 first performs a sort 48 on the entire input data from tape 46 to produce an intermediate file 50 containing the original information rearranged in customer number and station number order. In step 52 a number identifying the telecommunications carrier for which the bills ar to be produced is read. It is contemplated that this information will be retrieved from either an operator's console, an 80-column card, or any other suitable input device. The TBSB010 program shown in step 54 edits and reformats the data into a format that the target PC 25 can process. The processing in step 54 contemplates that abort messages and other operator response or intervention can take place during processing as indicated by step 56. All edit error information and balance control information is compiled in a report 16A, which is a portion of the report output 16 of FIG.

As a result of processing step 54, records in a format designated "PCdata," customer numbers with invalid data, and balance control information all move to respective temporary storage files on respective data storage disks 1, 2, and 3, as shown by steps 60, 68 and 70. In addition to reformatting the original billing records, program TPSB010 accumulates summary reports and graphs for each customer and incorporates this data as additional records in file 60. Each record outputted by program TPSB010 includes a numeric record type identifier. SORT 2 (step 62) reorganizes the records in intermediate file 60 by customer number and record type, placing the results into temporary file 64. For each customer, all records of a particular type are now grouped together.

The data in temporary files 64, 68 and 70 is used by a second mainframe program known as TPSB020 as indicated by step 66. The latter is designed to convert the data into a PC-compatible data stream which is then stored on a 9-track tape medium in step 72. During the processing indicated in step 66 abort messages may be received as shown by step 74. On completion of the processing by program TBSB020 and writing of the final data to the 9-track tape, all edit error information and balance control information is compiled as reports 16B, which corresponds to a portion of the reports indicated at 16 in FIG. 1.

Figure 3:
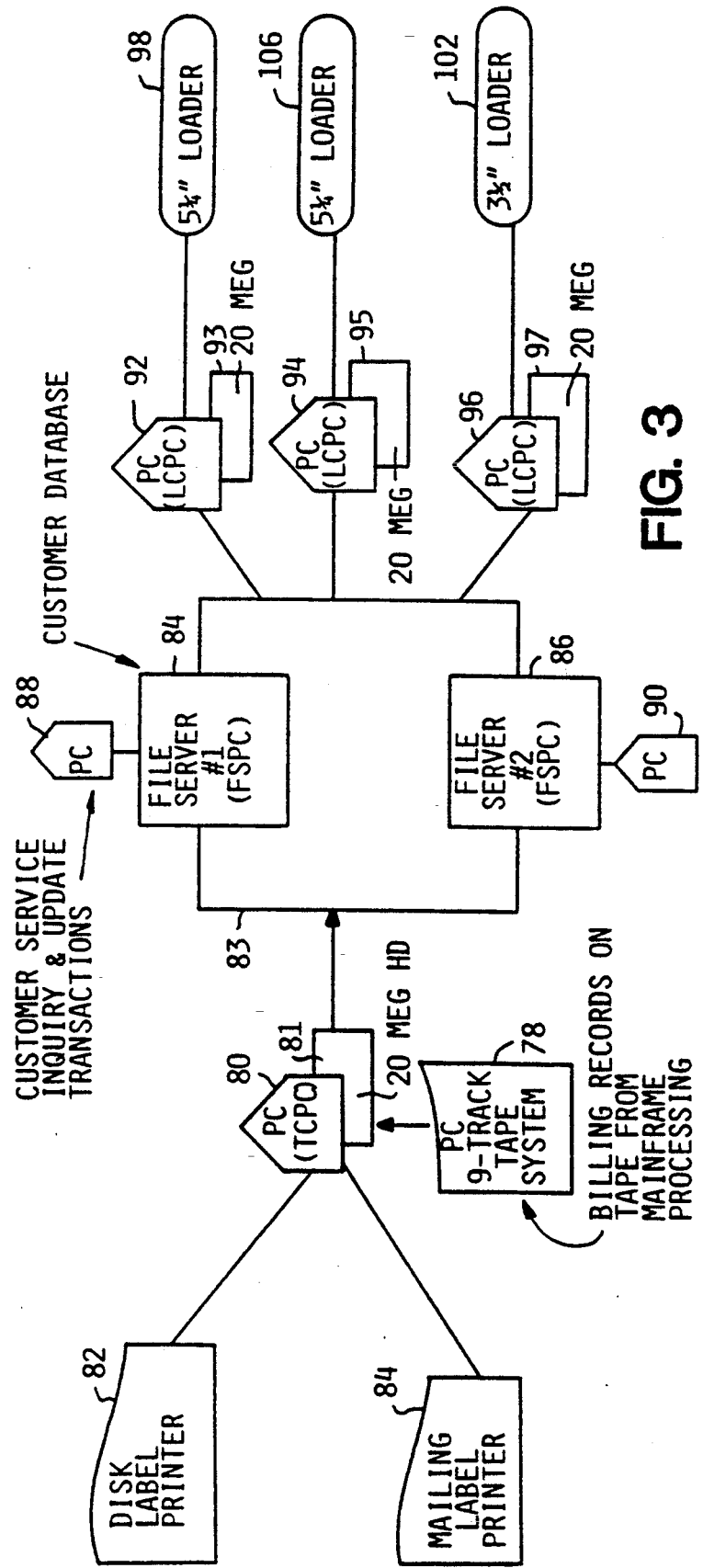
FIG. 3 is a block diagram showing an overview of the data flow in the "PC processing" segment of the system of FIG. 1.

Attention is directed next to FIG. 3 which is a block diagram overview of the data flow in the "PC processing" segment 20 of FIG. 1. The PC processing system has a tape reader 78 which reads the 9-track tape that was prepared in step 72 of FIGS. 2-1 and 2-2. The output of the tape reader 78 is fed to a TCPC (Tape Controller PC) 80, which could be an IBM PC AT class machine, PS/2, or equivalent product having a 20-megabyte hard disk drive 81. Upon reading the tape information the PC 80 drives printer 82 to prepare an identification label for each individual customer diskette. The PC 80 also drives a second printer 84 which prepares mailing labels for the individual customers' diskettes.

PC 80 stores the data received from the reader 78 on a local area network 83 which includes one or more FSPCs (file server PCs), such as a file server #1, designated 84, and a file server #2. designated 86. This local area network may employ any standard local area network architecture appropriate for micro-class computers such as a ring, token ring, or other distributive area network system. It is also contemplated that this local area network will be driven by software commonly available for local area networks, such as that produced by such companies as Novelle and 3-Com.

For each customer, billing records received from the PC 80 by the local area network are temporarily stored in a file on either file server #1 or file server #2, depending upon a determination by PC 80 as to which server has fewer files waiting to be processed in its queue. Attached to file server #1 is a personal computer labelled 88, and a counterpart is attached to file server #2 designated 90, which are both available for on-line handling of customer service inquiries and updating transactions as necessary.

Each file server 84 and 86 transmits through the local area network individual customer information to be placed upon respective individual customer diskettes by one or more LCPC's (loader control PC's) which may be micro-class personal computers 92, 94, and 96 having respective 20-megabyte fixed disk drives 93, 95 and 97. Attached to each of these micro-computers are respective 5¼" and 3½" floppy diskette loaders 98, 106 and 102 which transfer the individual customer information onto individual customer diskettes of the required size. This data is preferably stored on the floppy disks in a compressed format.

Figure 4:
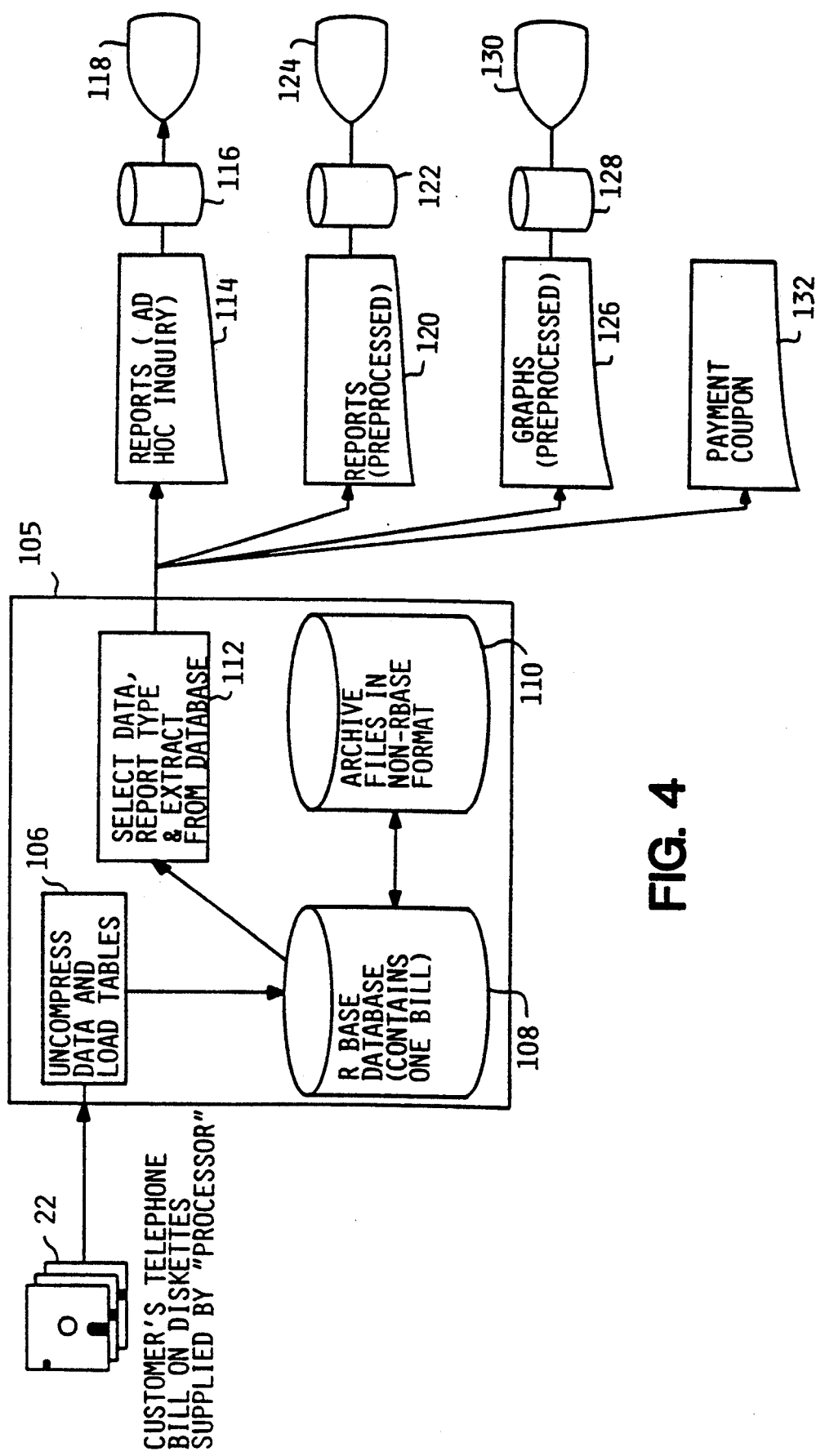
FIG. 4 is a block diagram showing an overview of the data flow in the "User Application" segment of the system of FIG. 1.

FIG. 4 is a block diagram overview of the data flow in the "user application" segment 24 of FIG. 1. The floppy diskettes 22 (see also FIG. 1) are those which were produced on the loaders 98, 106 and 102 of FIG. 3. Each set of diskettes 22 constitutes an individual customer's telephone bill as supplied by the processor 13 of FIG. 1, arranged in a particular manner that facilitates rapid manipulation by the customer's personal computer running a user application program 105 according to this invention, which has been previously supplied to the customer by the processor 13 or carrier 10 of FIG. 1.

The user application program 105 includes a user application database file 108. This file is maintained on a fixed disk in the user's personal computer and stores the information for a single telephone bill (i.e. a single month's billing for a single customer) for rapid and flexible information retrieval. The database file has a structure compatible with a selected commercially available data base management system program, preferably a program widely sold under the name "RBASE." In step 106, information from a new diskette bill 22 (which was compressed as described in the section discussing FIG. 3) is restored to uncompressed form and loaded into the database file 108. Since the database file 108 may contain only a single month's bill (except for a small amount of historical trend information), each time a new diskette bill 22 is received, any previous bill in the database must first be removed. The user application program 105 will store such previous bills removed from the database file 108 in non-database (i.e. "flat") archive files 110, which may be reloaded into the data base file 108 from time to time for further analysis.

The user application program then performs a step 112 which selects the appropriate data necessary to prepare reports of different types and extract specific information from the available data base. The resulting reports my then be printed out as standard reports or ad hoc inquiries 114, preprocessed reports 120, graphic reports 126 or a payment coupon for transmission along with payment of the bill to the telecommunications carrier 10. The first three reports can also be written to storage files 116, 122 and 128, or displayed on the video screen of the customer's personal computer 25 as indicated at 118, 124 and 130 respectively.

TPSB010

Figure 5:
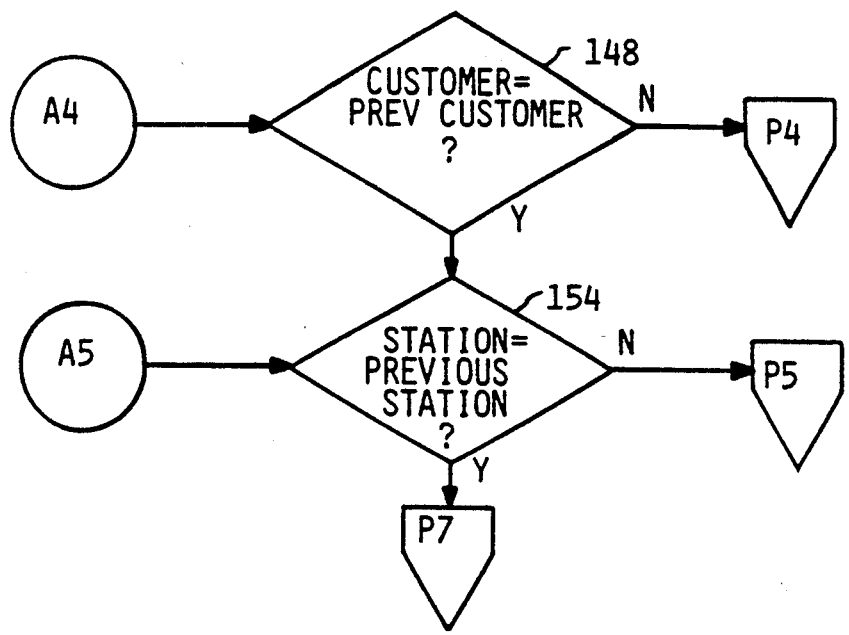
FIG. 5 is a flow chart of the "main processing section" for a first processing program designated TPSB010 which is used in the "Mainframe Processing" segment of FIG. 2.
Figure 5:
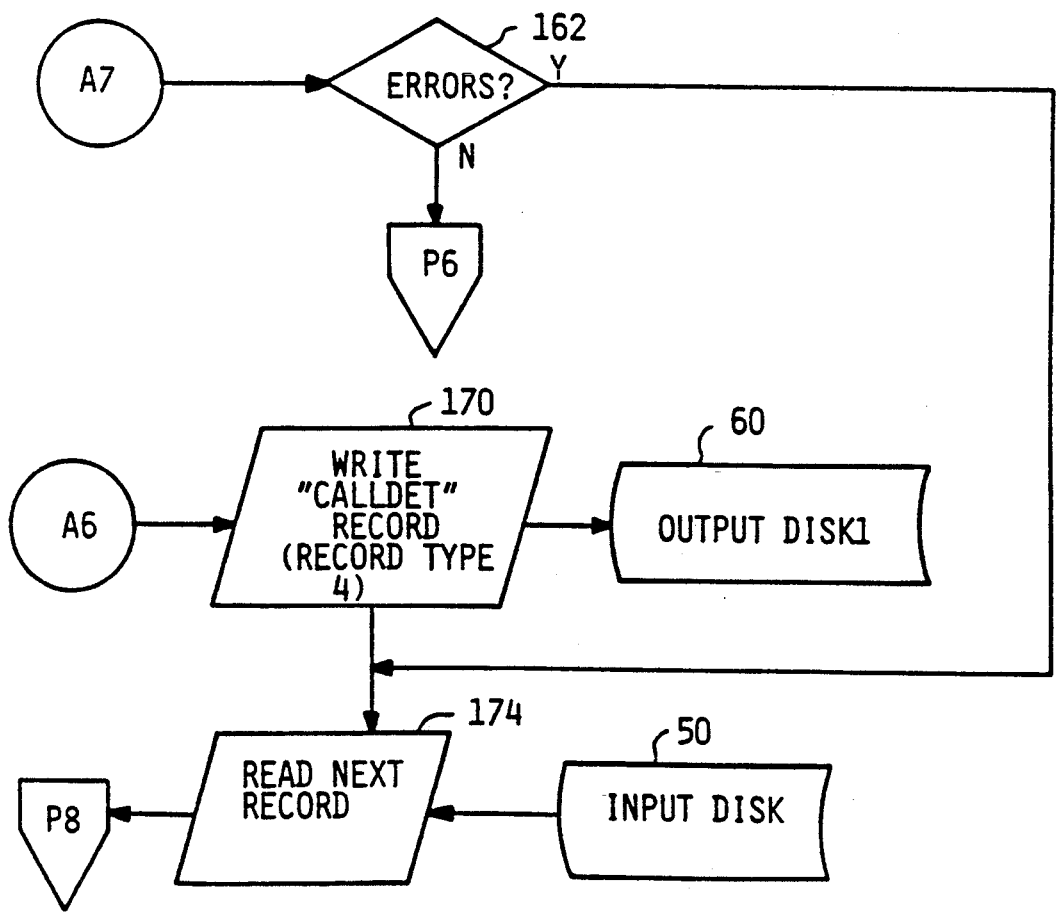

We now turn our attention to FIG. 5, which is a flow chart showing details of the main loop of the TPSB010 program 54 used in the mainframe processing segment of FIGS. 2-1 and 2-2, and FIGS. 6-1 and 6-2 which is the initialization routine carried out before entering the main loop illustrated in FIG. 5.

Apart from branching to program junction P2 which jumps to other program routines discussed below, the initialization routine of FIGS. 6-1 and 6-2 begins with step 178 where the program reads a carrier control data card 180 (or other information input device) identifying the telephone communications carrier whose individual customer records are currently being processed. Program step 182 then determines whether the carrier identification number is a valid carrier number. If the answer is negative, then in step 184 the program advises the operator of a program abort condition. Then the operator will be required to perform some manual process (step 186) before the program aborts as indicated by step 188. If a valid carrier identification number is detected by the system at step 182, however, then in step 190 the customer information is read from an input file 192, which corresponds to the data file 50 of FIG. 2.

The next step is 194, which detects an abnormal abort condition, i.e. no data at all in the file. If step 194 detects an end-of-file condition, then in step 196 the operator is notified of an abort condition, thus requiring a manual response 198 by the operator, after which the program is aborted at step 200.

If an abnormal end-of-file condition is not detected at step 194, however, then a second end-of-file (EOF) test 194 is performed to detect a normal end-of-file condition, i.e., one which occurs at the conclusion of normal processing. The reason why test 194 only detects abnormal end-file-conditions is because its input comes from step 190 at the beginning of an input record read. Test 195, in contrast, has a second input coming from program jump P8 in FIG. 5, which occurs repeatedly for each individual record. The affirmative output of step 194, therefore, goes to jump point P3 leading to the end-of-file processing routine described below in connection with FIG. 11. Conversely, the negative output of test 194 goes to step 202 which will initialize the working storage space and set up the control fields for customer processing and proceed to program branch point A4 which enters the main loop of FIG. 5.

At this point step 148 of the main program loop determines whether the program is continuing with the same customer as on the previous processing cycle, or whether processing of that customer has been completed and processing of a new customer started. It does this by determining whether the current customer ID number is or is not equal to the one processed by the previous processing cycle. If they are not equal, then a new customer is being processed and the program jumps at junction P4 to a customer break processing routine which continues at FIG. 10, described below. Subsequently, the main loop of FIG. 5 is reentered at program junction A5.

If the customer ID's are equal, however, then there is no customer break and the program proceeds in step 154 to test whether there has been a change in the current customer's station ID number. If there has been a change, the program jumps at P5 to the station number break processing routine discussed below in connection with FIG. 9, and the main loop of FIG. 5 is reentered at junction A5.

If the station number continues to be the same as on the last processing cycle, however, then the program jumps at branch point P7 to an input data editing routine discussed below in connection with FIGS. 7-1 and 7-2. The main loop of FIG. 5 is then reentered at point A7, where program step 162 determines whether there are any errors. If there are, the program immediately goes to step 174, to read the next record from temporary file 50 (FIG. 2), and exits through a program jump P8 to the error detection routine described above in connection with FIGS. 6-1 and 6-2.

If there are no editing errors, the program jumps to branch point P6 leading to the call detail accumulation routine of FIG. 8, discussed below, and the main loop of FIG. 5 is reentered at program point A6 leading to step 170 which writes a call detail record (also referred to as "record type 4") to a file 60 on data storage disk 1 (FIGS. 2-1 and 2-2). The program also then goes on to perform step 174 and jump to program point P8 as described above.

Figures 1, 7:
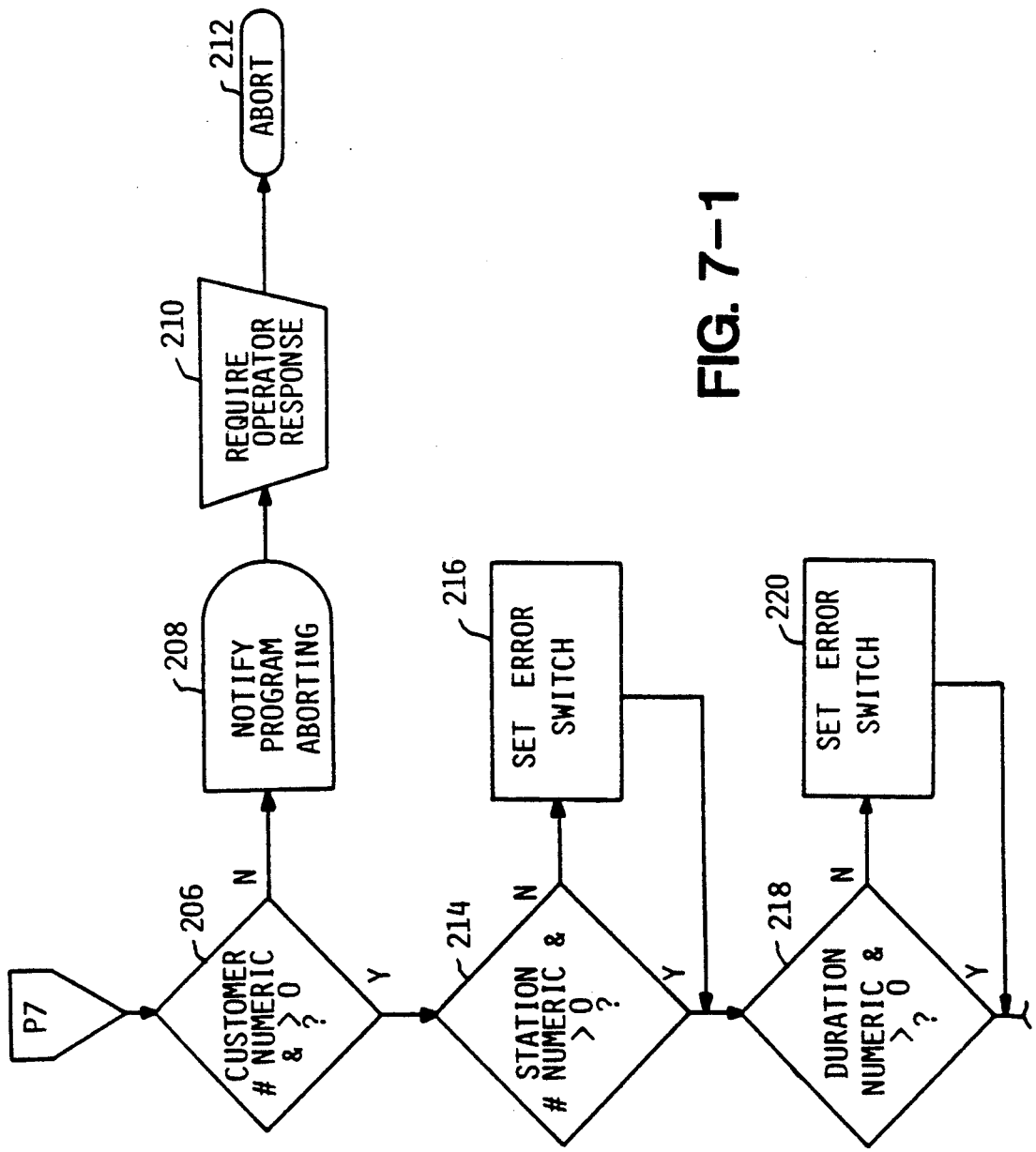
Figures 2, 7:
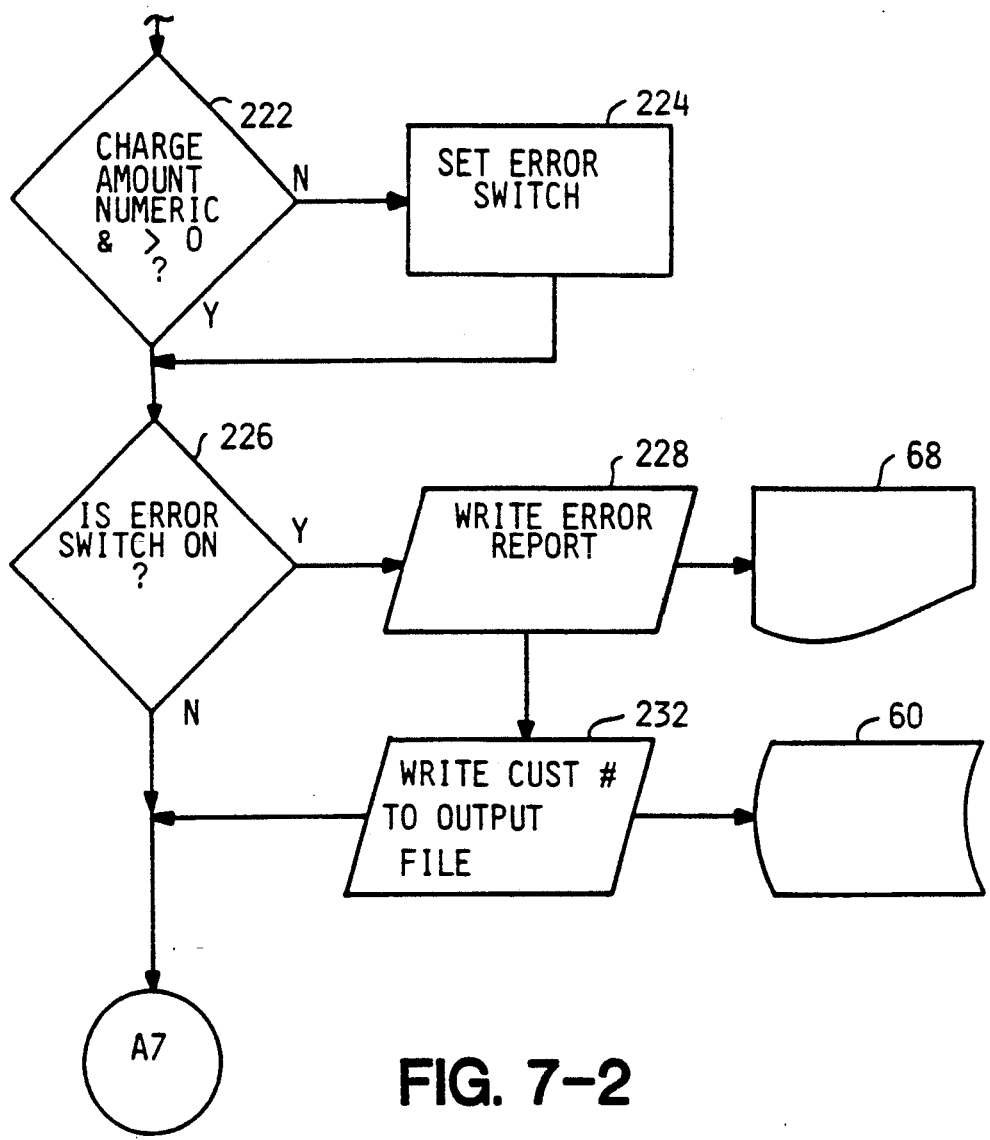

We turn next to FIGS. 7-1 and 7-2 for a detailed discussion of the "input data editing" section of "main frame processing" segment TPSB010 of FIGS. 2-1 and 2-2. The overall purpose of this step or process is to determine if an error condition exists as to any of several factors reviewed in the customer's telephone information, and to produce the necessary operator reports and files as to any error conditions detected.

Starting with program jump P7 from FIG. 5 described above, the first step 206 of this data edit process is a determination by the program of whether the customer identification number for the currently processed customer consists of only numeric values and of whether these values are greater than 0. If this determination is negative, then step 208 will notify the system operator that the program is aborting and that the program will be held frozen until the required operator response 210 is received. Then the program will abort as indicated by step 212.

Should the test of step 206 be affirmative, however, then the customer identification information is passed on to step 214 to determine if the telephone station number of the telephone call currently being processed is numeric and has a greater value than 0. If not, then program step 216 will set an error switch. Then at step 218 a determination is made whether the telephone call duration information for the currently processed telephone call is numeric and is greater than 0. If that condition is not true, then an error switch is set in step 220.

In step 222 the program determines whether the charge amount for the currently processed telephone call is numeric and greater than 0. Should that be false then an error switch is set by step 224. Should the charge amount be numeric and greater than 0 the currently processed call information is then passed on to step 226 which determines if an error switch has been activated by any of the above-described steps 216, 220 or 224. If so, the program invokes step 228 to create an error report which may be written directly to disk 2 as described above (step 68 of FIG. 2). The error report created by step 228 also is written by step 232 to another file on disk 1 which corresponds to step 60 of FIG. 2. In any case, the program then sends the currently processed telephone call information on to program junction A7 which reenter it into the main loop data flow of FIG. 5.

Figure 8:
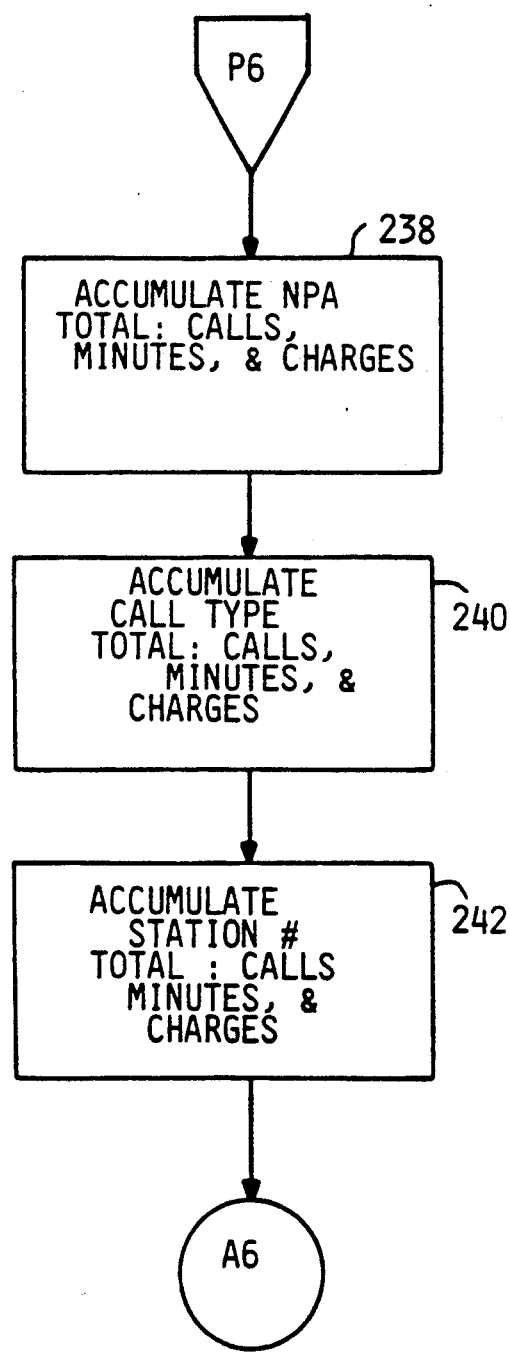
FIG. 8 is a flow chart of the "call detail accumulation" section for the first processing program used in the "Mainframe Processing" segment of FIG. 2.

For more information regarding the call detail information accumulation process of the "main frame processing" program of FIG. 2, we now turn to the flow chart of FIG. 8. This routine is entered at program jump point P6 coming from the main program loop of FIG. 5 described above. The first step 238 accumulates the total number of calls, their duration, and their charges according to a standard geographic breakdown known as "NPA." The next step 240 does the same accumulation, broken down by call types, i.e., evening, off-hour or daytime full rate calls. The next step 242 does the same accumulation, broken down by customer station number. The information accumulated by steps 238, 240 and 242 is then returned for processing via program jump A6 for reentry into the data flow of the main program loop of FIG. 5.

Figure 9:
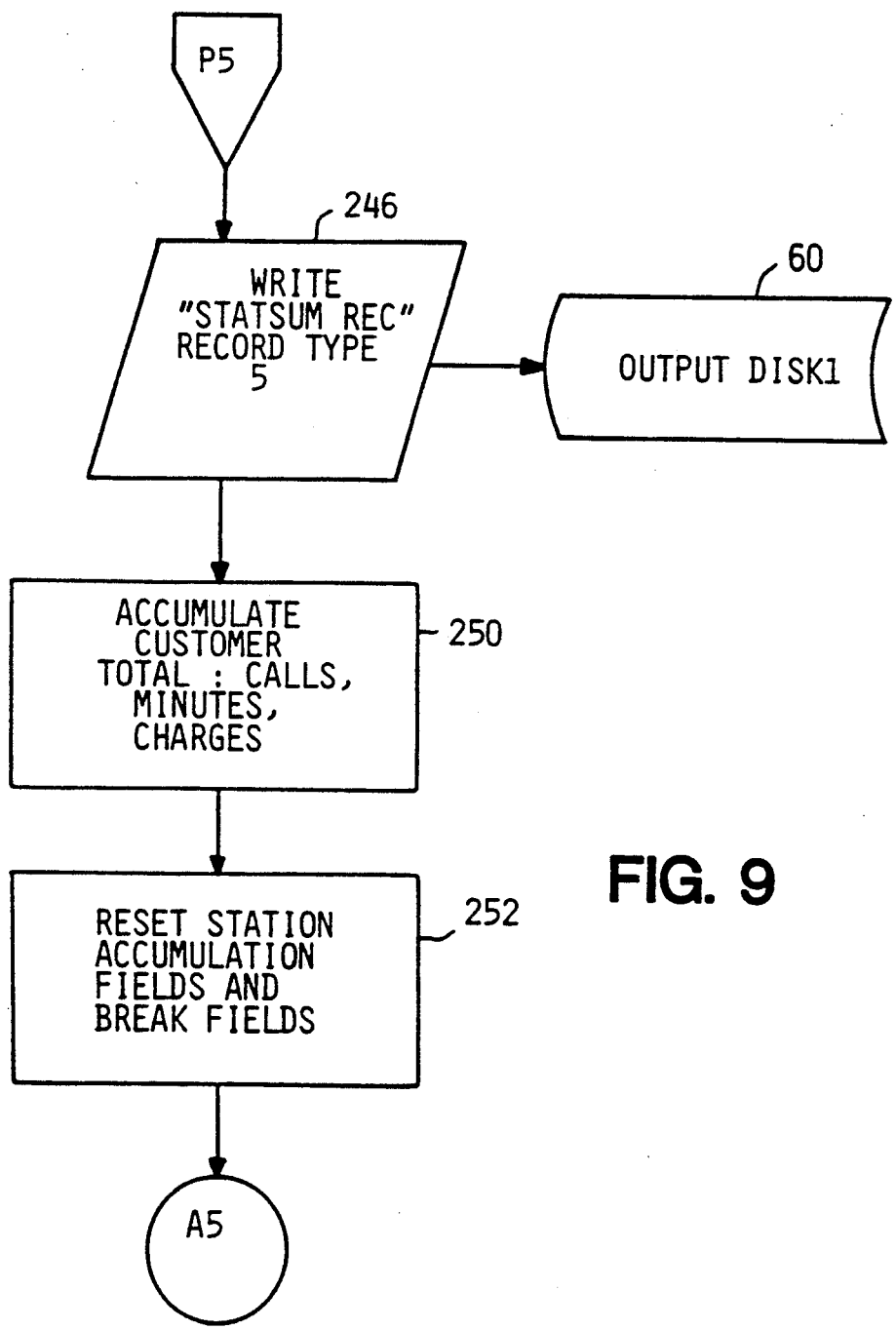
FIG. 9 is a flow chart of the "station number break processing" section for the first processing program used in the "Mainframe Processing" segment of FIG. 2.

For a more detailed understanding of the station number break routine we now turn to FIG. 9, which is a flow chart of the station number break processing section of the "mainframe processing" segment TPSB010 of FIGS. 2-1 and 2-2. This routine is entered via program jump point P5 coming from the main loop of FIG. 5. In the first step 246 a "statsum rec" or station summary record (also designated record type 5) is created and written to output disk 1, corresponding to step 60 of FIGS. 2-1 and 2-2). This is a summary of total telephone usage in terms of the number of calls, call duration and charges, broken down by geographical area and call type, for a given customer calling station. This record is written to file 60 of FIGS. 2-1 and 2-2. The next step 250 accumulates station sum records for all customer stations, broken down by call duration and charges, for the current customer. Then in step 252 the program resets the station accumulation fields and break fields to their initial values before going on the next station for the current customer.

Figure 10:
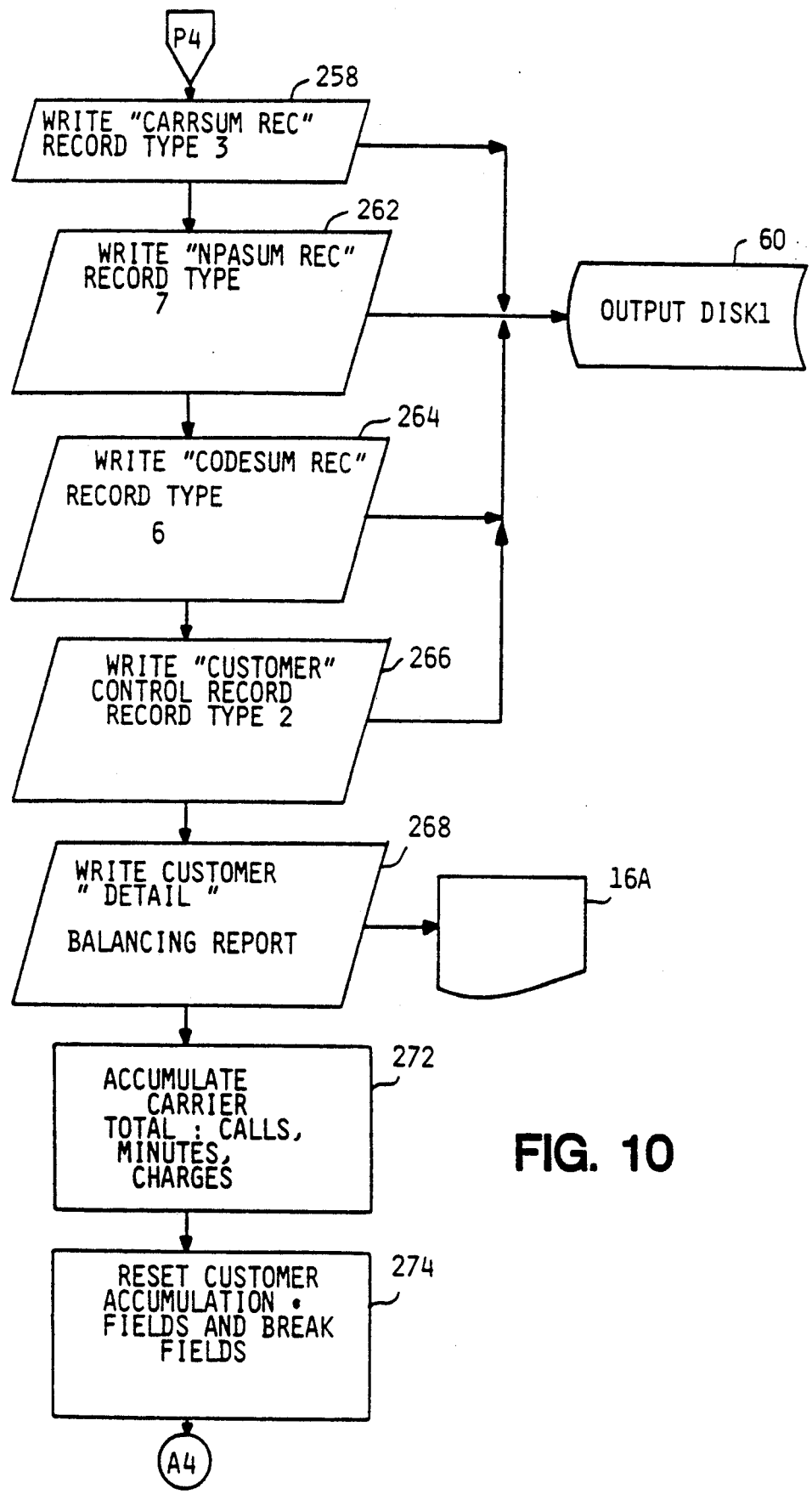
FIG. 10 is a flow chart of the "customer break processing" section for the first processing program used in the "Mainframe Processing" segment of FIG. 2.

We now come to FIG. 10 which is a flow chart of the customer break processing section of program TPSB010 used in the "mainframe processing" segment of FIGS. 2-1 and 2-2. This routine is entered by way of program jump P4 from the main loop of FIG. 5. The program's first step 258 prepares and writes a "carsum rec" or carrier sum record (also designated record type 3) which covers the same information as the "statsum rec" of FIG. 9 but contains the total figures for all telephone calls and their duration and charges for all customer stations for a given customer and a given telephone carrier. This information is then sent for on-line storage to a file on disk 1, corresponding to step 60 in FIGS. 2-1 and 2-2. Similarly, step 262 prepares and writes to disk 1 (step 60 of FIG. 2) a "NPAsum rec" or NPA summary record (also designated record type 7) which contains the same information broken down geographically, e.g., by area code. The next step 264 prepares and writes to disk 1 (step 60 of FIG. 2) a "codesum rec" or code summary record (also designated record type 6) which contains the same information broken down by call type code, i.e., evening, off-hour or daytime full rate calls.

The next step 268 prepares and writes a report 16A (see also FIGS. 2-1 and 2-2), containing customer detail balancing information. Next in step 272 the carrier totals are accumulated, broken down by calls, duration, and charges. Thereafter in step 274 the program resets the customer accumulation fields and customer break fields, after which the program jumps via junction A4 back to the main program loop of FIG. 5.

Figure 11:
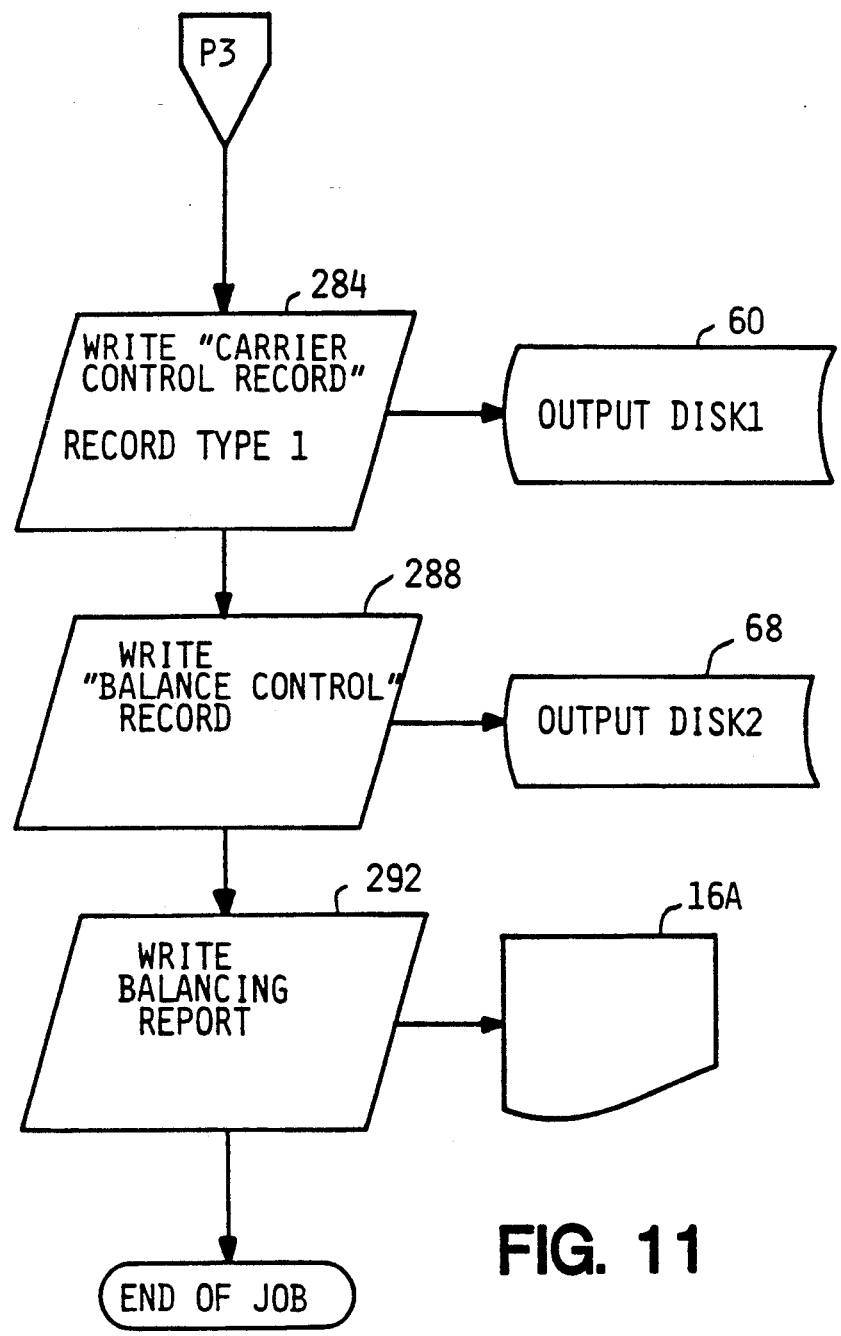
FIG. 11 is a flow chart of the "end-of-file processing" section for the first processing program used in the "Mainframe Processing" segment of FIG. 2.

We now refer to FIG. 11 which is a flow chart of the "end of the file processing" section for processing program TPSB010 used in the "mainframe processing" segment of FIGS. 2-1 and 2-2. This routine starts with program jump P3 from the "end of file" test 194 of the initialization routine of FIGS. 6-1 and 6-2. It then proceeds with step 284 in which the program prepares and writes the information for a carrier control record (also known as record type 1) to disk 1 of FIGS. 2-1 and 2-2, a procedure which corresponds to program step 60 of FIGS. 2-1 and 2-2. Next step 288 prepares and writes a balance control record to disk 2 of FIG. 2, a procedure which corresponds to program step 68 of FIG. 2. Next step 292 writes a balancing report to file 16A of FIG. 2, which corresponds to a portion of report 16 in FIG. 1. Thereafter the entire job is terminated.

TPSB020

Figure 12:
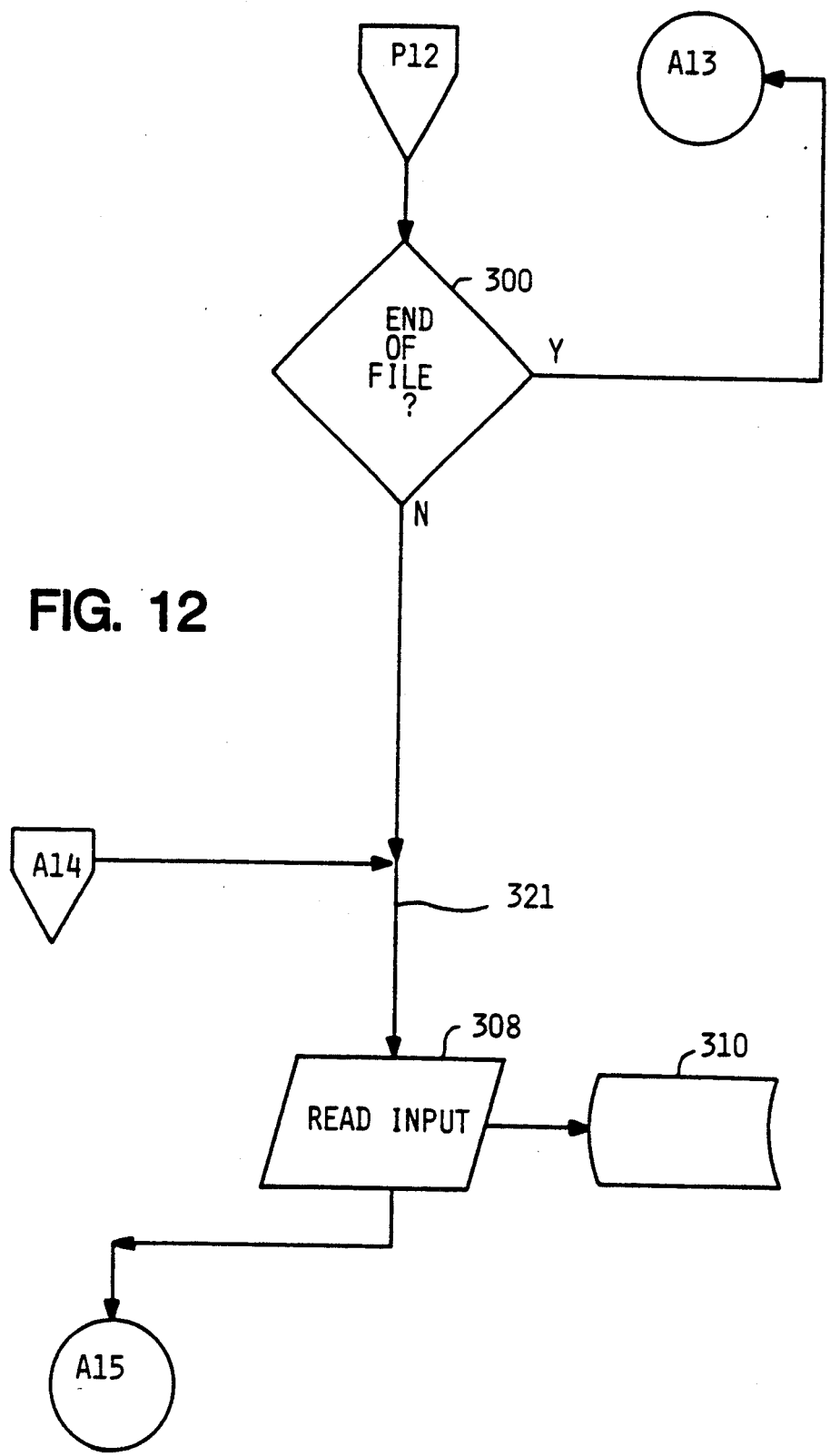
FIG. 12 is a flow chart of the "main processing" section for a second processing program designated TPSB020 which is used in the "Mainframe Processing" segment of FIG. 2.
Figure 13:
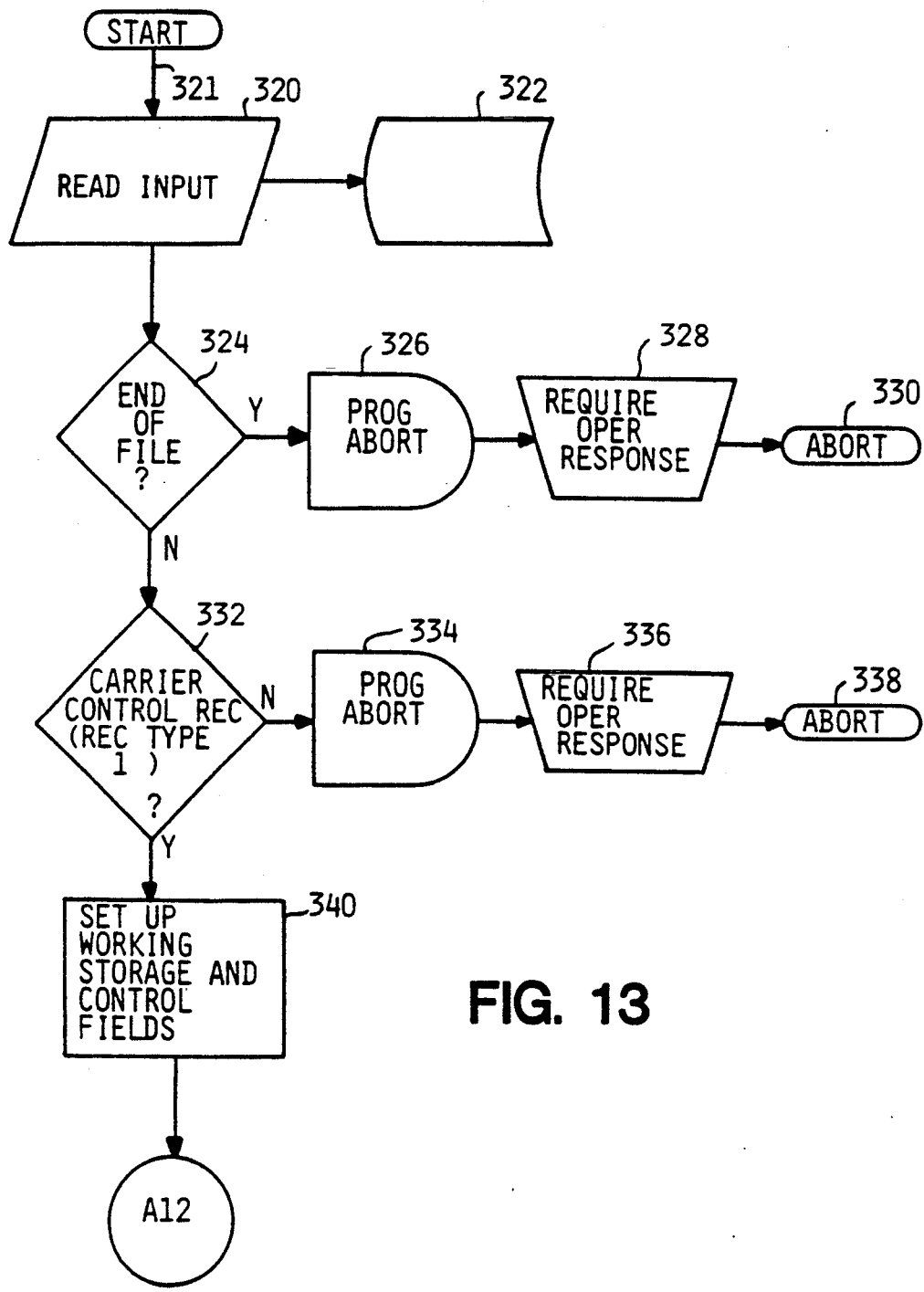
FIG. 13 is a flow chart of the "initialization" section for the aforesaid second processing program used in the "Mainframe Processing" segment of FIG. 2.

For details of the TPSB020 program portion of the main processing procedure illustrated in FIGS. 2-1 and 2-2, we turn first to the flow chart of FIG. 12 which represents the main program loop, and the flow chart of FIG. 13 which represents an initialization routine. The "initialization" procedure of FIG. 13 begins with step 320 which represents the reading of an information stream 321 consisting of information coming from files 64, 68 and 70 and information coming from file 60 after it has been sorted by step 62 in the mainframe processing program of FIGS. 2-1 and 2-2. This information is then written to a temporary online storage file 322. In step 324 this information stream is tested to determine if an end-of-file condition is present. If it is present in step 326 the program immediately sends an abort signal which requires an operator response 328 to abort the system at step 330.

If no end-of-file condition exists, the information stream is sent on to step 332 to test for the presence of type one record, a carrier control record. If a carrier control record is not present the program at step 334 ceases execution and requires an operator response 336 which causes the system to abort at step 338. If the carrier control record is present, then the next step 340 is to set up working storage and control fields, after which the program returns via program jump A12 to the main processing loop of FIG. 12, where it enters at program point P12.

In the main loop of FIG. 12 the system first seeks to determine at step 300 whether an end-of-file condition exists. If so, then there is a program jump A13 to program point P13 in the end-of-file processing routine of FIG. 16, described below. If an end-of-file condition is not encountered, then the input data stream 321 (see FIG. 2) is read in step 308 and written to an online storage file in step 310 to be used by other portions of the processing system. Step 308 is also executed when the main loop of FIG. 12 is entered at program point P14 coming from jump A14 of the "write PC transmit tape" routine of FIGS. 15-1 and 15-2, discussed below. After step 308 the program exits at point A15 and jumps to entry point P15 of FIG. 14, to which we turn next.

Figure 14:
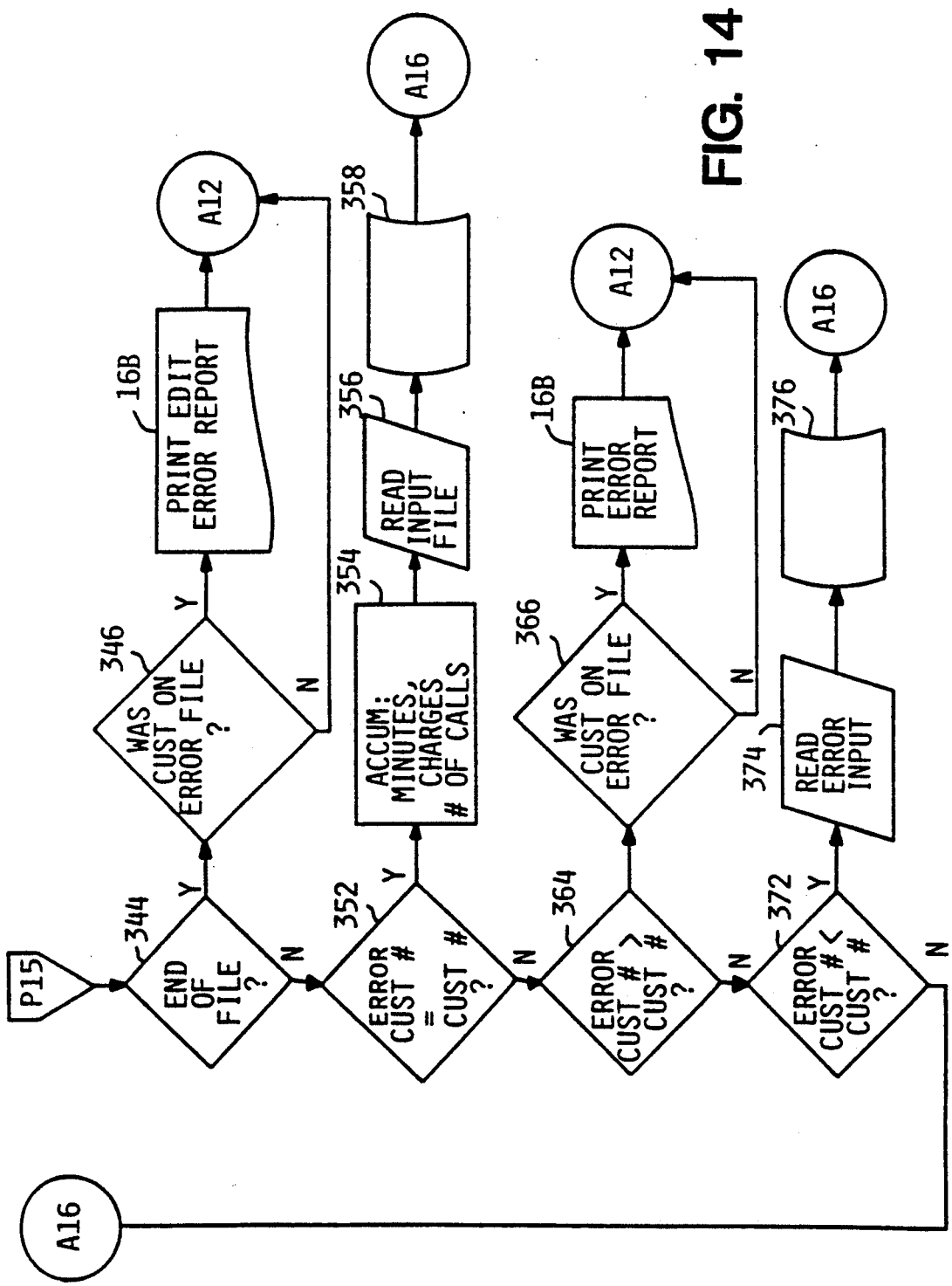
FIG. 14 is a flow chart of the "erroneous customer data rejection" section for the second processing program used in the "Mainframe Processing" segment of FIG. 2.

FIG. 14 is a flow chart of the "check customer error" routine of for the processing program TPSB020 used in the "mainframe processing" section of FIGS. 2-1 and 2-2. Entry into the routine of FIG. 14 is at program point P15. The first program step 344 is used to test for an end-of-file condition. If such a condition is present the system must next determine at step 346 whether the customer number was contained on the customer error file 60 (see FIGS. 2-1, 2-2, 7-1 and 7-2). If the answer is yes, then in step 348 that, fact is printed in an edit error report 16B (see FIGS. 2-1 and 2-2) which represents a portion of report 16 in FIG. 1. If the answer to test 346 is negative, or after the entry to error report 16B is made, this routine exits at point A12, and reenters the main loop of FIG. 12 at entry point P12.

If the end-of-file test at step 344 is negative, the program must then determine at step 352 whether there is an error, but the error does not affect the customer ID number (i.e., the current customer number equals the correct customer number). If so, then the program at step 354 accumulated the duration and charges and the number of the customer's calls by reading the input file data stream 321 (step 356), writes that information to a temporary file 358, and exits at A16 to the program routine of FIGS. 15-1 and 15-2.

If at step 352 there is an error and the current customer number is not equal to the correct customer number, then the system must determine at step 364 whether the error customer number is greater than the correct customer number. If that condition is found, then the system must determine at step 366 whether the customer was on the error file. If the customer appears on the error file then the information is passed on to be reported on error report 16B mentioned above. Thereafter, or if the result of test 366 is negative, the program exits from this routine at A12 to reenter the main loop at P12 in FIG. 12.

If at step 364 there is an error and the current customer number is not greater than the correct customer number, then the system must determine at step 372 whether the error customer number is less than the correct customer number. If that condition is found, then at step 374 the error information from file 68 (FIGS. 2-1 and 2-2) is read and written to a temporary file 376, after which the routine exits at A12, reentering the main loop of FIG. 12 at P12. If the test performed in step 372 is negative, however, the routine exits at A16 to enter the routine of FIGS. 15-1 and 15-2 at P16.

Figures 1, 15:
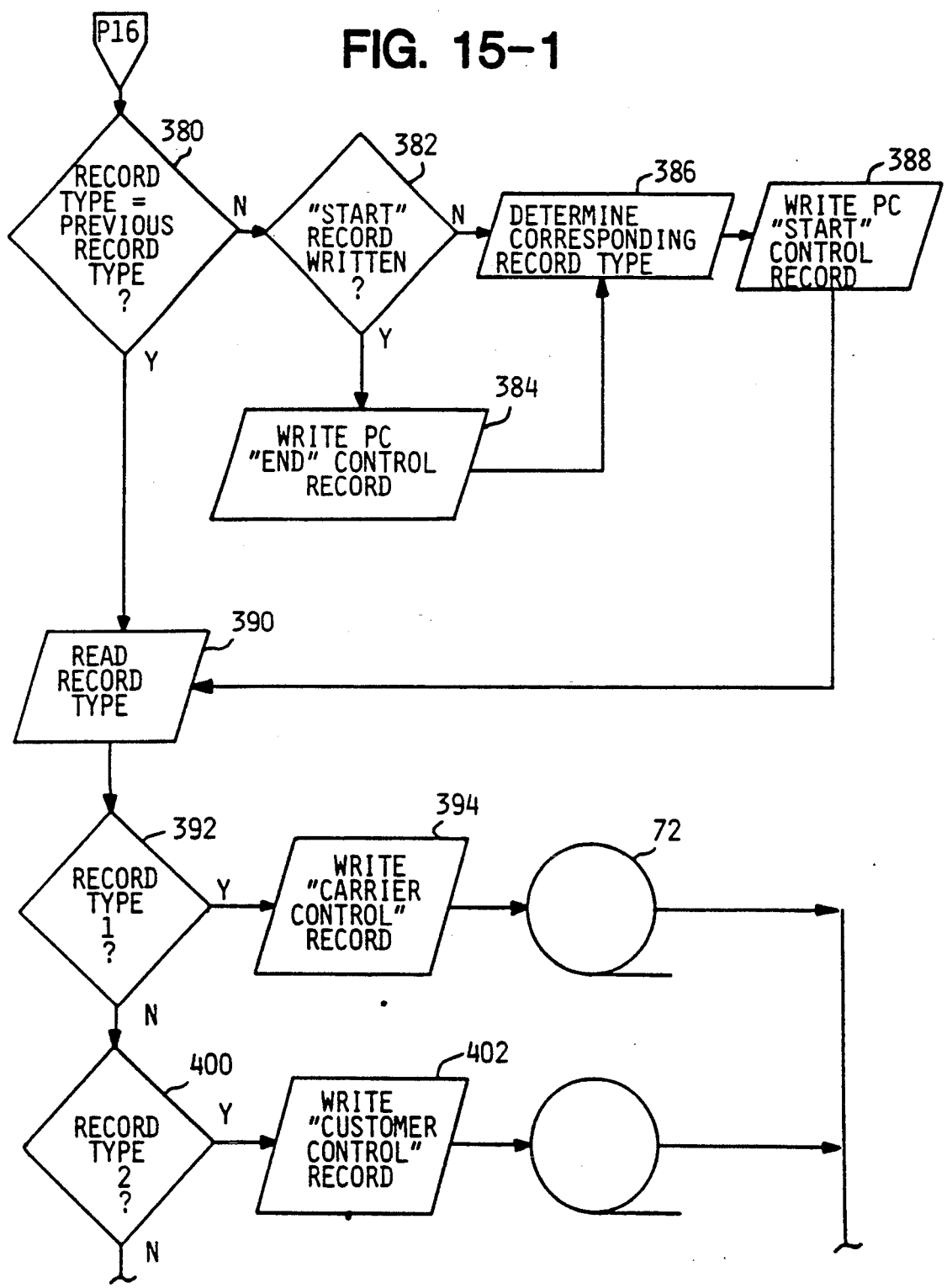
Figures 2, 15:
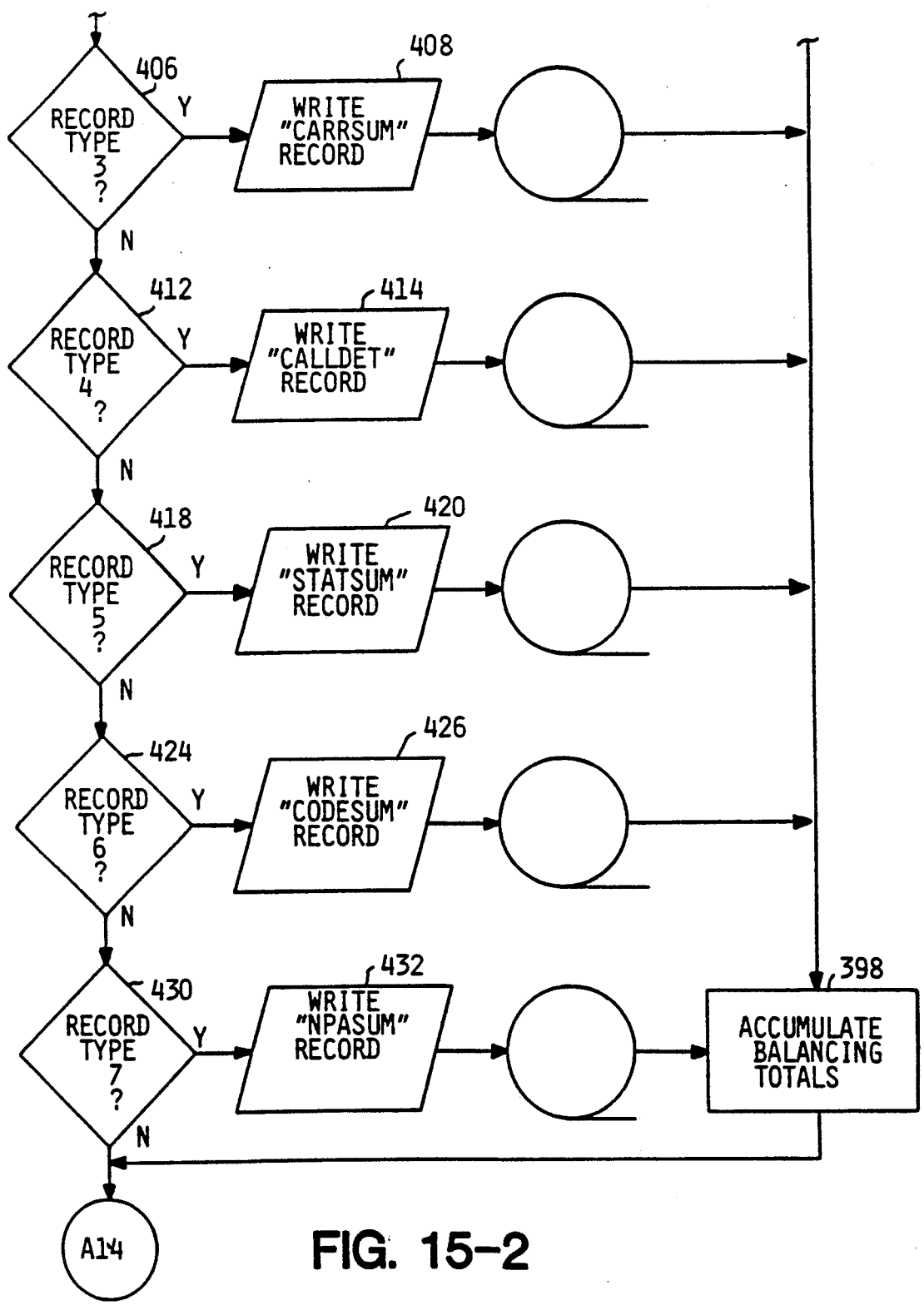

FIGS. 15-1 and 15-2 is a flow chart of the "write PC transmit tape" section for the TPSB020 processing program used in the "mainframe processing" segment of FIGS. 2-1 and 2-2. It starts out at step 380 where the program determines whether the current record type being processed is the same record type as was previously cycled. If that condition is false then step 382 determines whether a "start" record exists. If so, then the program will write a PC "end" control record to the file in step 384. In either case, it will next determine the corresponding record type in step 386 and in the next step 388 write a "start" PC control record.

In the event of a negative answer to test 380, or after the conclusion of step 388, step 390 then reads the record type of the current record. Steps 392, 400, 406, 412, 418, 424 and 430 in turn then determine if the current record type is 1, 2, 3, 4, 5, 6, or 7 respectively. If it is a record of type 1, then step 394 writes a "carrier control" record to be placed on the nine-track mainframe tape 72 which was discussed in connection with FIGS. 2-1 and 2-2. Similarly, If it is a record of type 2, 3, 4, 5, 6, or 7, then steps 402, 408, 414, 420 426 and 432 respectively writes "customer control, carrsum, calldet, statsum, codesum" and "NPAsum" records respectively to the nine-track mainframe tape 72. In each case, after the tape 72 is written to, the program routine in step 398 accumulates the balancing totals and then exits via program jump A14 to entry point P12 of the main loop, FIG. 12.

Figure 16:
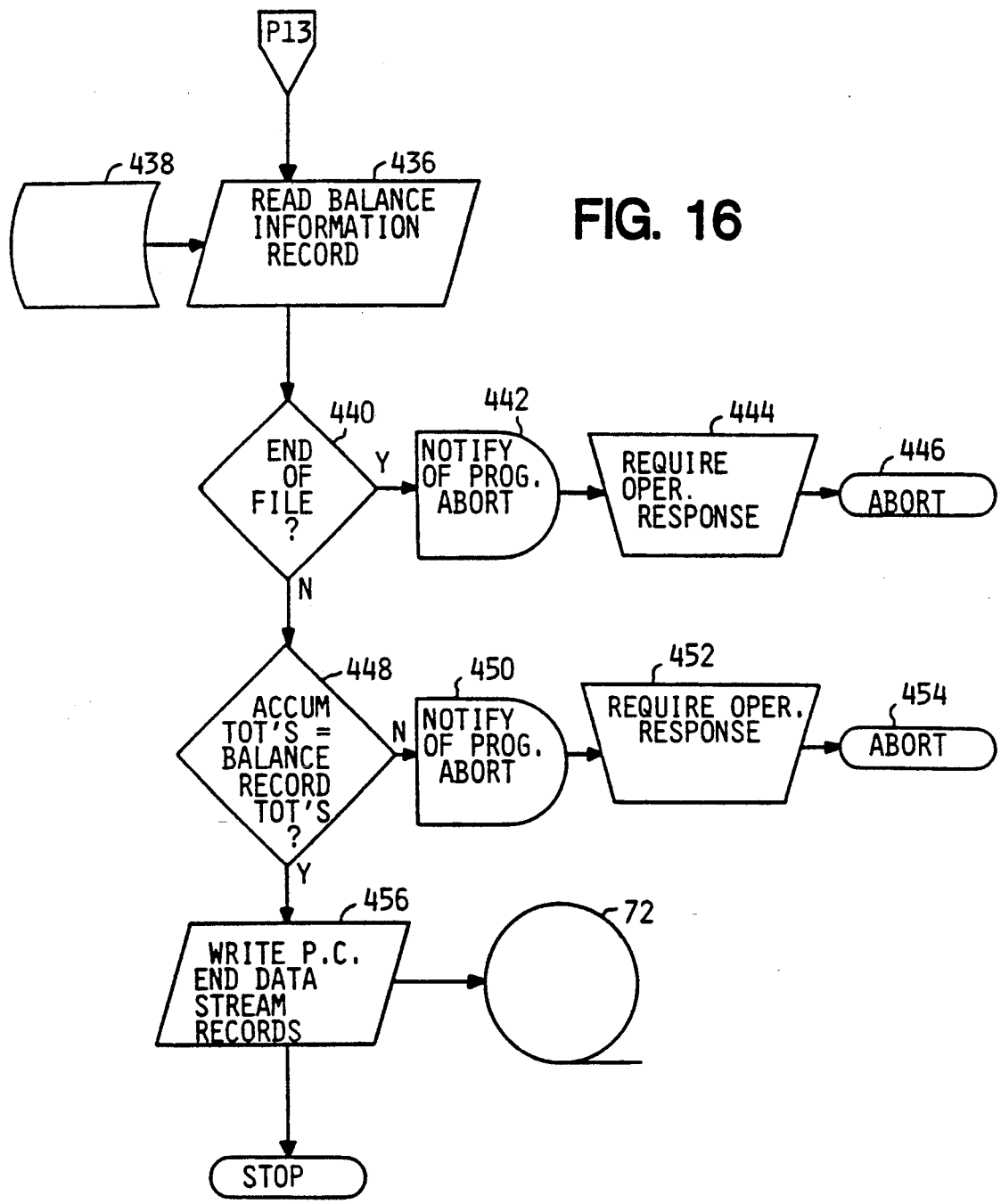
FIG. 16 is a flow chart of the "end-of-file processing" section for the second processing program used in the "Mainframe Processing" segment of FIG. 2.

FIG. 16 is a flow chart of the "end of file processing" section for the TPSB020 program used in the "mainframe processing" segment of FIGS. 2-1 and 2-2. This routine is entered at program point P13 coming from jump point A13 of the main loop, FIG. 12. At step 436 the program reads the balance information record 438 previously stored online in file 70 of FIGS. 2-1 and 2-2. The program next determines in step 440 whether an end-of-file condition exists. If so, the program in step 442 will notify the operator of a program abort and halt execution until there is an operator response 444, after which the abort step 446 takes place. If the end-of-file test is negative, then a determination must be made whether the accumulated totals are equal to the balance record totals. If not, then in step 450 the program performs an abort sequence 450, 452, 454 similar to the previously described sequence 442, 444, 446.

If the test at step 448 is affirmative, however, then the program's next step 456 is to add the PC end data characters onto the data stream records and write it onto the nine-track tape 72 of FIGS. 2-1 and 2-2, after which the program terminates.

PC Processing

Figures 1, 17:
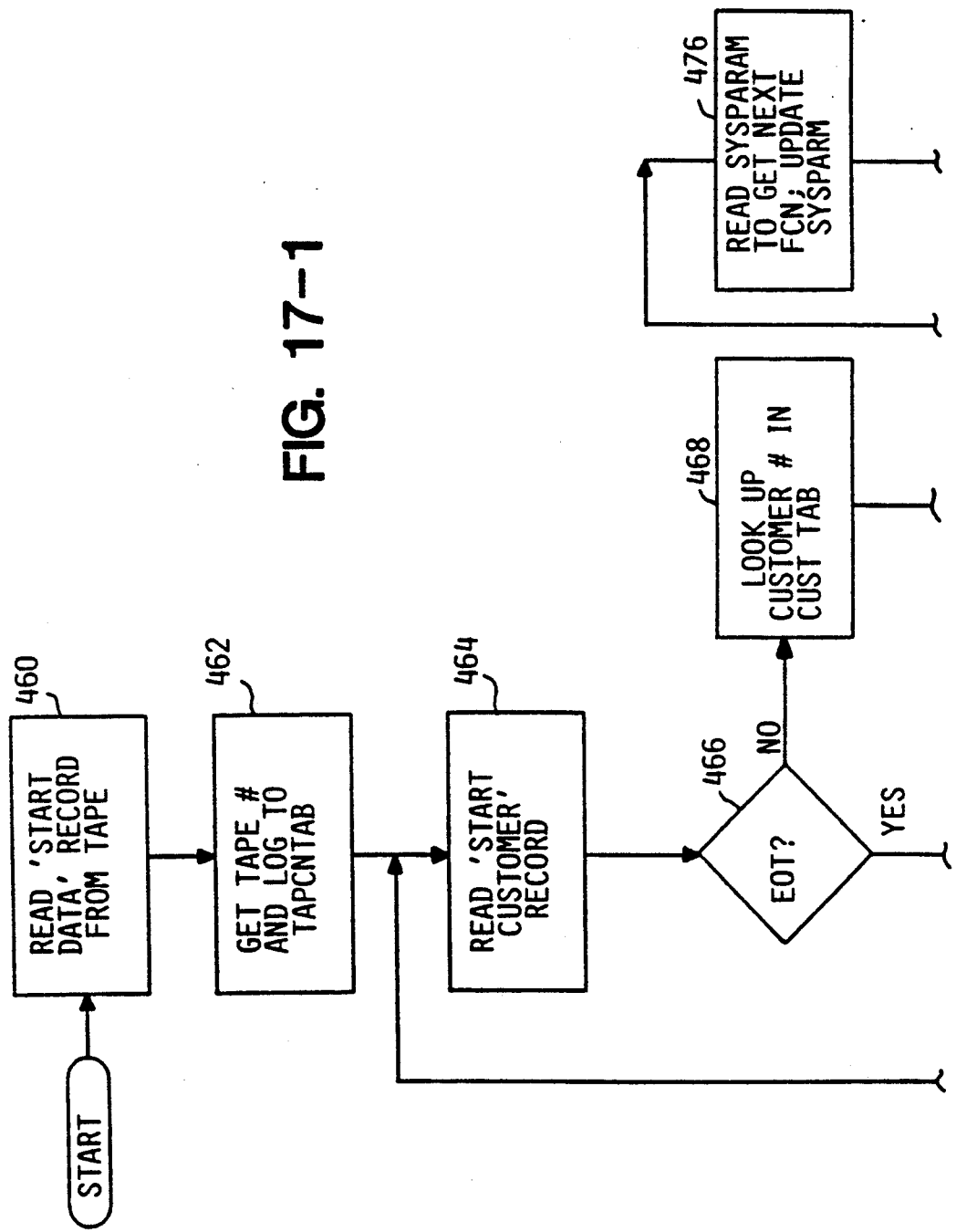
Figures 2, 17:
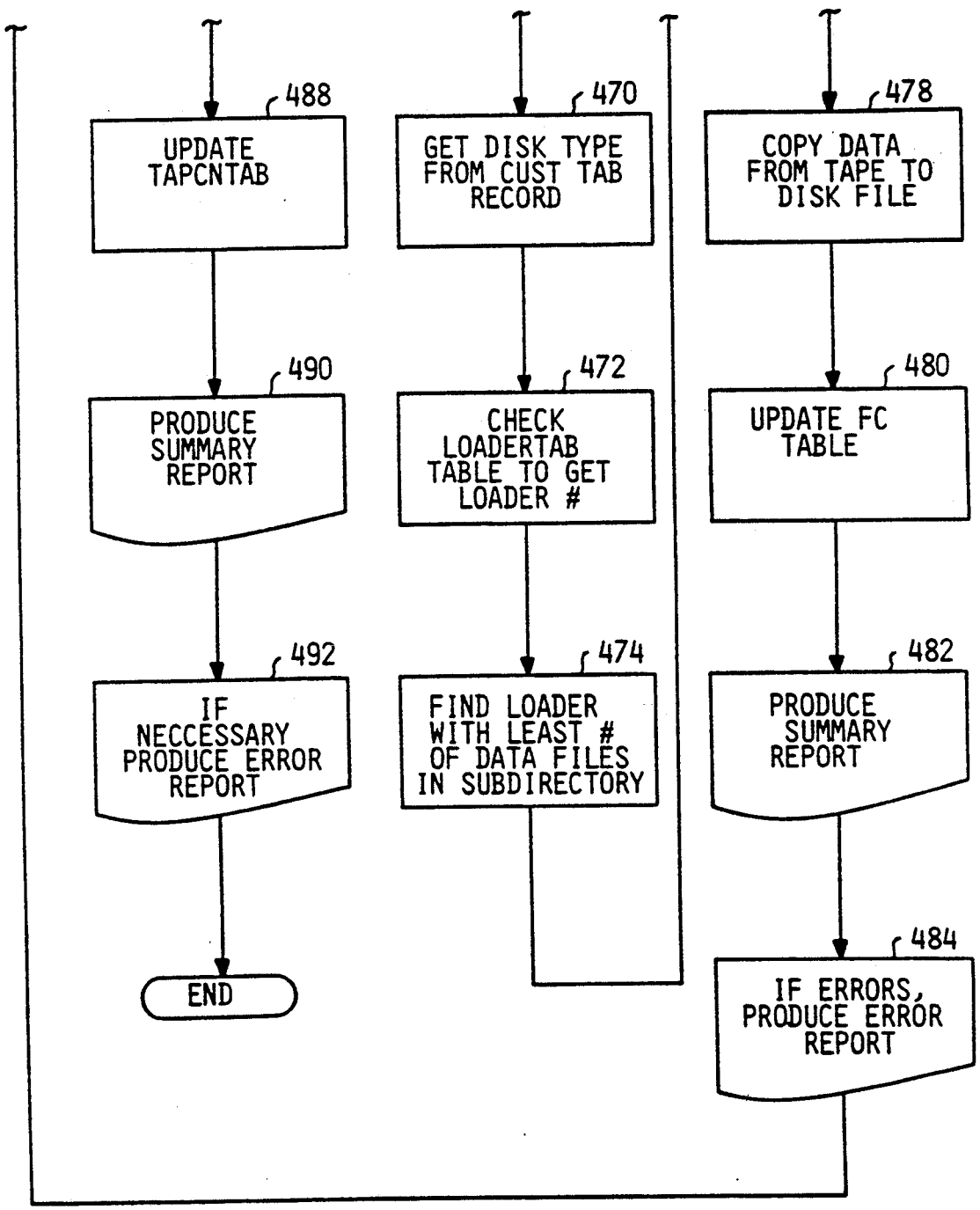

We now turn to the programs used in the "PC processing" segment of FIG. 3 for the reading of a mainframe-produced tape. FIG. 17 is a flow chart of the PC processing system's first program, designated "SBPROC01—read mainframe produced tape." This program begins at step 460 where it reads the output data tape 72 which was created in FIGS. 2-1 and 2-2, and which contains the processed carrier telephone bill data. The program's next step 462 is to obtain the current tape number and log it to a tape control table. (At the same time, the tape creation date and time, the number of records on the tape, the number of customers on the tape and the carrier ID are logged to the tape control table at 462.)

Next, in step 464 the system reads the "start customer" record which in itself is not the data but delimits the data belonging to a particular customer's billing information. The system then goes on to determine if an end of tape condition exists in step 466. If such a condition does not exist then in step 468 the program searches for the customer number in a customer table (CustTab). The program then in step 470 determines the disk type (5¼" or 3½") required for the particular customer by looking at the information in the aforesaid CustTab tables. The program then in step 472 checks the Loadr Tab (loader table) to obtain a proper loader number for the required size of target diskette, thus choosing between 5¼" loaders 98 and 106 on the one hand and 3½" loader 102 on the other hand. The program then in step 474 goes on to determine which loader (if there is a choice of two or more) has the smallest number of data files in its queue, and selects that one as a means of maintaining an even processing flow to the loaders.

The program in step 476 then reads a system parameters (SysParam) table to determine the next file control number (FCN), after which it updates the SysParam table. Afterward the program at step 478 copies the customer data to the disk file. In step 480 the program then adds a record to update a file control table; and in step 482 it produces a summary report of the transactions just described. If required, at step 484 it produces an error report. The program then loops back and reenters the program sequence at the start customer reading step 464, and recycles.

At step 466, if the determination is that there does exist an end-of-tape condition, then the program proceeds in step 488 to update the tape control tables (TapCnTab) and in step 490 to produce a summary report. If required, in step 492 it produces an error report. At this point, the routine described in FIG. 17 ends.

Figures 1, 18:
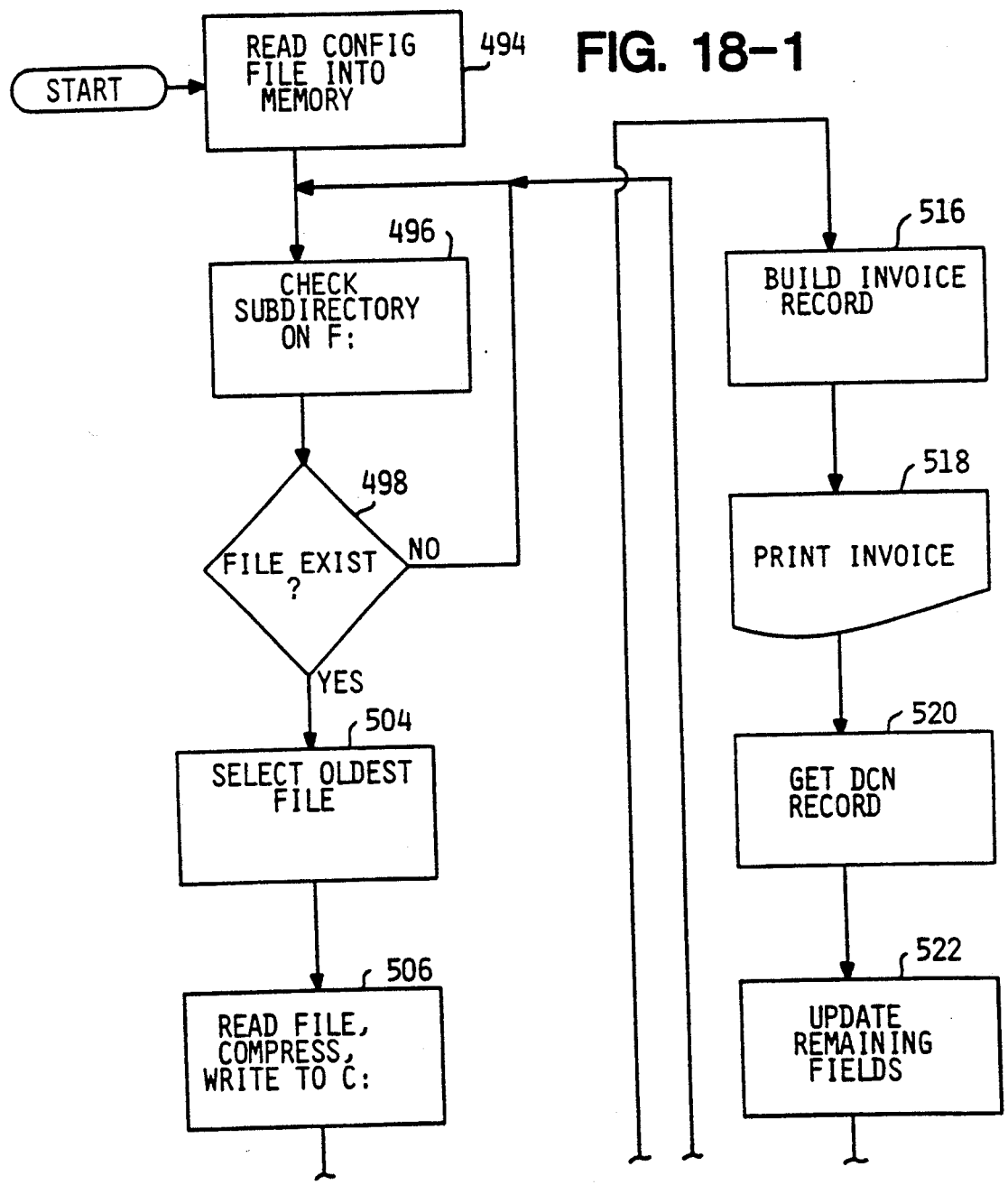
Figures 2, 18:
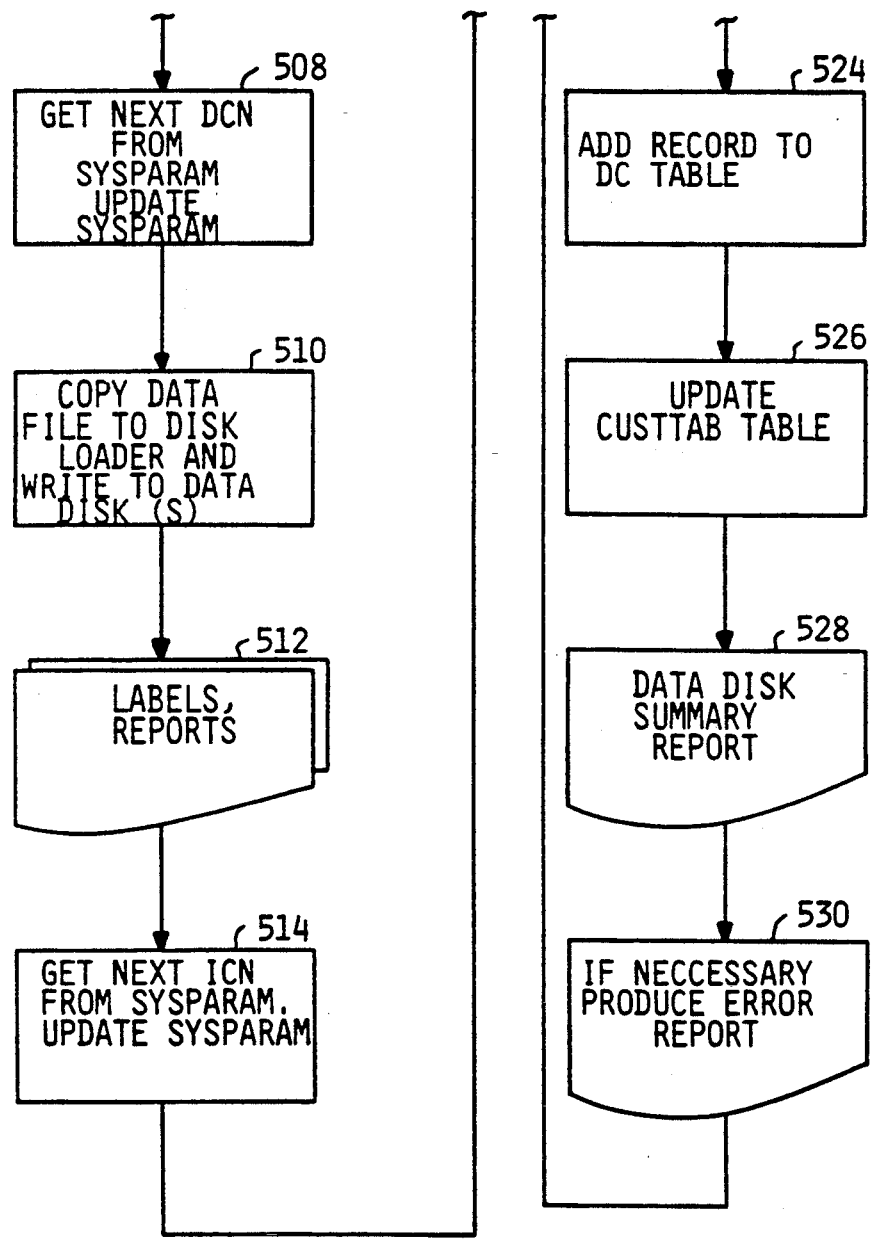

We now turn to FIGS. 18-1 and 18-2 which is a flow chart of the program referred to as SBPROC02, the loader control program used in the "PC processing" segment of FIG. 3. This loader control program begins its processing in step 494 by reading a configuration file into its memory. This enables the system to determine what is online and what are the requirements of the individual customer diskettes are. The program in step 496 then checks the appropriate subdirectory on the hard disk where the customer data file would be located, and performs a test 498 to determine if there is such a data file.

If the determination in step 498 is that the required data file does not exist, then the program loops infinitely back to steps 496 and 498 until it finds that such a file exists to be processed. By the use of this infinite loop, the system can continually poll or check to see if a file to be processed has been entered into the appropriate subdirectory.

If step 498 determines that such a file does exist, then the program in step 504 seeks out the oldest file in the appropriate directory, and in step 506 it reads and compresses that file and writes it to the local hard disk drive "C:". In step 508 it then gets the next available disk control number from the system parameters table (SysParam) so that it has the information necessary to format the target diskette in the appropriate manner. At the same time this operation updates the system parameter table by incrementing the disk control number by one.

The next program step 510 obtains a copy of the processing file created in step 506 above and copies that processing file to the disk loader in order to create the actual diskette data file. The program then at step 512 prints the disk labels and mailing labels. The next step 514 in the operation obtains from the system parameter (SysParam) tables the next available invoice control number and advises the system parameter table to increment the value by one.

The program then at step 516 creates the appropriate invoice record and prints a paper invoice at step 518 from which the customer can pay the telephone bill. Thereafter the program gets a disk control number (DCN) record (step 520), updates the fields of that record (step 522), and adds the record to a disk control (DC) table (step 524). It also updates the CustTab table mentioned previously (step 526), prepares a data disk summary report (step 528), and if necessary produces an error report (step 530). Thereafter the program loops back to reenter the subdirectory check step 496 and the described process is repeated as many times as necessary.

Figure 19:
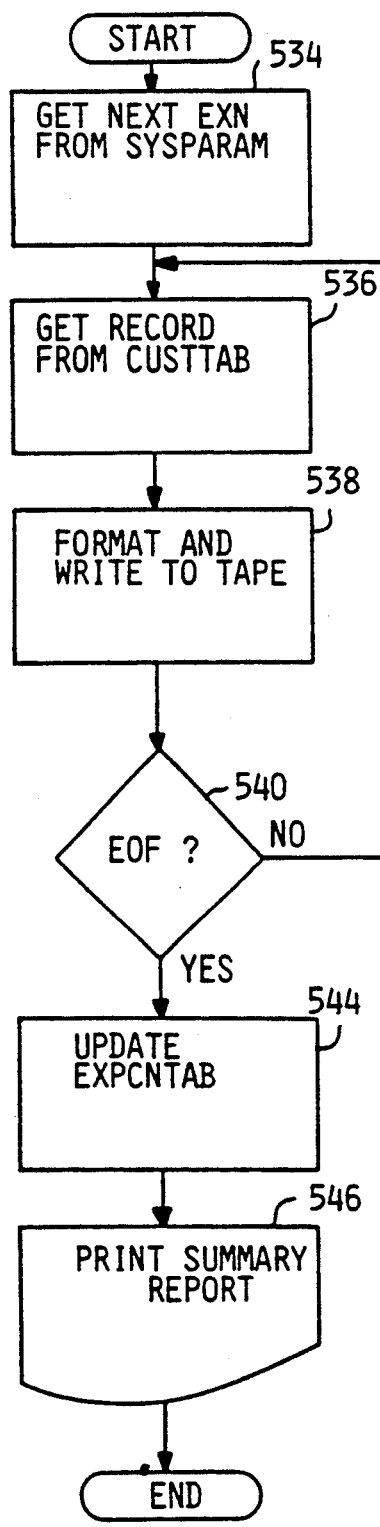
FIG. 19 is a flow chart of a program used in the "PC Processing" segment of FIG. 3 for creating a mainframe-readable export tape.

FIG. 19 is a flow chart of a program designated SBROC03 used in the "PC processing" segment of FIG. 3 for creating a mainframe-readable export tape. This is used by the mainframe processing system in updating its list of valid customers and producing the appropriate data streams for individual customer billing in future processing cycles. The program begins at step 534 where it reads the aforementioned system parameters (SysParam) table to determine what the next available export tape control (EXN) number is. It then obtains the next record from the aforementioned CustTab tables in step 536, reformats it and written to the export tape in step 538.

The program next looks for an end-of-file condition in step 540 and if the condition does not exist, it loops back to step 536, to get the next CustTab record. If the end of file condition is affirmative, however, the program in step 544 updates the export tape control tables (ExpCnTab) and in step 546 it prints a summary report of the export tape processing. This terminates the export tape routine.

PC Maintenance Program

We now turn to a program for updating the end-user program as changes in service conditions may require. This program is operated on the computers 88 or 90 of the network of FIG. 3 by the processor company whenever the needs of the telephone company or its subscribers require.

Figure 20:
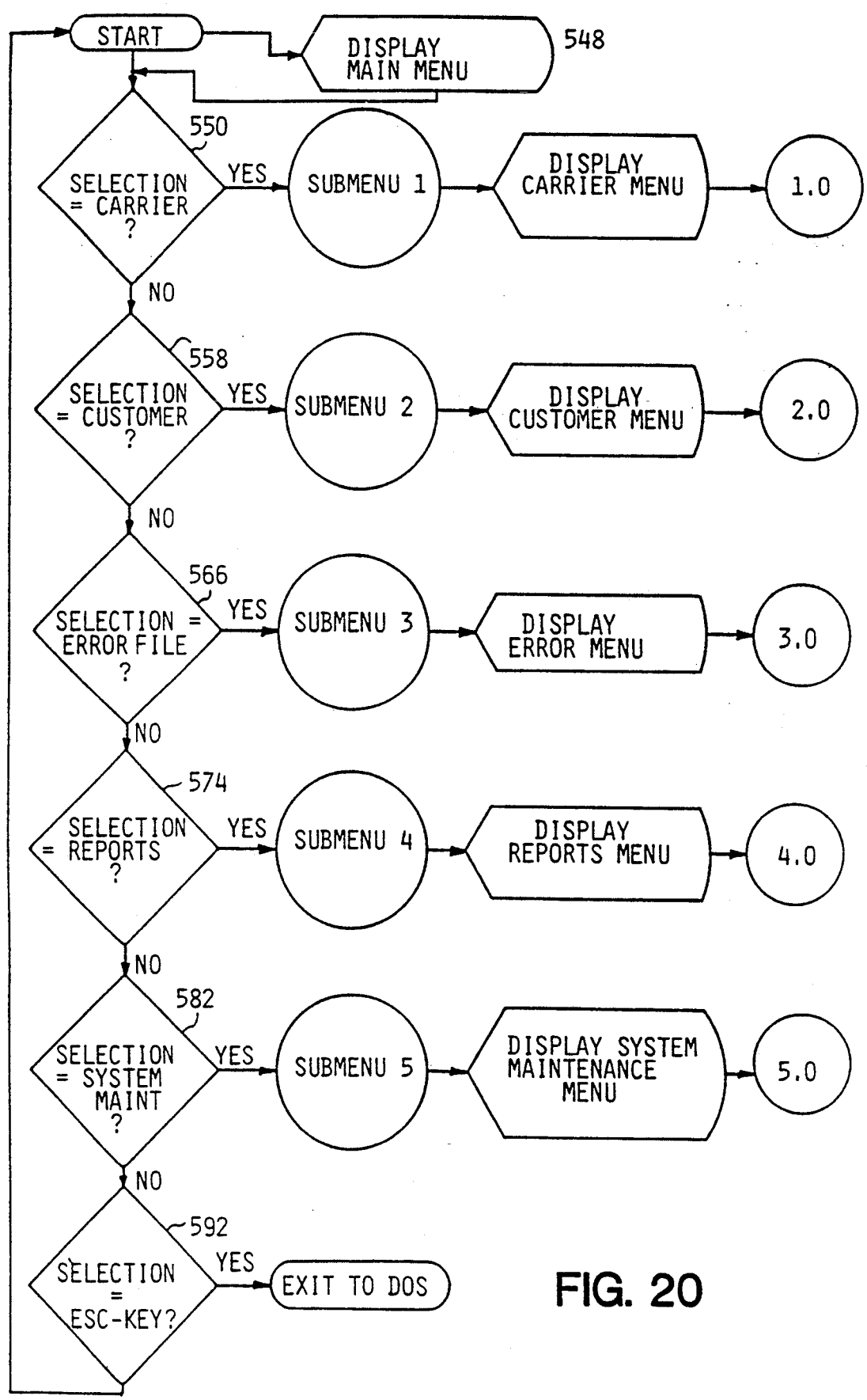
FIG. 20 is a flow chart of the "main-menu" section for a customer-service file maintenance program which can be used in the "PC Processing" network of FIG. 3.

FIG. 20 is a flow chart of the main-menu section for the above-mentioned file maintenance program. The program is menu-driven, and the main menu display 548 allows a determination of what areas the processor wishes to change. In steps 550, 558, 566, 574, 582 and 592 the program determines whether the operator has selected submenu 1 (the carrier menu), submenu 2 (the customer menu), submenu 3 (the error menu), submenu 4 (the reports menu), submenu 5 (the system maintenance menu, or chooses to exit to DOS (the IBM personal computer operating system), respectively. If none of the above are selected, the program loops back to the start and continues to search for an operator selection from the main menu. The submenu choices mentioned above lead to program jump points 1.0, 2.0, 3.0, 4.0 and 5.0 respectively which are traced to their appropriate program routines in the following discussion.

Figure 21:
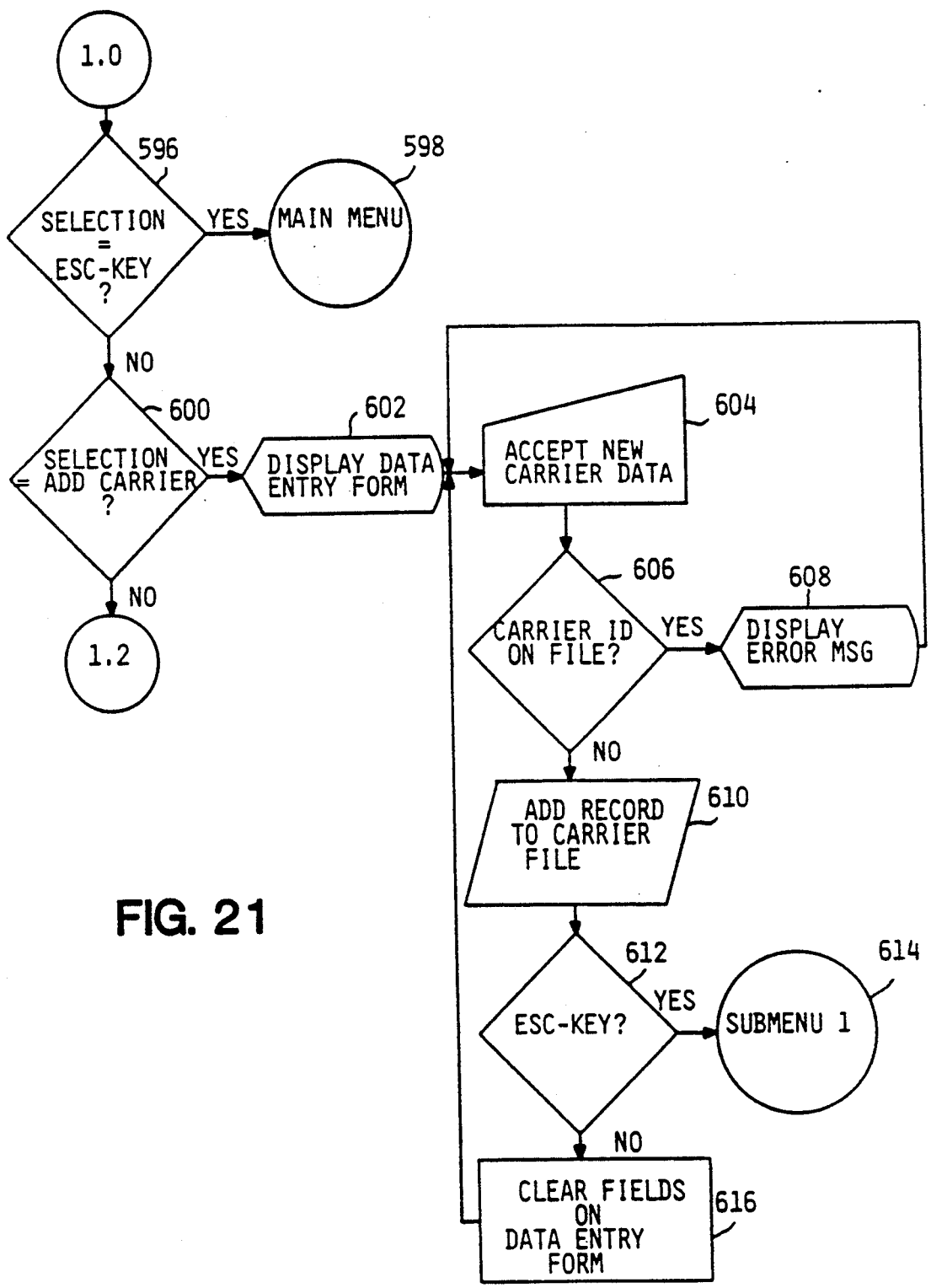
FIG. 21 is a flow chart of the "add new carrier" section for a customer-service file maintenance program of FIG. 20.

FIG. 21 is a flow chart of the "Add New Carrier" section for the file maintenance program. When the "Add New Carrier" submenu is invoked this routine is entered via program jump 1.0 from FIG. 20. At that point step 596 gives the operator the option of using the escape key on an IBM PC keyboard, and if that key is invoked then the operator is returned to the main menu of FIG. 20 as indicated at step 598. If the escape key is not invoked, then the operator instead may invoke the add-carrier function key, whereupon program step 600 which will produce a data entry display 602 on the video screen.

If the operator inputs new information into the display 602, the program will determine in step 606 if the new information has a proper carrier ID. If there already exists a carrier ID on file for the new carrier, then the system will display an error message 608 indicating that fact, and the program loops back to step 604 for reentry of the information. If there is no carrier ID on file as determined in step 606, then the program at step 610 will display a query message "Add Record to Carrier File?" If in response to that query message an escape key is actuated, then at step 612 the program will return to submenu 1. If, on the other hand, in response to the "Add Record To Carrier File?" prompt, some other action is taken by the operator, the files will be updated accordingly. In addition, in step 616 the fields of the data entry form 604 will be cleared and the program will back to step 604 to accept further manual data input.

Figure 22:
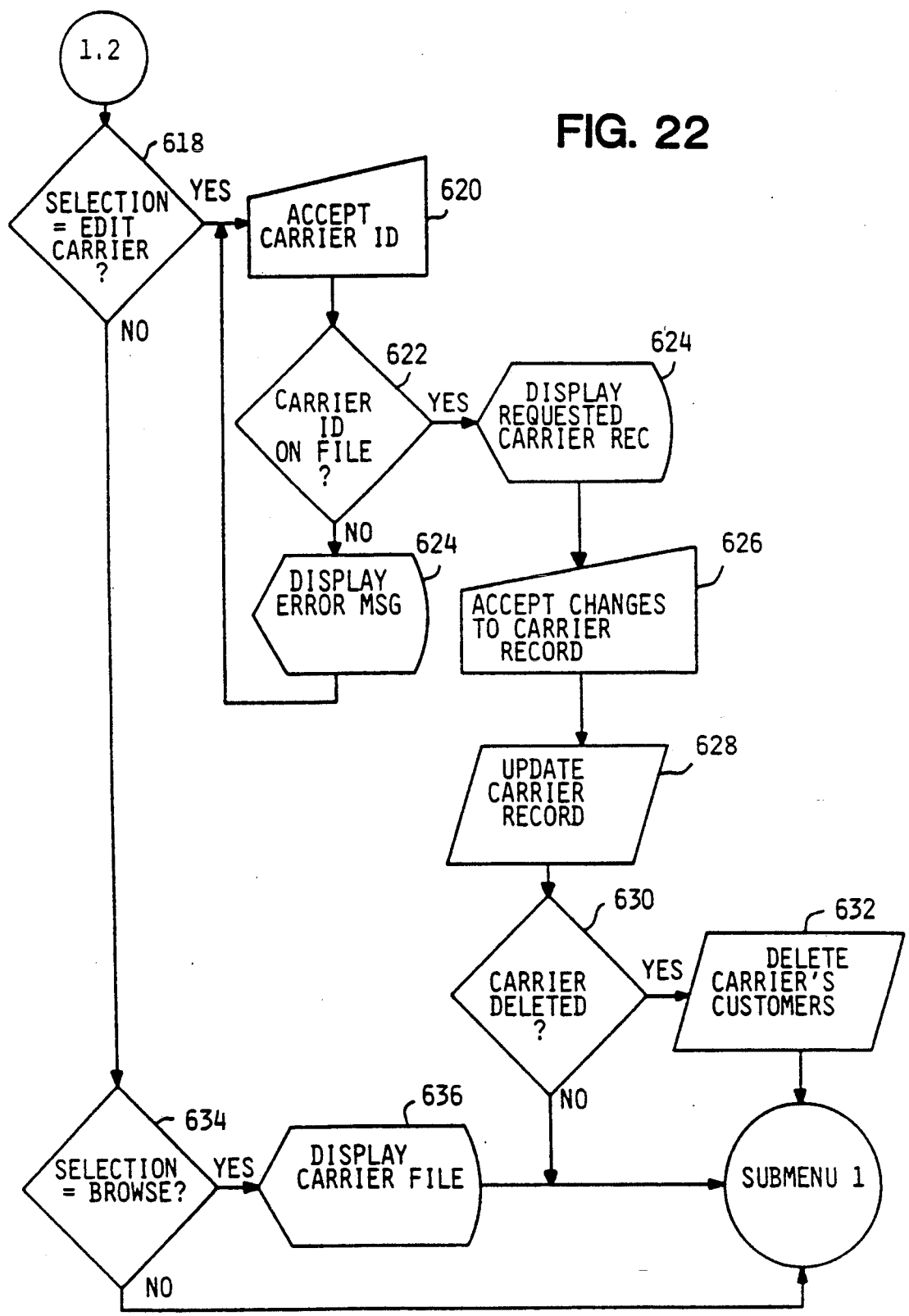
FIG. 22 is a flow chart of the "edit existing carrier" section for the customer-service file maintenance program of FIGS. 20 and 21.

If the operator selects some action other than the add carrier function in step 600, the program exits at point 1.2 to go to another routine illustrated in FIG. 22. The latter figure is a flow chart of the "Edit Existing Carrier" section for the file maintenance program. Another option 618 on the carrier submenu is editing the carrier information. If the operator chooses this option, the program in step 620 asks if the operator wishes to choose a carrier ID which is already on file. The program then determines in step 622 if the chosen carrier ID is in fact on file. If not, the program in step 624 will display an error message and loop back to step 620 to ask again if the operator wishes to use an old carrier ID.

But if at step 622 it is determined that the selected carrier ID is already on file, then the program in step 624 displays the relevant carrier record, and at step 626 asks the operator for any changes to the carrier record. It then updates the carrier record in step 628. If the carrier is to be deleted, the program in step 630 queries the user, and upon receiving an affirmative answer, then in step 632 it carries out the deletion and loops back to submenu 1. If the result of step 630 is in the negative, indicating that the carrier is not to be deleted, the program will also return to submenu 1.

It the edit carrier query of step 618 is answered in the negative, in step 634 the program will ask whether the operator wishes to browse through the carrier files. If the user responds negatively, then the user is returned directly to submenu 1. If the answer is affirmative, then the program in step 636 will display the information contained in the carrier file. When the operator finishes browsing through the carrier file, exit is to submenu 1.

Figure 23:
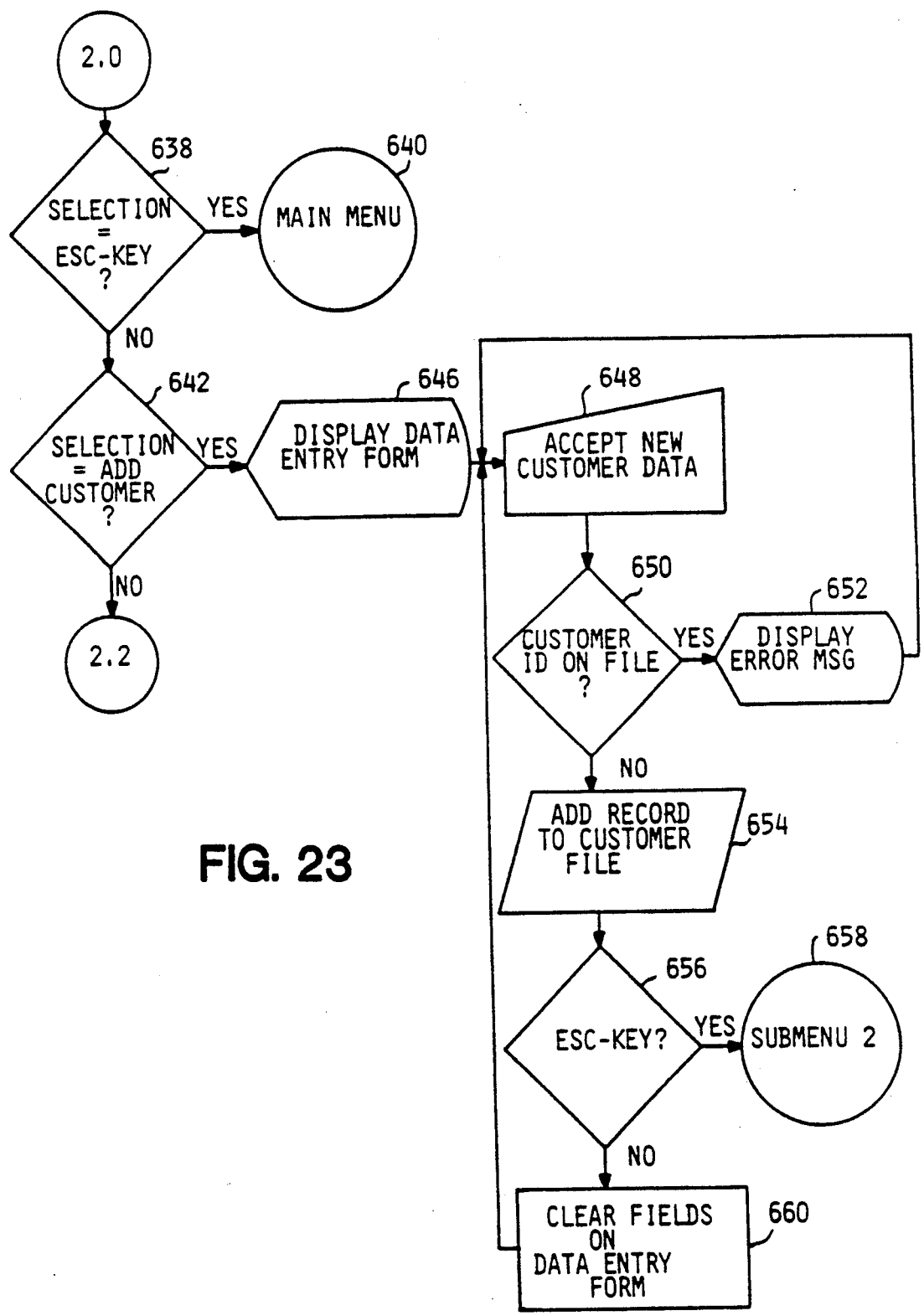
FIG. 23 is a flow chart of the "add new customer" section for the customer-service file maintenance program of FIGS. 20-22.

FIG. 23 is a flow chart of the "Add New Customer" section of the file maintenance program used in the "PC Processing" network of FIG. 3. This routine is entered from program point 2.0, which represents a jump from program point 2.0 of FIG. 20. The first determination made by the system at step 638 is whether the operator wishes to exit the display customer menu. An affirmative answer, indicating by invoking the escape key, results in a return to the main menu (step 640). Should the operator choose to invoke some other key, then the "Add Customer" query is displayed in step 642. If the operator does not choose the "Add Customer" option, then the program jumps at 2.2 to the "Edit Existing Customer" section of the file maintenance program, which is discussed below in connection with FIG. 24.

If the operator chooses the "Add Customer" option offered in step 642, then the appropriate data entry form is displayed in step 646. Then is step 648 the system accepts the new information entered into the data form and in step 650 proceeds to check whether the new customer identification number is already on file. If so, then an error message is sent to the display in step 652 and the program loops back to step 648 to accept new data entry once again. If the new customer ID is not already on file, then the program will proceed in step 654 to add a record to the customer file.

The program in step 656 then offers the operator an option to escape from the current submenu and return to submenu 2 in step 658 if the operator invokes the escape key. Otherwise, the program in step 660 will clear the fields on the data entry form and loop back to step 648 for the acceptance of additional new customer information.

Figure 24:
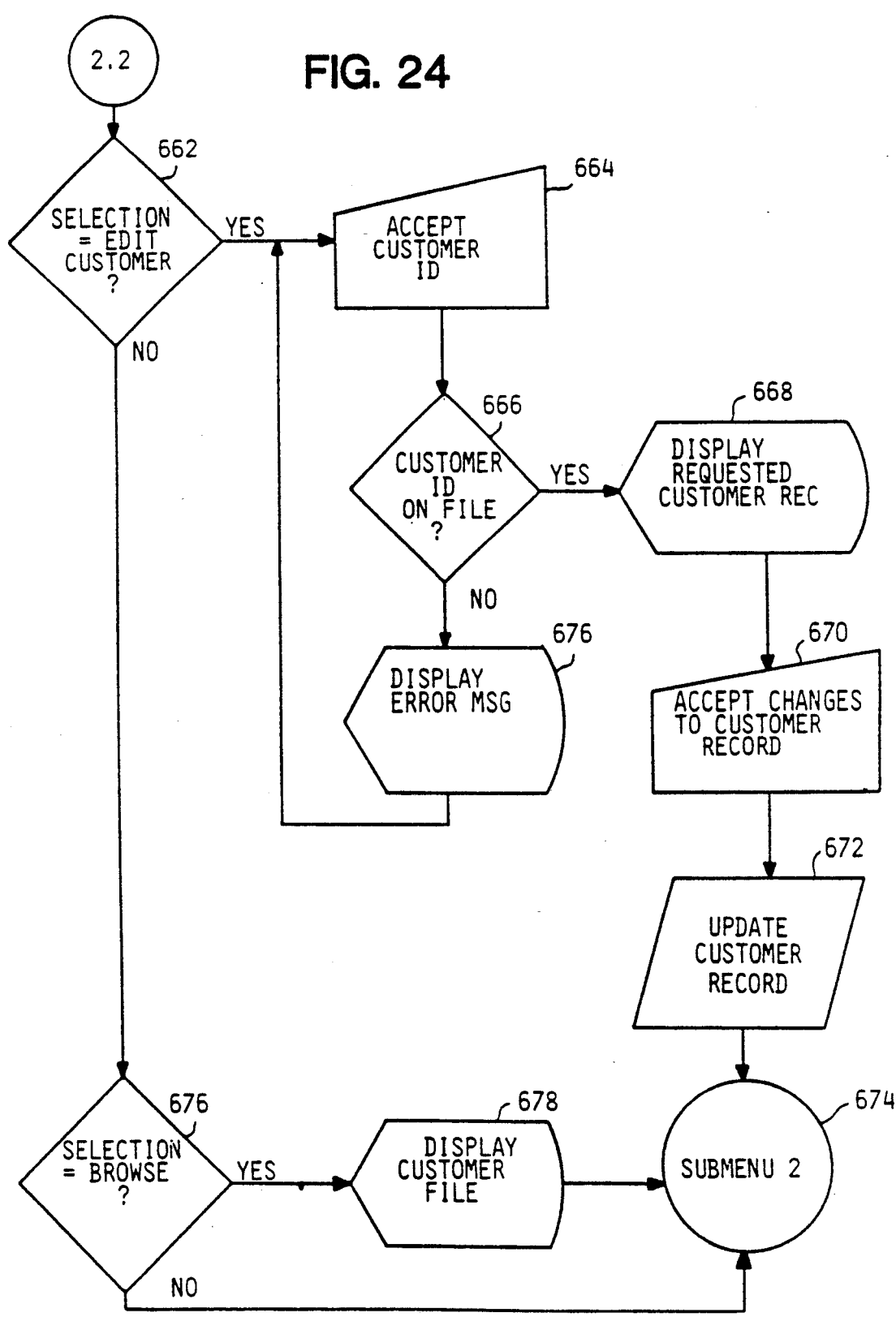
FIG. 24 is a flow chart of the "edit existing customer" section for the customer-service file maintenance program of FIGS. 20-23.

FIG. 24 is a flow chart of the "Edit Existing Customer" section for the customer service file maintenance program. It is entered through program jump 2.2 from FIG. 23 just described. Where the operator invokes the "Edit Customer" option of the customer submenu offered in program step 662, then the program at step 664 accept new customer ID information. The new customer ID information is then evaluated by the program at step 666 and a determination is made as to whether there is already such a customer ID on file. If there is, the appropriate existing customer record is displayed at step 668. Then at step 670 the program accepts changes to the relevant customer record and at step 672 the record is updated. The program then returns to submenu 2 in step 674.

But if at step 666 the customer ID is found not to be on file, the program displays an error display message to that effect and the program then returns to step 664 for the entry of valid new customer ID data.

If at step 662 the operator does not select the edit customer option step 676 offers an option to browse through the customer information file 678 (step 678). After browsing is completed, or if the browse option is refused, the program exits to step 674 and redisplays submenu 2.

Figure 25:
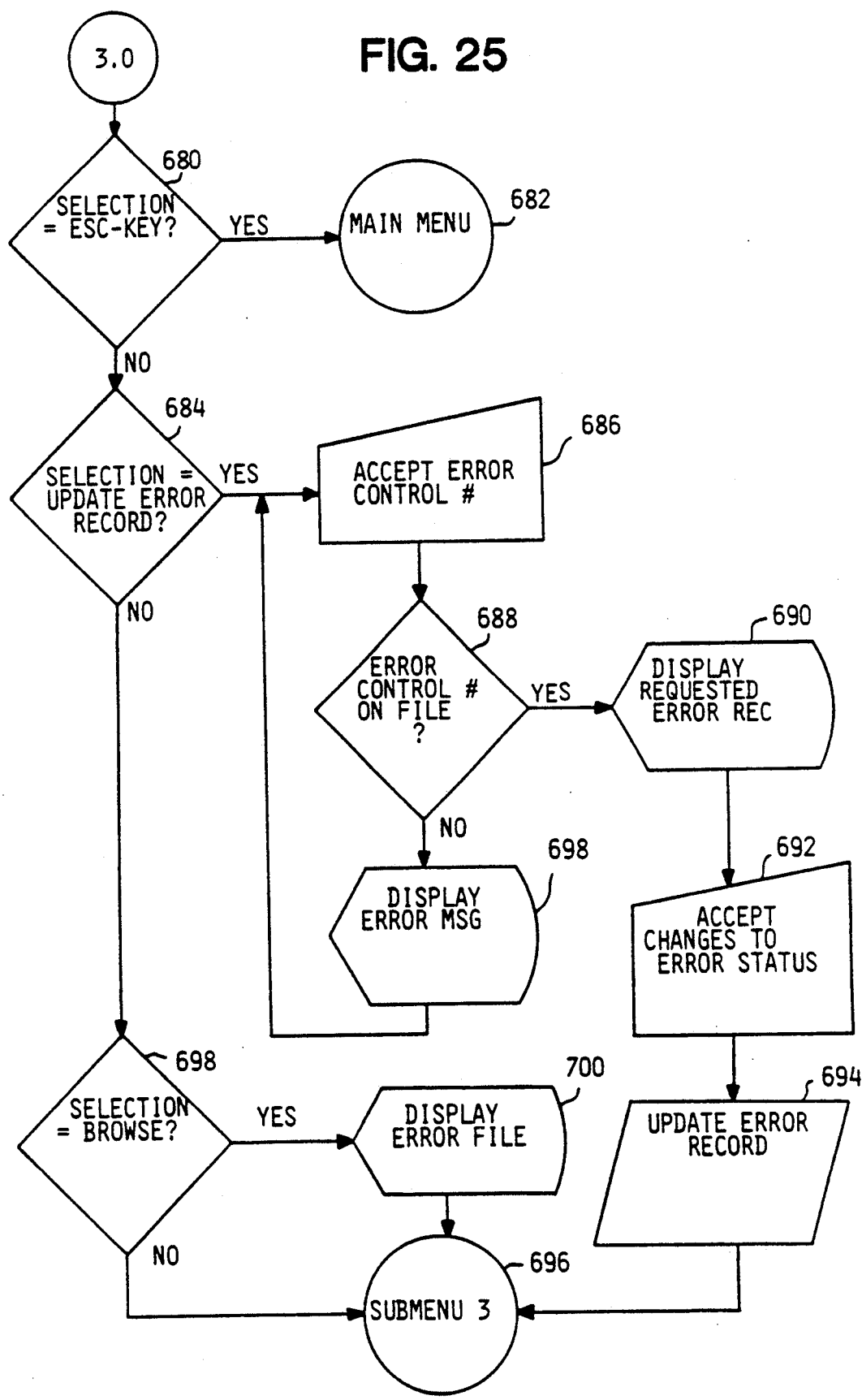
FIG. 25 is a flow chart of the "display errors" section for the customer-service file maintenance program of FIGS. 20-24.

FIG. 25 is a flow chart of the "Display Errors" section for the file maintenance program. It is entered through program jump 3.0 from FIG. 20 described above. The program first determines in step 680 if the operator wishes to return to the main menu (step 682), a selection which is invoked by means of the escape key. If the operator chooses some other option, the program at step 684 asks whether the operator wishes to update an error record. If the operator chooses to do so, then the user is presented by program step 686 with an opportunity to input an error entry control number. The system then determines at step 688 if the error control number is on file. If it is, at step 690 the requested error record is displayed. The program then at step 692 affords the operator an opportunity to changes to the error status. If such changes are made, then the program at step 694 updates the error record. At the end of the error record update, the program exits to submenu 3 in step 696.

If in step 688 the determination is that there is no such control number on file, then an error message is displayed in step 698. The program then returns to step 686 for correct entry of error control numbers.

If the operator chooses not to update an error record in step 684, the operator is given an option in step 698 to invoke the browse function for the error file display. If that option is exercised, then in step 700 the error file display is actuated. Afterwards, or if the user does not choose, in step 698 to select the browse function, the program returns to submenu 3 in step 696.

Figure 26:
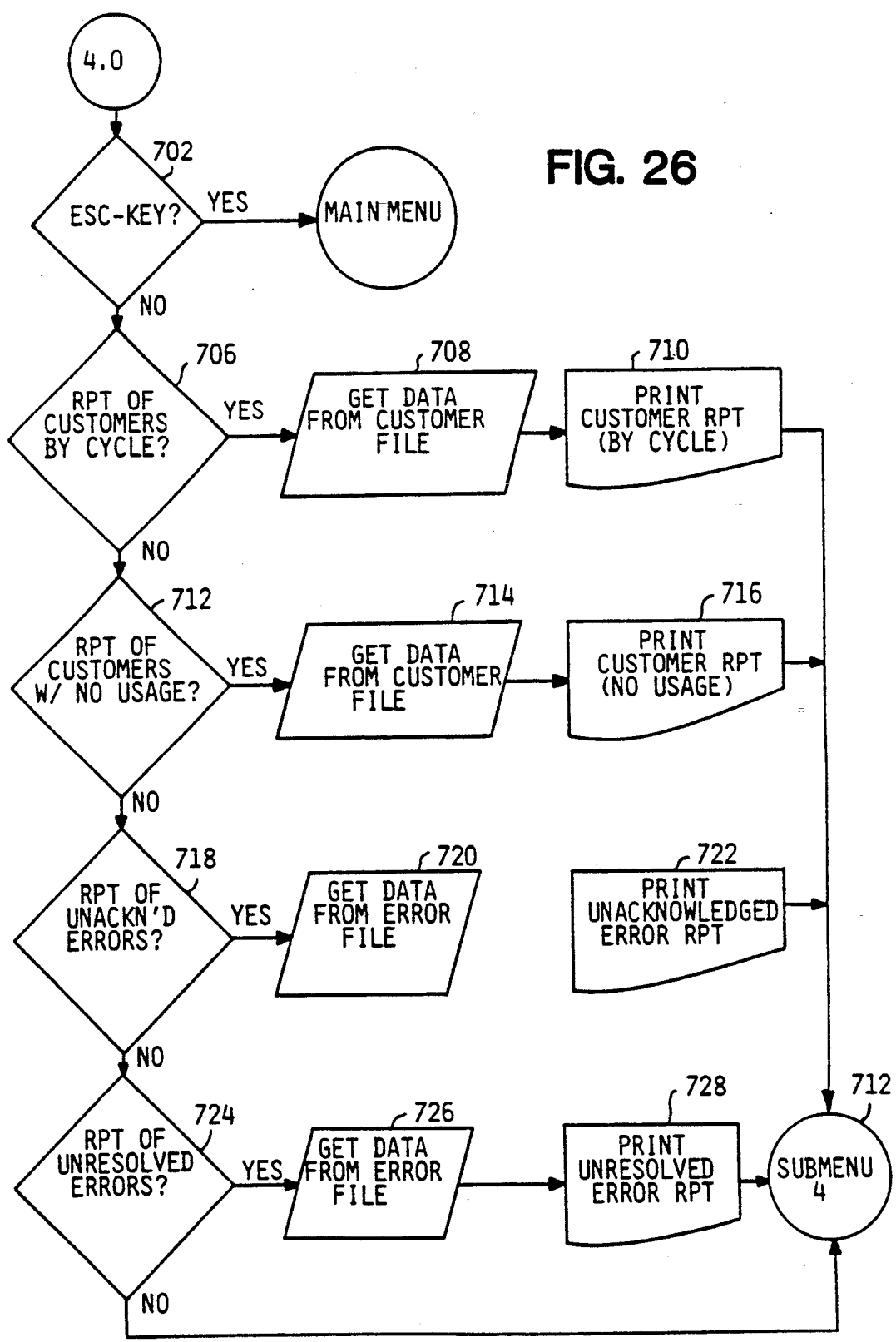
FIG. 26 is a flow chart of the "display reports" section for the customer-service file maintenance program of FIGS. 20'25.

FIG. 26 is a flow chart of the "Display Reports" section for the file maintenance program. The program is entered by program jump 4.0 from FIG. 20. In step 702 it presents an option to exit to the main menu if the escape key is invoked. Otherwise the operator is presented in step 706 with an option to select the report of customers by cycle. If that function is invoked, then the program in step 708 will get the data from the customer file and print it out as a document 710. The program then returns to submenu 4 at step 712.

If the operator elects not to invoke the report of customers by cycle at step 706, then step 712 present the option of obtaining a report of customers with no usage. Should the operator invoke that function, the program at step 714 will get the data from the customer file and print out a customer report 716. The program will then go to submenu 4 in step 712.

Should the report of customers with no usage functionality not be invoked in step 712, then the next menu option will be the report of unacknowledged errors in step 718. If the operator invokes that selection, then the program will at step 720 obtain the data from the error file and in step 722 will print the unacknowledged error report. The program will then again return via step 712 to submenu 4.

Should the user not choose to invoke the report of unacknowledged errors in step 718, there is the remaining option of creating a report of unresolved errors in step 724. If that option is invoked, then the program in step 726 obtains the information from the error file, sends it to a printer to print an unresolved error report 728, and then returns to submenu 4 in step 712. If none of the available functions are not invoked, then the program will return directly to submenu 4.

Figure 27:
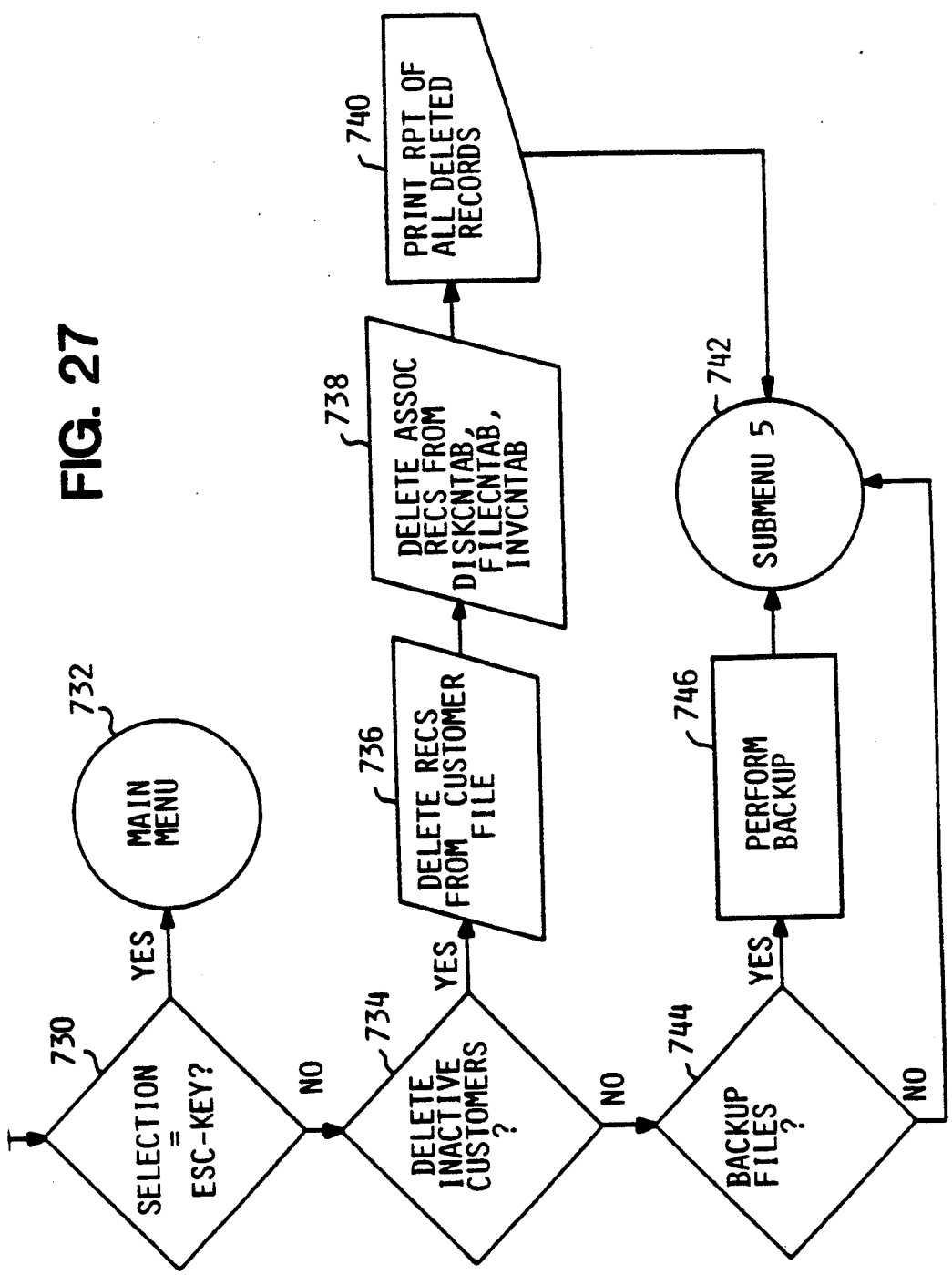
FIG. 27 is a flow chart of the "system maintenance" section for the customer-service file maintenance program of FIGS. 20-26.

FIG. 27 is a flow chart of the "System Maintenance" section of the file maintenance program. It is entered through program jump 5.0 from FIG. 20. This module first presents an option in step 730 to return to the main menu by actuating the escape key. If the operator does not exercise that option, the other choice is presented at step 734 to delete inactive customers. If that option is chosen, then the program at step 736 will delete the inactive records from the customer file and at step 738 will delete the associated records from the disk control table (DiskCnTab), the file control table (FileCnTab), and the invoice control tables (InvCnTab). In step 740 a report will then be printed of all of the deleted records. The program then returns to submenu 5 in step 742.

If the operator chooses not to invoke the Delete Inactive Customers function, there is a further option in step 744 of determining whether to perform a backup of files. If that option is invoked, then the program in step 746 performs the backup. After, or if that option is not chosen at step 744, the program returns to submenu 5 at step 742.

End-User-Application Program

We turn next to the "User Application" program summarized in FIG. 4, i.e. the program which is run by the end-users (telephone customers) on their own personal computers to analyze their telephone bills in accordance with the capabilities of this invention.

Figures 1, 28:
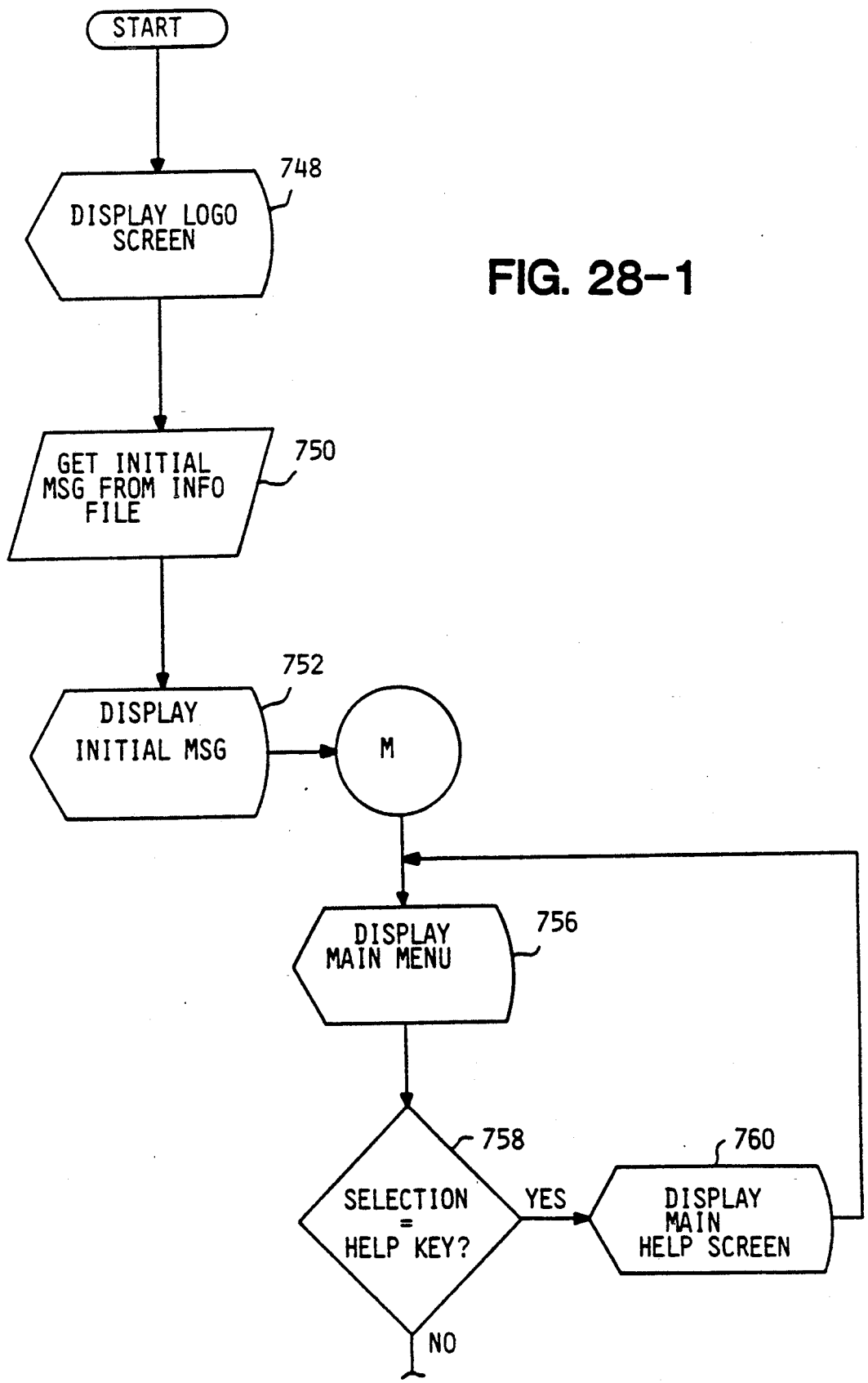
Figures 2, 28:
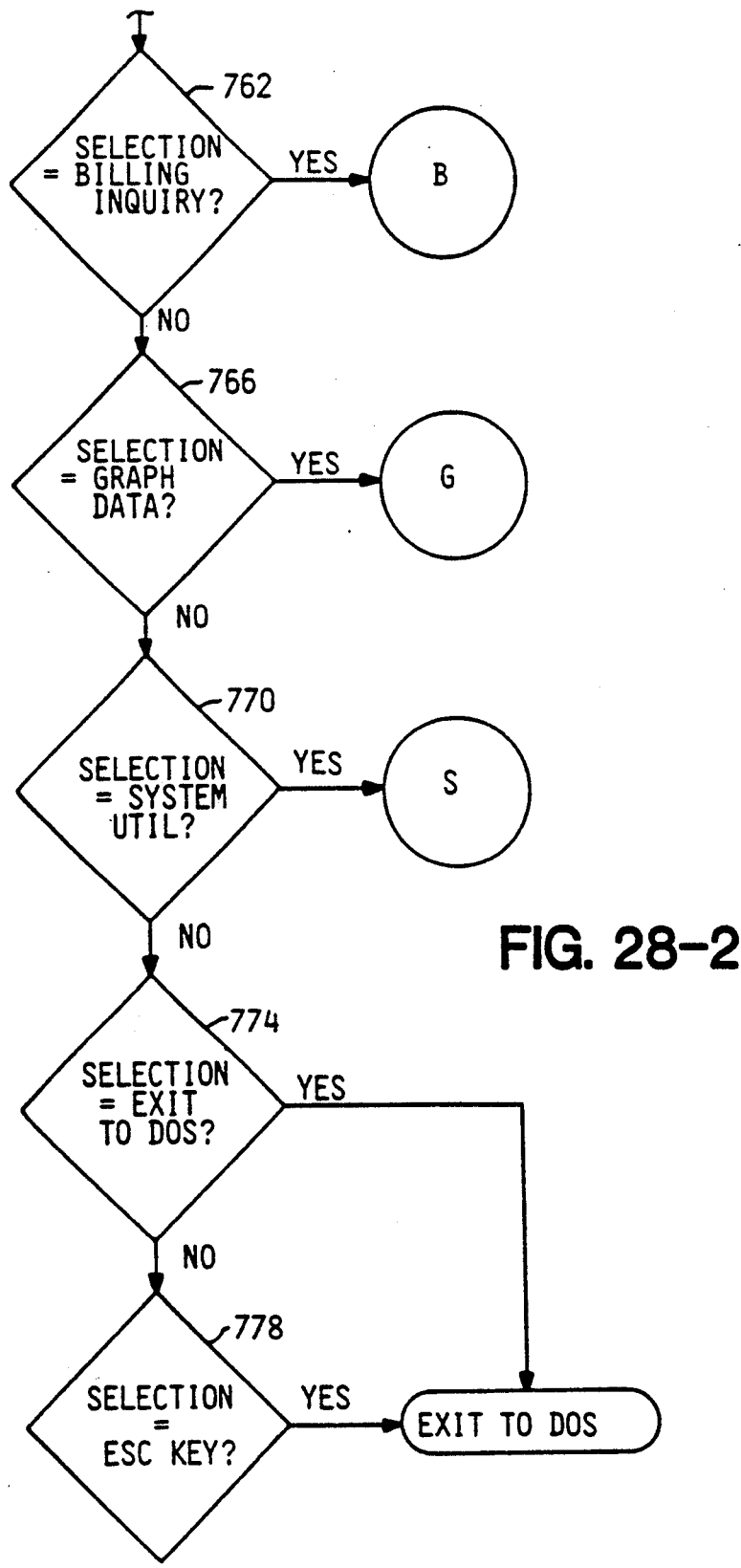

FIGS. 28-1 and 28-2 are a flow chart of the "Main Menu" section for the user application program, which begins with a sign-on screen display 748 of the publisher's logo and copyright notice. The program then in step 750 fetches an initial message or startup screen or the like from an information file, and in step 752 displays it on the monitor.

Ignoring for the moment a program entry point M, which will be discussed later, the program in step 756 then displays the main menu of end-user choices. The first option available for selection on this menu level is a help key. If that key is invoked at step 758, then at step 760 the program will display the main help screen for this segment of the end-user processing program, and then loop back to step 756. Should the end-user not invoke the help key, the next possible selection, presented by step 762, is a billing inquiry. When this option is selected, the program will send the end-user to the billing inquiry submenu via program jump B which leads into FIGS. 29-31, discussed below.

If the end-user should not choose the billing inquiry, the next choice available (step 766) is a graph data function. If the end-user makes this choice, he or she will then be taken into the graph data menus of subsequently discussed FIGS. 32-34 via program jump B.

Otherwise in step 770 the user may next select a system utilities option. If that selection is invoked, then the user application program will be taken to a system utility menu via program jump S leading to FIGS. 35-1, 35-2, 36-1 and 36-2, discussed below.

The next available selection is in step 774 which permits the user to exit to DOS, the operating system of the user's personal computer. If the user chooses to invoke that selection, he will be taken into the operating system directly 776, and if the user chooses instead to invoke the escape key to reject all of the preceding choices, then in step 778 the program will also exit to the operating system.

Figures 1, 29:
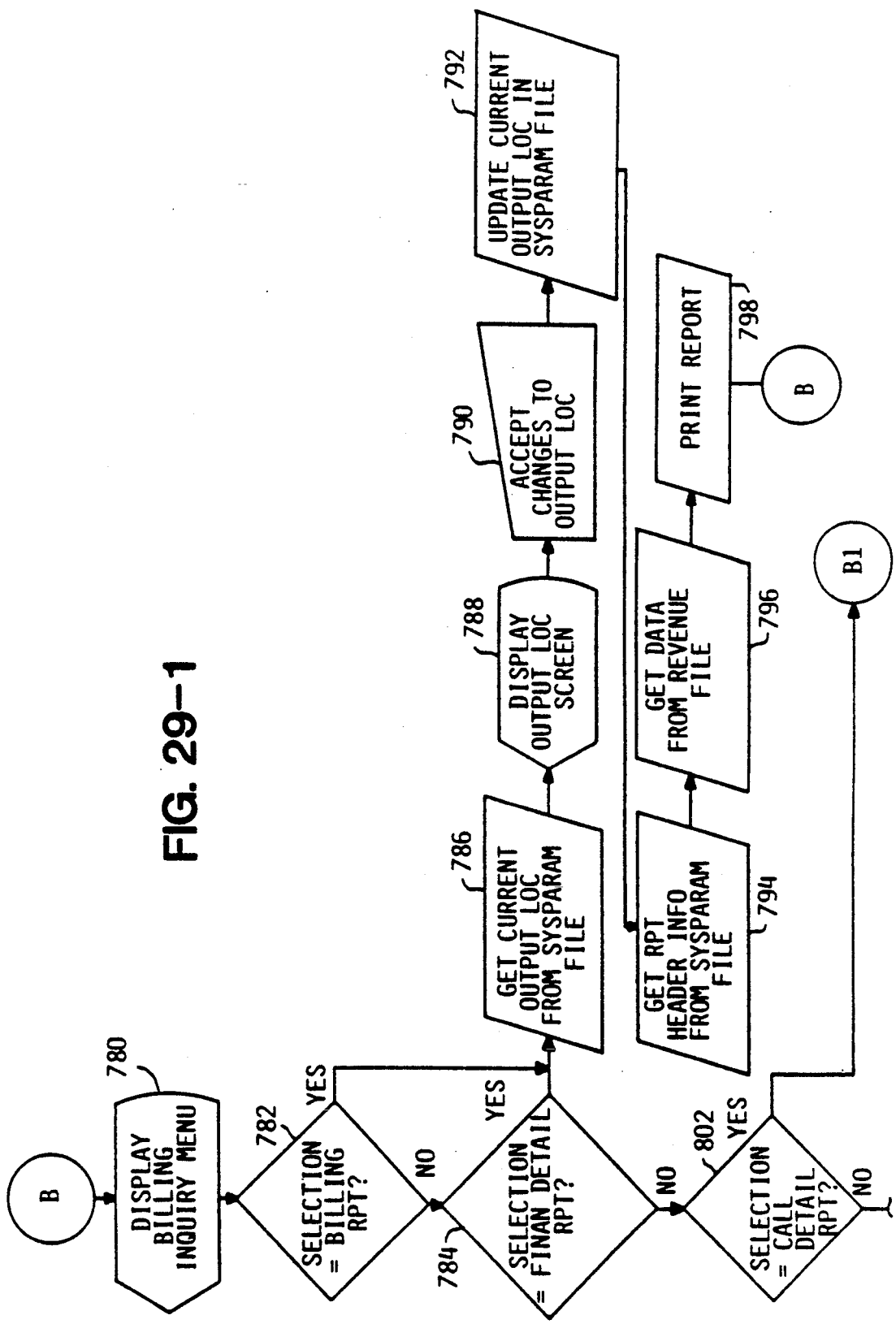
Figures 2, 29:
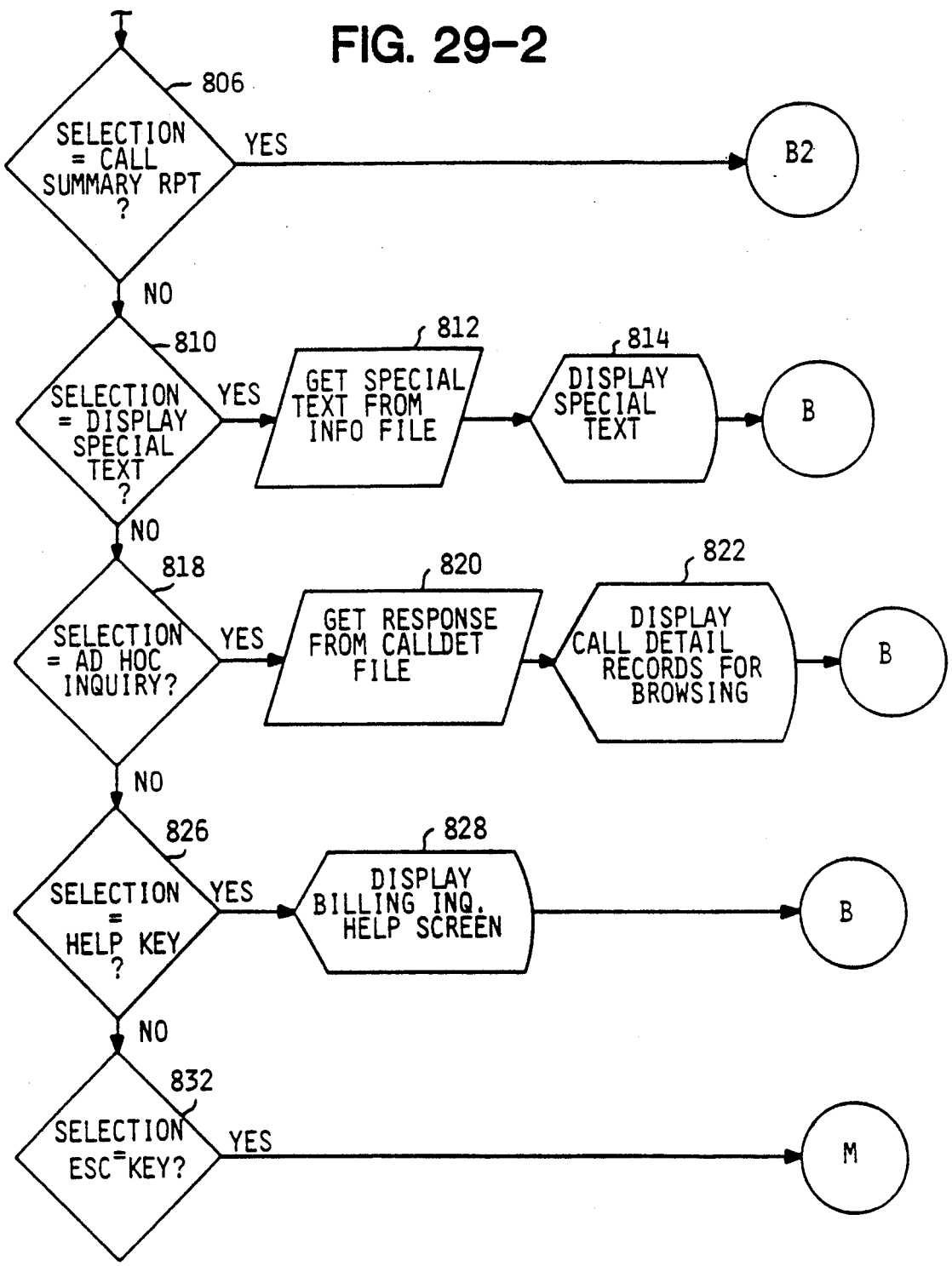

FIGS. 29-1 and 29-2 are the first of five flow charts dealing with the "Display Billing Inquiry" section for the "User Application" program of FIG. 4. It is entered via program jump B from FIG. 28, and begins in step 780 with display of a billing inquiry menu. This menu offers the user the choice of eight options: billing report, financial detail report, call detail report, call summary report, call summary report, display special text, ad hoc inquiry, help, and escape; which are implemented by program steps 782, 802, 806, 810, 818, 826 and 832 respectively.

The billing report option of step 782 and the financial detail report of step 784 are similar in their operation, differing only as to what information is extracted from the available databases for billing and for financial detail. After the user chooses either of these options, the program in step 786 reads from the system parameters (SysParam) file the currently selected output location (i.e., to the screen, to disk, to the serial port, to the parallel port) for the billing or financial detail report, and in step 788 the program then displays the current output location to the screen. The program in step 790 will then accepts any changes to the output location, and in step 792 updates the current output location in the SysParam file to make that the new default output location.

Depending on whether the selection of step 782 or that of step 784 was made, the program at step 794 will then get the appropriate report header information from the SysParam file layout and the appropriate data from the revenue file for either the billing report or the financial detail report. The appropriate information is then sent in step 798 to be printed (although if a disk file or the screen had been chosen as the output location in step 786 it would have been written to disk or to the monitor respectively). At the end of step 798 the program returns via program jump B to initial step 780 in order to redisplay the billing inquiry menu.

If the call detail report is chosen at step 802, program jump B1 goes to the call detail menu of FIGS. 30A-1 and 30A-2, discussed below. Should the user select the call summary report at step 806 then it takes jump B2 to the call summary menu of FIG. 31A.

Step 810 offers a special text option. As presently contemplated, there are three types of special text, but there could be any number. The purpose of the special texts is to provide the system with the same features as a written bill. Standard preambles or preliminary messages may be added to the billing information in the same manner as they appear on paper bills. In addition, an epilogue might be added to the end of the bill text to advise customers of the late status of their account. Other types of material such as banners, headers, footers or textual material might also be added to make the bill more informative and flexible in the manner of a conventional bill. Such special information could be added to the bill by the individual subscriber upon request of the processor or the carrier.

If the user selects the option of step 810, then in step 812 the program gets the special text from an information file and in step 814 displays it on the screen. Then the program returns via jump B to step 780 in order to redisplay the initial billing inquiry menu.

When the user invokes the special ad hoc inquiry option of step 818, at step 820 the program gets the necessary records from the call detail (CallDet) file and in step 822 it displays these records for browsing by the end-user at 822. Afterward, it returns via program jump B to step 780 to redisplay the billing inquiry menu.

If the help function of step 826 is invoked, the program in step 828 will display the billing inquiry help screen, after which it again returns via program jump B to step 780 to redisplay the billing inquiry menu.

The final selection from the billing inquiry menu is the escape key, whereupon step 832 return to the main menu of FIG. 28 via program jump M.

Figures 1, 30A:
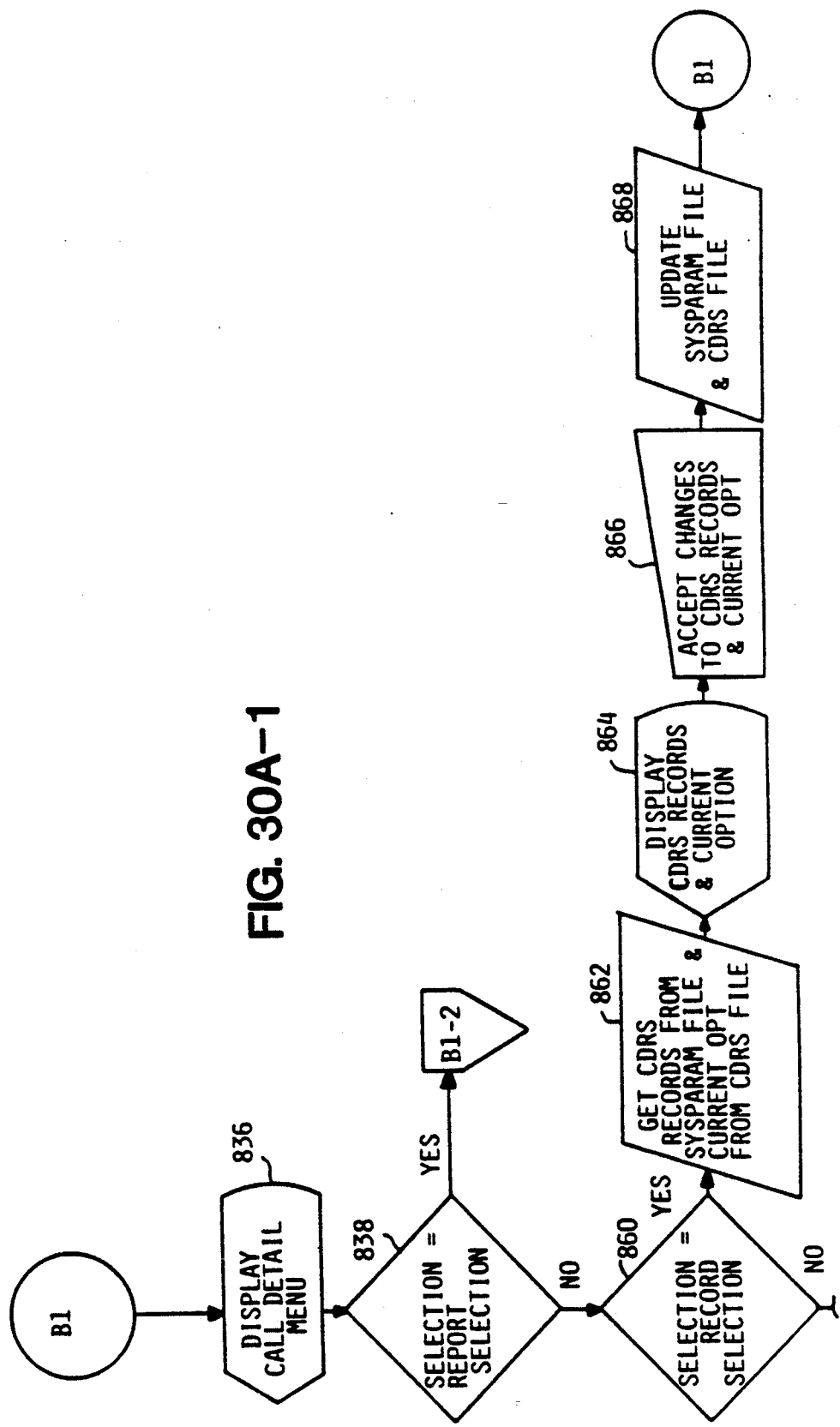
Figures 2, 30A:
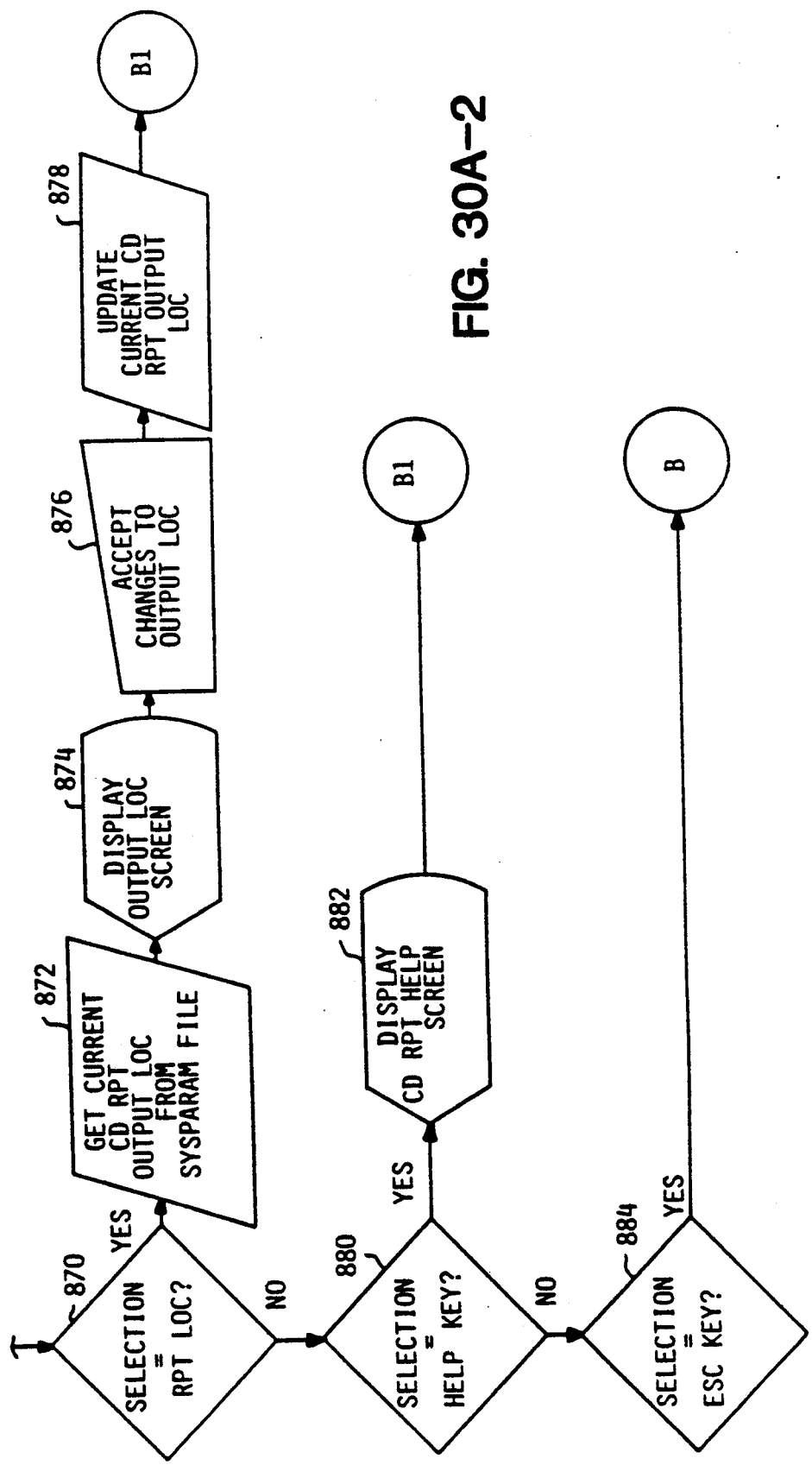

FIGS. 30A-1, 30A-2, 30B-1 and 30B-2 are flow charts of the "Display Call Detail" subsection of the "Display Billing Inquiry" section for the "User Application" program of FIG. 4. The segment represented by FIG. 30A-1 and 30A-2 are entered by way of program jump B1 from FIG. 29, previously discussed, and begins in program step 836 with display of a call detail menu. The options presented to the user by this menu include the report selection function of step 838. If the user actuates that function the program will take program jump B1-2 to FIGS. 30B-1 and 30B-2.

Turning our attention now to that figure, program jump B1-2 leads to step 840 which displays a report selection menu. Then at step 842 the program tests to determine whether one of the reports offered by that menu has been selected. If a report has not been selected and the user invokes the escape key, the program step 844 returns via program jump B1 to FIG. 30A.

If in step 842 the user should select a particular report, then step 846 the appropriate report header data is obtained from the SysParam file so that the report can be properly formatted. The program then in step 848 obtains the current option and report number from a call data record selection (CDRS) file. The option number designates the type of report format requested by the user, and in particular designates how much of the available information is to be included in the report. An option number of "1" specifies that all of the available information is to be put in a single file, while higher numbers specify that the report is to be broken into several smaller files. The report number is a numerical file name for each of the file(s) containing the report which is to be written to disk.

Accordingly, in step 850 the program tests whether the current option number is greater than 1. If not, then all the available information is to be included in a single file, and the program goes immediately to step 852 where it sorts the call detail records. But if the option number is greater than 1, then a plurality of files must be written to disk under distinct file names (report numbers). In that case step 852 increments each previous report number by 1 and step 854 updates the current report number in the CDRS file so that numerically distinct file names are assigned to each of the several report files which are written to disk. Thereafter in step 855 the program reads the data selection criteria corresponding to the user's choice from the SysParam file, and in step 856 it selects from the call detail file the records designated by those criteria and sends them on for performance of the previously mentioned sort step 852.

After sort step 852, in step 857 the program gets the call detail report output location, i.e., monitor, printer, disk, etc. is determined from the system parameter file. Then, as before, the report is passed on to step 858 in which the system prints the call detail report to the designated device (location).

Returning now to FIG. 30A-1 and 30A-2, the negative branch of test 838 leads to program step 860 which tests whether the selection from the call detail men of step 836 is the record selection. If so, the program in step 862 then gets the call detail record selection (CDRS) records and the current option number from the system parameter (SysParam) file. This information is then displayed on the screen in step 864, and in step 866 the program accepts an changes the user chooses to make in the displayed information. Finally, in step 868 the SysParam and CDRS files are updated and the program returns via jump B1 to the entry point of FIGS. 30A-1 and 30A-2.

The report location menu option in step 870 permits the user to determine what device, i.e., monitor, screen, export file, printer, disk file, etc. should be the destination of the report to be generated by this area of the program. If this option is chosen, then in step 872 the program gets the current call detail (CD) report location from the SysParam file, and in step 874 the program displays the current output location on the screen, and the user is prompted to make any changes. In program step 876 the program accepts any changes to the report output location, and in step 878 it updates the corresponding information in the call detail report output location records. The program then returns via jump B1 to the display call detail menu at the entry point of FIGS. 30A-1 and 30A-2.

In program step 880 the user may select the help key. If the help key is selected, then in step 882 the call detail report help screen is displayed and the program then returns via jump B1 to the entry point of FIGS. 30A-1 and 30A-2.

The last option available on the menu of FIG. 30A is the selection of the escape key in step 884. Should that key be actuated the program returns via jump B to the entry point of FIG. 29.

Figures 1, 31A:
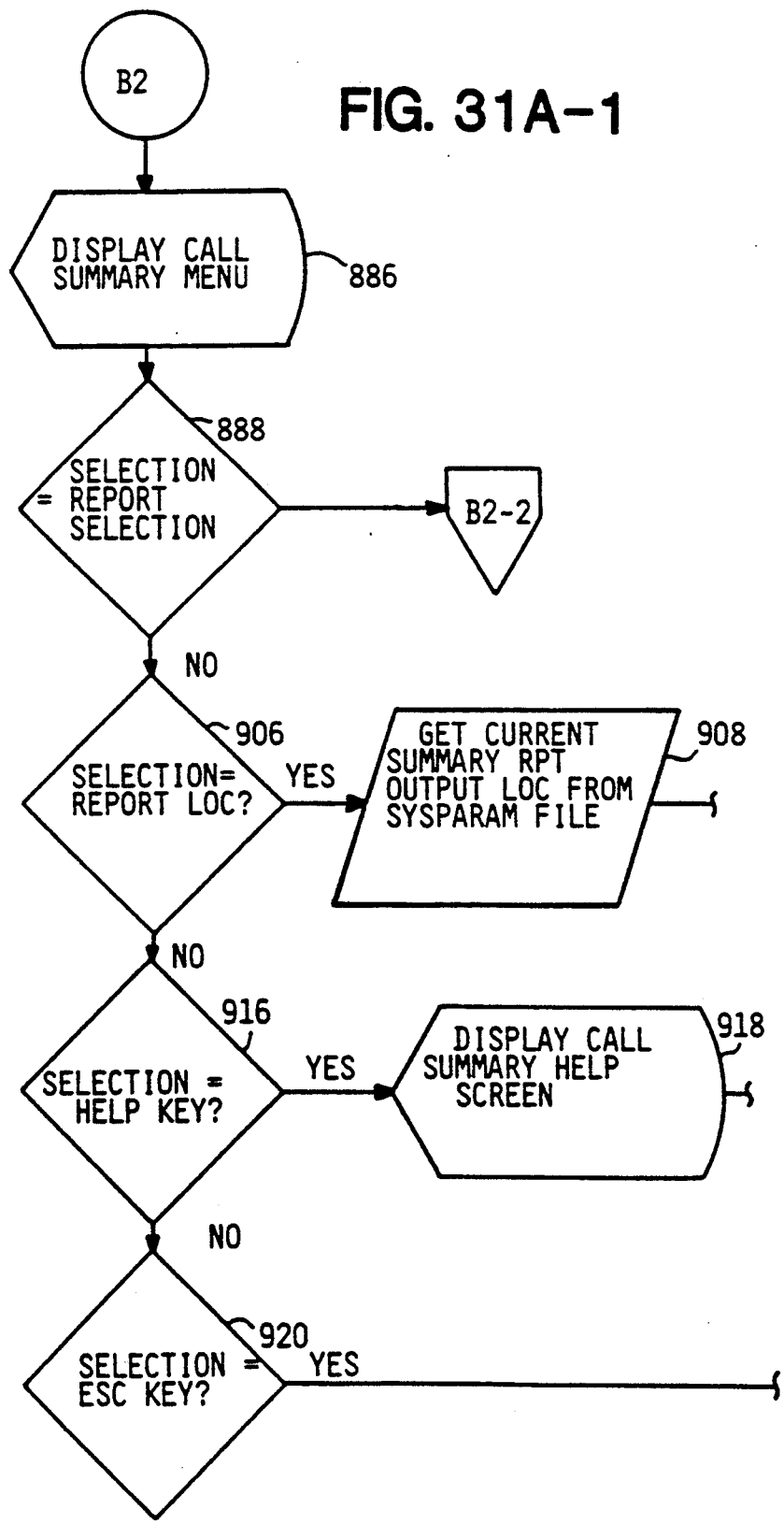
Figures 2, 31A:
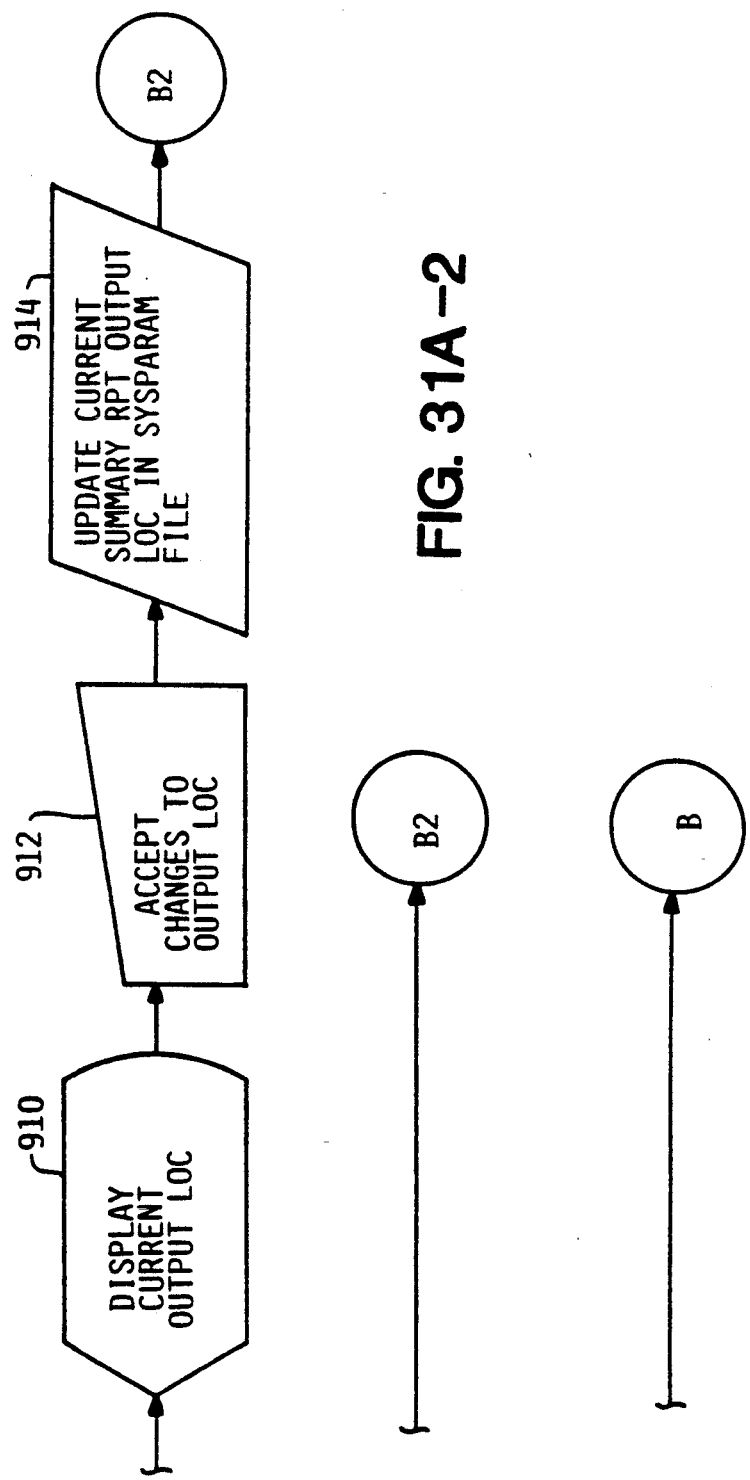
Figure 31B:
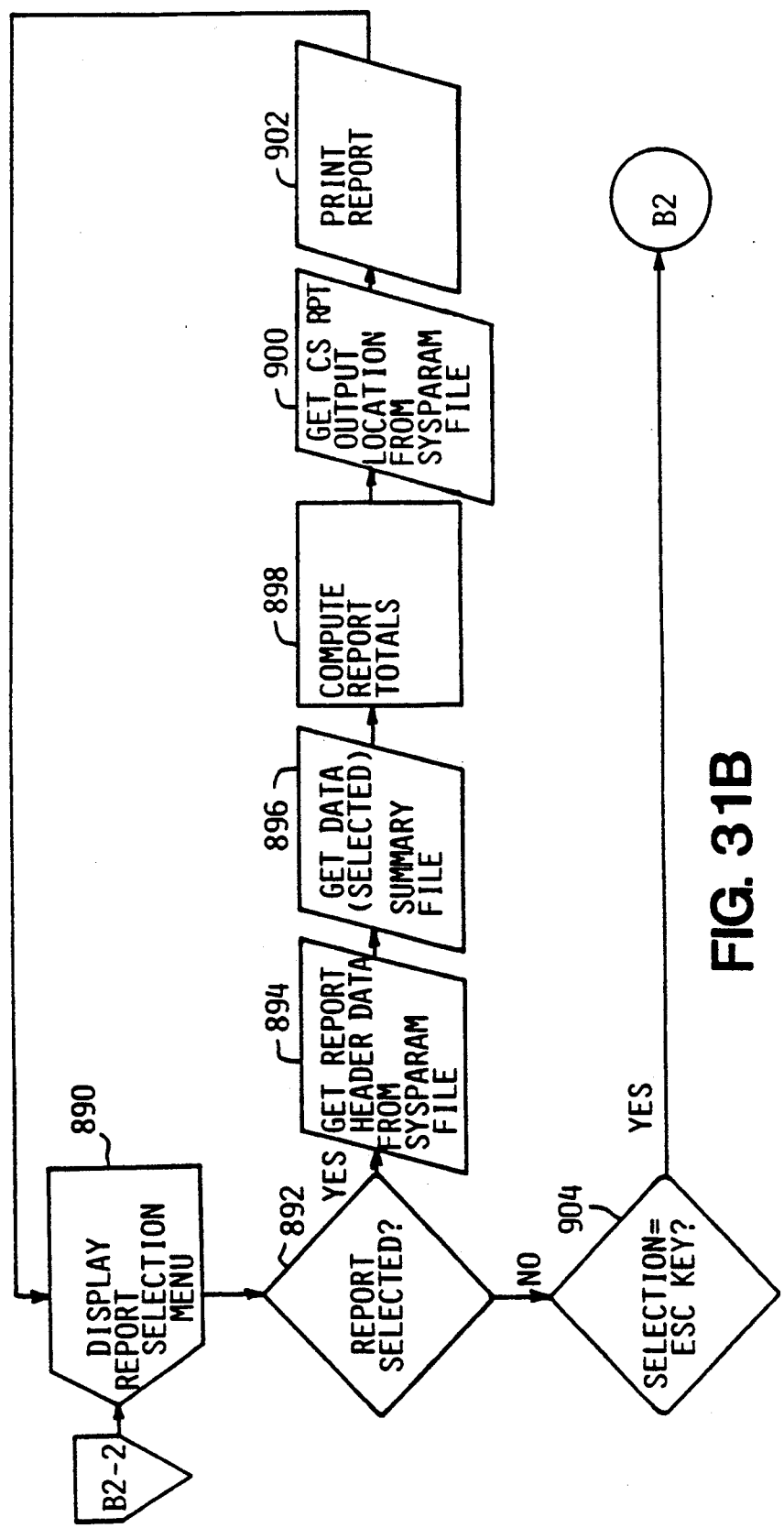

FIGS. 31A-1, 31A-1 and 31B are flow charts of the "Display Call Summary" subsection of the "Display Billing Inquiry" section for the "User Application" program of FIG. 4. The segment illustrated in FIGS. 31A-1 and 31A-2 are entered via the B2 program jump which comes from FIG. 29-1 and 29-2, discussed above, and leads first to step 886 which displays a call summary menu. If the user actuates the call summary report selection from that menu in step 888, then the program will exit via program jump B2-2 to FIG. 31B where it performs step 890 to display a report selection menu. If a report is selected from that menu, as determined by step 892, then in step 894 the program gets the report header data from the system parameter file. Thereafter in step 896 it gets further information from the selected summary file, and in step 898 the program computes the report totals. Then in step 900 it gets the call summary output location from the SysParam file, and in step 902 prints the report to the designated location for printing or display or disk storage as determined from the system parameter file. At the end of that process the program returns to step 890 to redisplay the report selection menu.

If in step 892 no report selection is made, and instead the escape key is actuated, the program exits via jump B2 to FIG. 31A.

Returning now to that figure, if the report selection menu is not selected in step 888, and the report location option is selected in step 906, then the program in step 908 will get the current summary report output location (screen, printer or disk file) from the system parameter file, and in step 912 it will display that location to the user so that changes can be made. If such changes are made, then in step 914 the program proceeds to update the current summary report output location in the system parameter file. Having accomplished this, the program returns via jump B2 to the entry point of FIG. 31A in order to redisplay the call summary menu.

The user has two other options on the menu of FIGS. 31A-1 and 31A-2, one of which is a help function selected in step 916. If that choice is made then in step 918 the call summary help screen is displayed. Upon leaving this submenu, the program returns to the via jump B2 to the call summary menu step 886.

The final selection available on this menu is the escape function, which in step 920 leave the call summary menu and moves back up to a higher level menu via program jump B.

Figure 32:
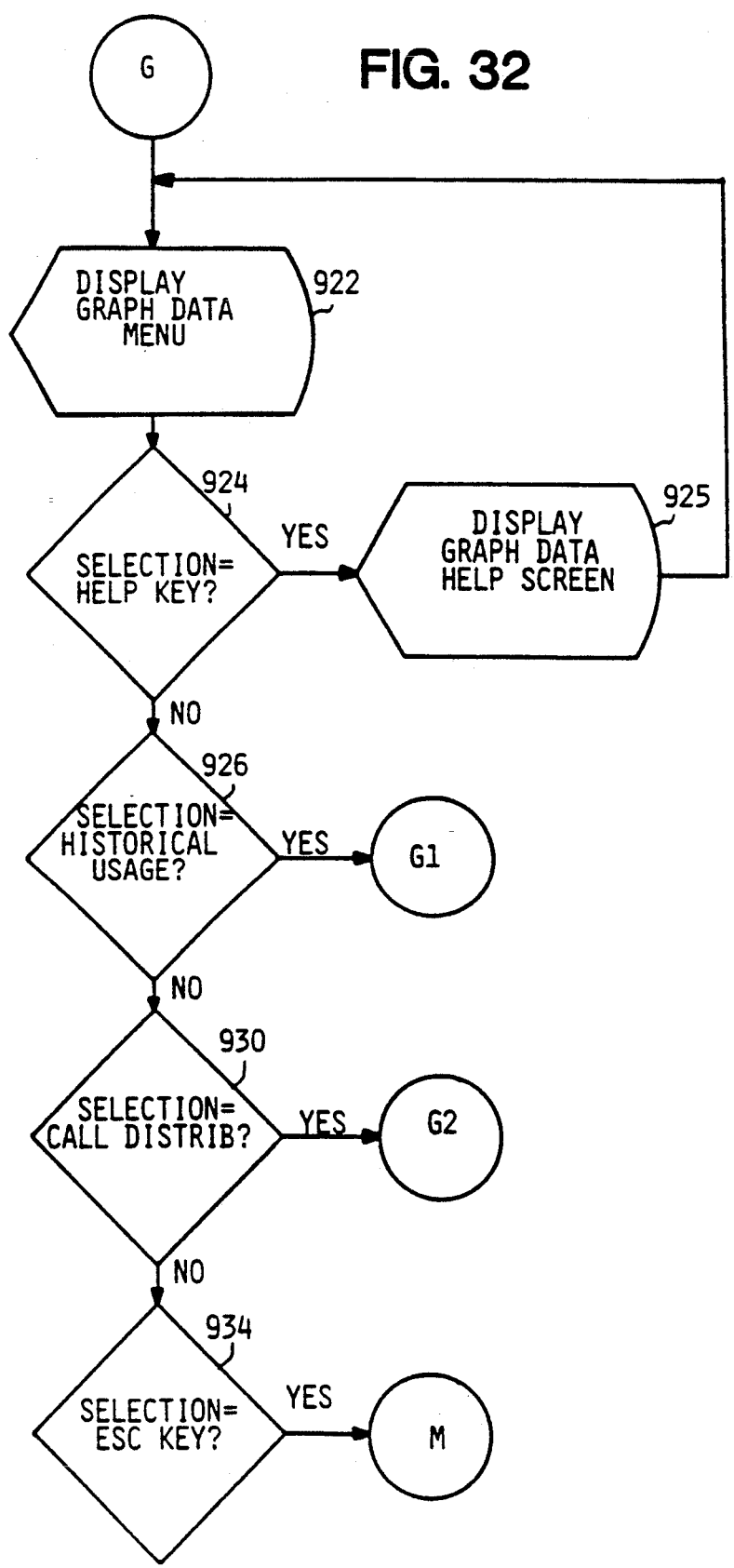
FIG. 32 is a flow chart of the "graph data" section for the "User Application" program of FIG. 4.

FIG. 32 is a flow chart of the "Graph Data" selection for the "User Application" program of FIG. 4. This routine is entered via program jump G from FIGS. 28-1 and 28-2, and proceeds to step 922 which displays the graph data menu. This menu has four choices represented by program steps 924, 926, 930 and 934. If the user chooses the help function of step 924, the graph data help screen will be displayed by step 925, after which the program returns to step 922 to, redisplay the graph data menu.

Among the user's other selectable options are historical usage (step 926), call distribution (step 930) and escape (step 934). If the historical usage function is selected by the user, the program branches via jumps point G1 to FIG. 33. Similarly, if the user selects the call distribution graph (step 930), the program exits via jump G2 FIGS. 34-1 and 34-2. The last available alternative for the user on the graph data menu display is the escape key function (step 934) which terminates the graph data menu display and returns to the main menu via jump M. FIGS. 33-1, 33-2, 34-1, 34-2, 35-1 and 35-2, to which these jumps lead, will now be discussed.

Figures 1, 33:
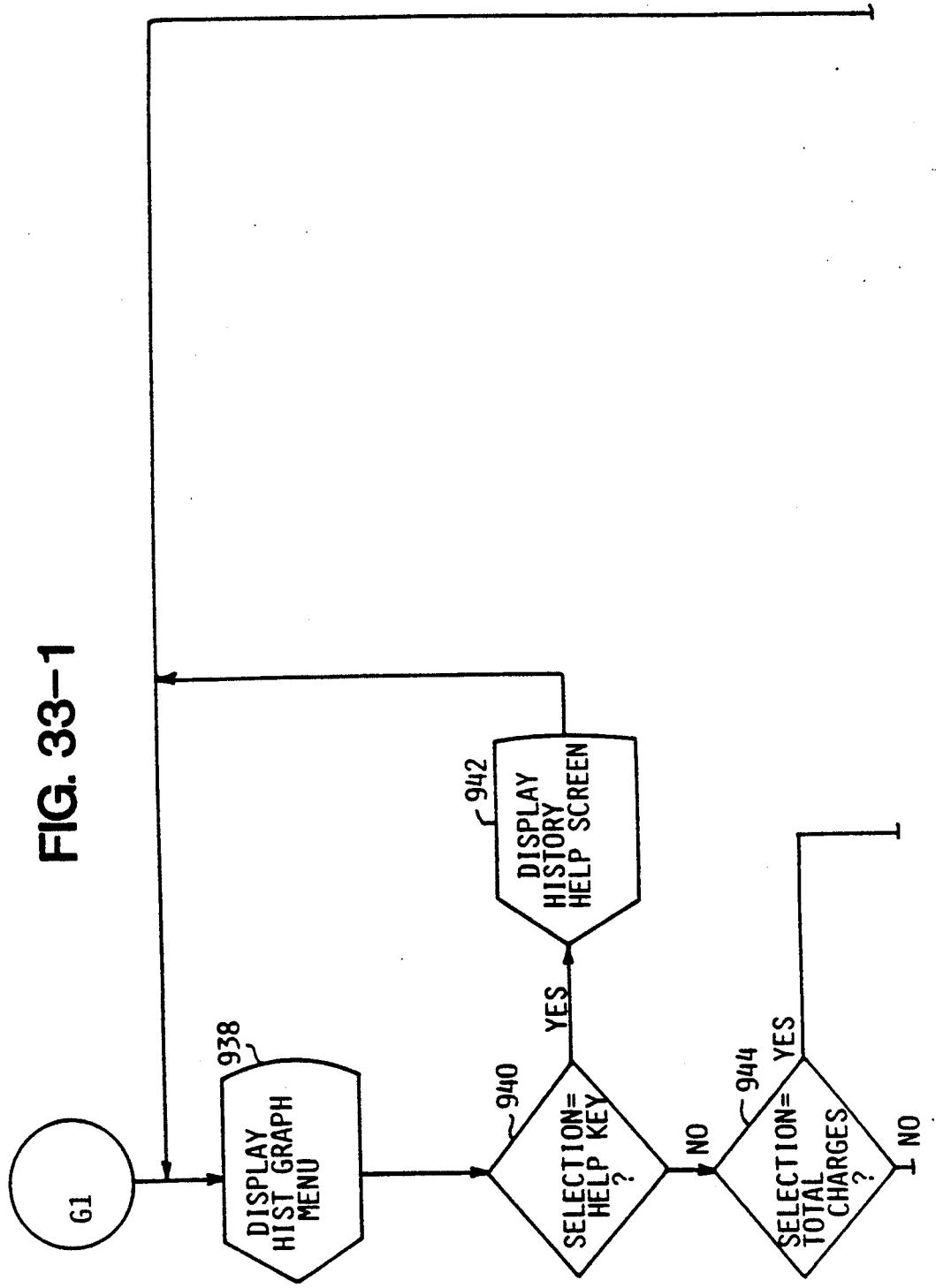
Figures 2, 33:
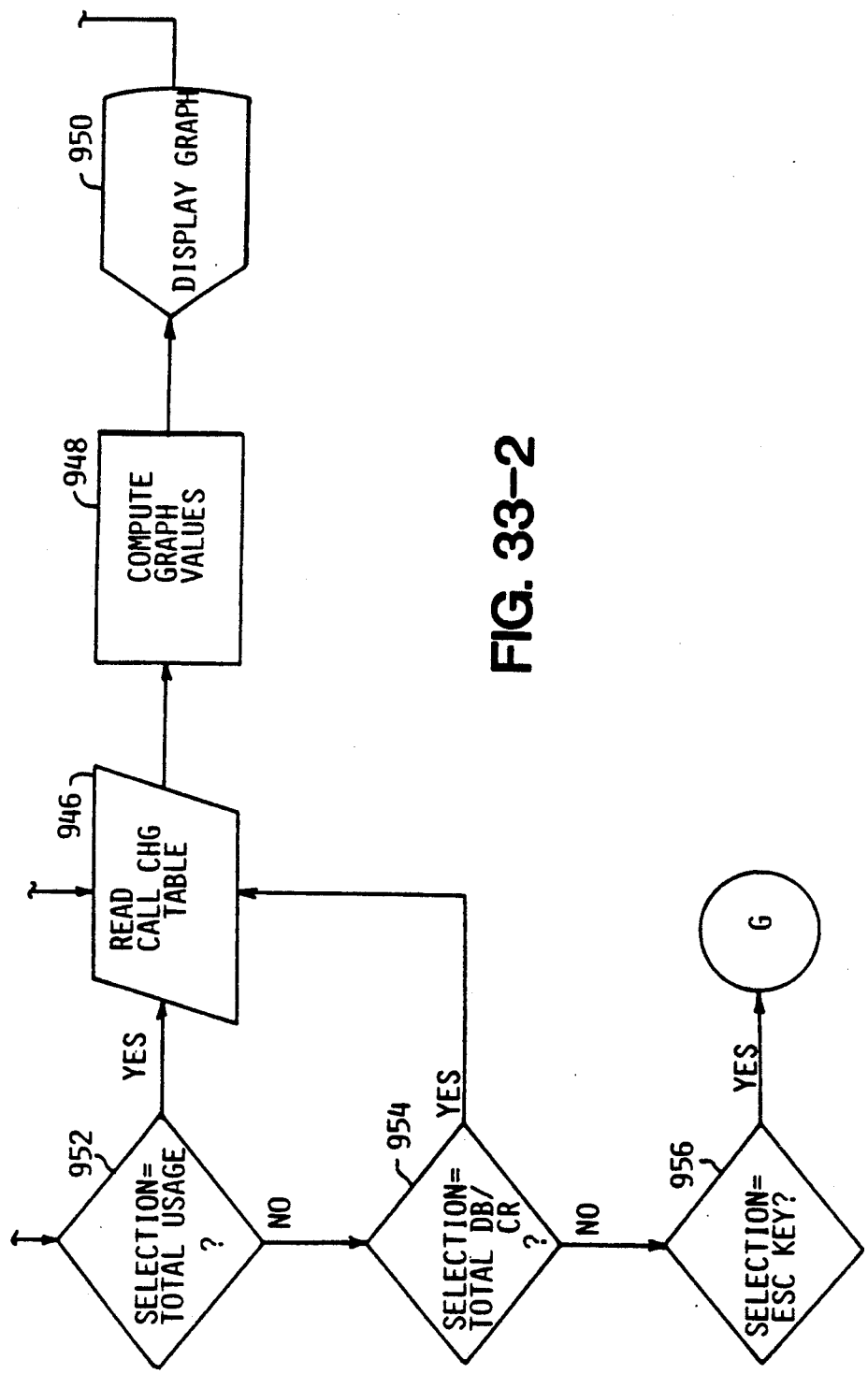

FIGS. 33-1 and 33-2 are a flow chart of the "graph historical usage" section of the "graph data" portion of the "User Application" program of FIG. 4. It is entered via program jump GI from FIG. 32, as discussed above, whereupon program step 938 displays the historical graph menu. From that menu the user may select the help function (step 940) which will display the historical graph help screen. On the completion of a help screen session the user will be returned to the historical graph menu of step 938.

Among the other choices on the historical graph menu are the total charges function of program step 944. Once this step is actuated, the program at step 946 will read the call charge (CllChg) tables to obtain the appropriate data to fulfill the request for total charge information graphs. The program then in step 948 computes the necessary graph values and determines the corresponding screen positions for graphic display. The graph thus computed then displayed on the monitor in step 950. At the close of the display graph session, the program returns to the historical graph menu of step 938.

The next two options available to the user from the historical graph menu include that of program step 952, a historical graph illustrating total usage, and that of the total DB/CR (total debit/credit records) function in program step 954, both of which cycle through the above-described steps 946, 948 and 950, returning then to step 938, in the same manner as the total charges selection of program step 944. The DB/CR data relates exclusively to non-call-detail records, such as leased phone lines, leased equipment, and the like; and is to be distinguished from the call detail information called for by steps 944 and 952.

The remaining option in the program section of FIGS. 33-1 and 33-2 are the escape function, which in step 966 will terminate the historical graph menu session and exit via program jump G to the entry point of FIG. 32.

Figures 2, 34:
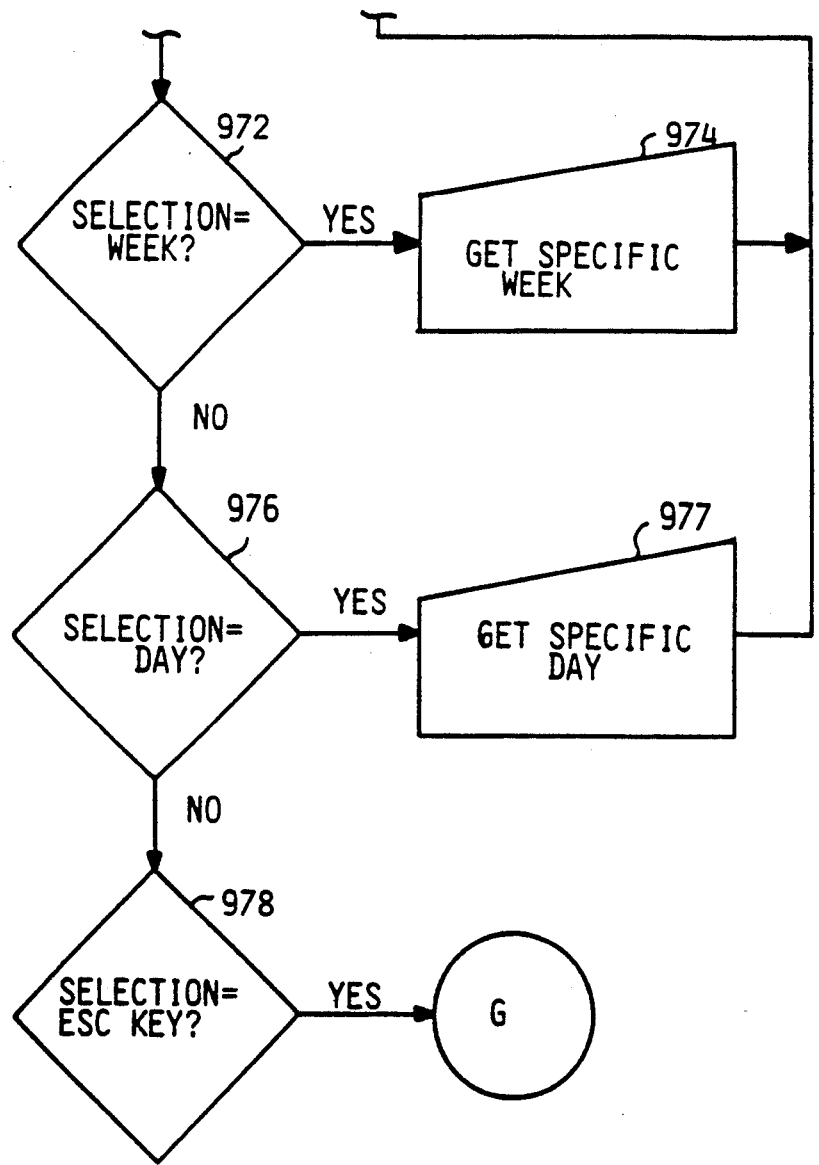

FIGS. 34-1 and 34-2 are a flow chart of the "Graph Hourly Call Distribution" subsection of the "Graph Data" section for the "User Application Program" segment of FIG. 4. It is entered via program jump G2 from FIG. 32, and leads immediately to the call distribution graph of step 958. Should the user then actuate the help selection offered by program step 960, program step 962 will present a screen providing help for the Call Distribution Graph Function. After that help session is completed the program returns to the distribution graph menu step 958.

If the user chooses the month alternative of step 964, the program then will, in step 966, read from the call distribution file table (CallDist file) the necessary information to produce the graph called for. Having obtained that information, the program in step 968 then processes the information to compute the necessary values for determining the graph's appearance on the screen, and in step 970 sends the results on to the display device. At the termination of the graph display the program returns to the distribution graph menu of step 958.

Should the user decide to display the weekly distribution graph of program step 972, the user must advise the system of what specific week of the current month is desired to be graphed (step 974). Similarly, should the user decide to display the daily distribution graph of program step 976, the user must advise the system of what specific day of the current month is desired to be graphed (step 977). After that is done, in both cases the program then cycles through previously described steps 966, 968 and 970, to display the weekly or daily graphs as the case may be, eventually returning to step 958 in the manner explained above.

The remaining alternative for the user in this particular menu is step 978, the escape function, which terminates the call distribution graph menu session, returning via program jump G to FIG. 32.

Figures 1, 35:
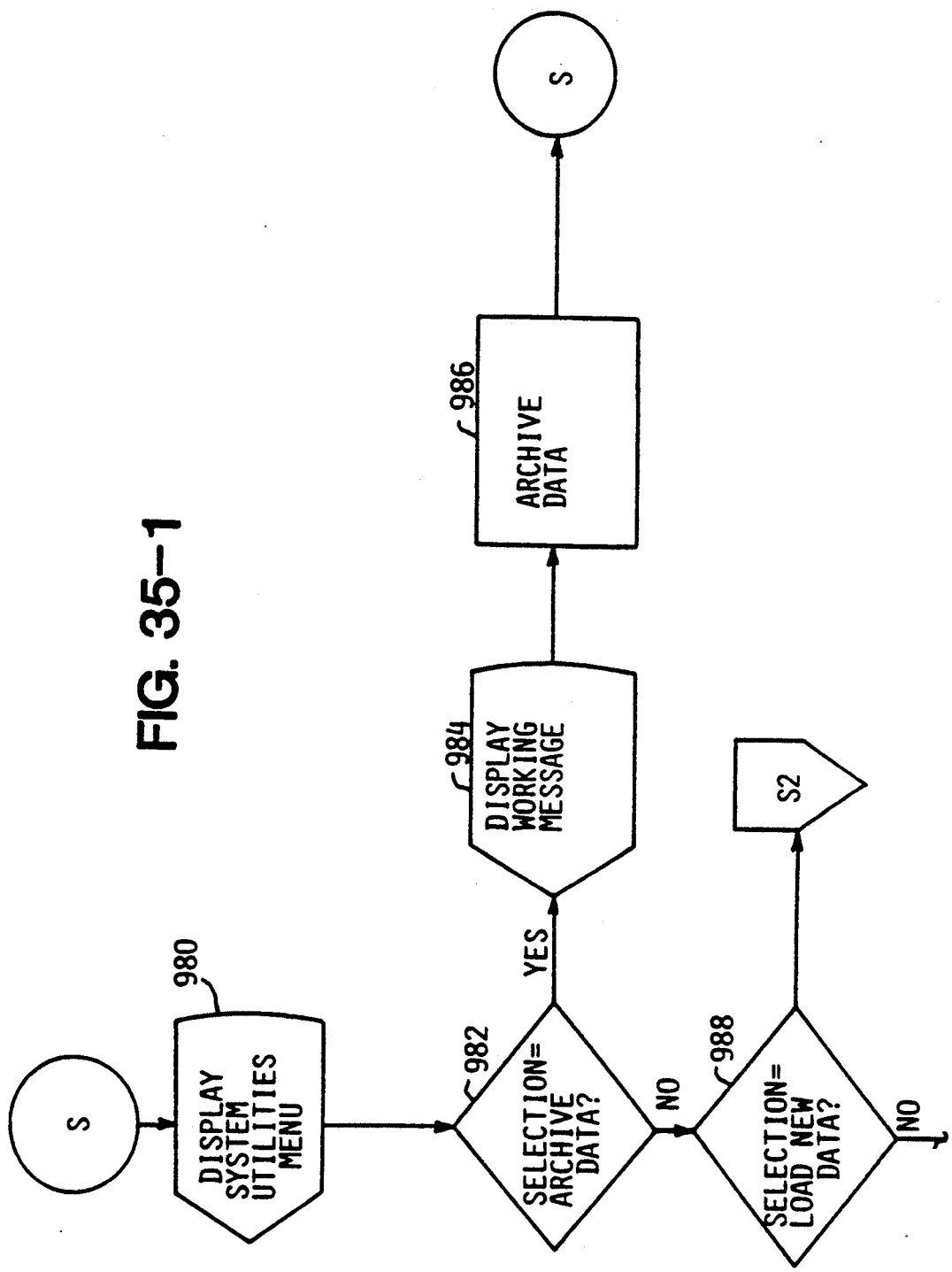
Figures 2, 35:
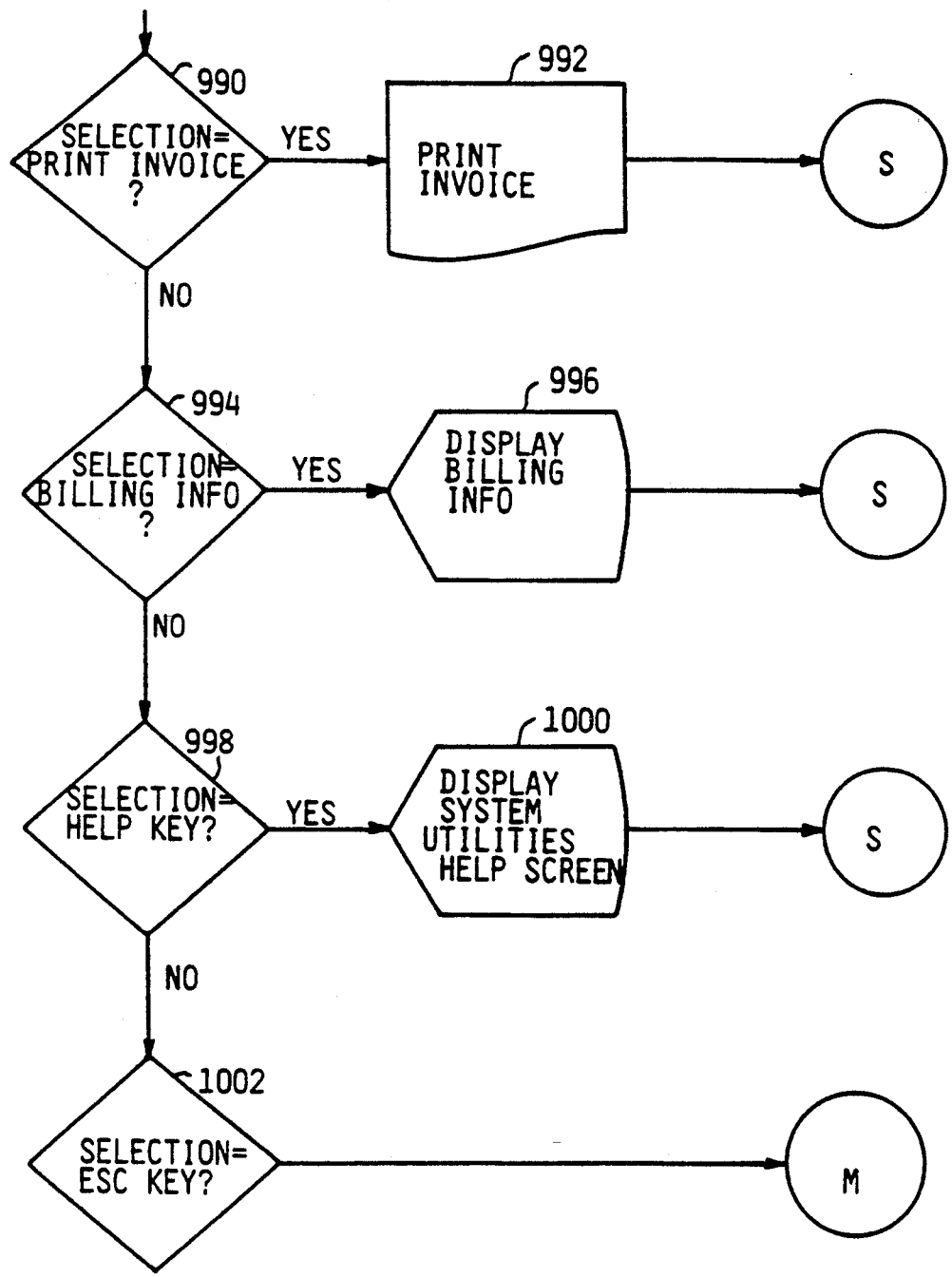

FIGS. 35-1 and 35-2 are a flow chart of the "System Utilities" section for the "User Application" program of FIG. 4. It is entered via program jump S from FIGS. 28-1 and 28-2 described above, and goes immediately to a system utilities menu at step 980. Among the choices available from that menu is that of step 982, archiving the data of the current billing cycle. Should the user choose that particular option, in step 984 a "working" message is displayed on the screen while step 986 is executed to archive all the inputted data of the current billing cycle. When the archival processing job is completed, the program then returns via program jump S to step 980 in order to redisplay the system utilities menu.

Among the other menu selections that are available to the user is the load new data function of step 988. When that option is selected, the program exits via jump S2 to a routine described below in connection with FIGS. 36-1 and 36-2.

Next the user may choose (in step 990) to print the actual invoice. Upon selection of that particular menu item the invoice will actually be prepared and printed in step 992, after which the program executes jump S to return to the menu display function of step 980

Should the user choose the option of step 994, billing information, the program in step 996 will display the billing information on the monitor, after which the program returns via jump S to step 980 to redisplay the system utilities menu.

The next option is the help function 998 offered by step 998. Upon the actuation of that particular selection the program will in step 1000 display the system utility help screen and then return via jump S to the system utilities menu at step 980.

The final alternative selection on this menu is the escape key (step 1002), which terminates the system utilities menu session and returns to the next higher level, the main menu of FIGS. 28-1 and 28-2, via program jump M.

Figures 1, 36:
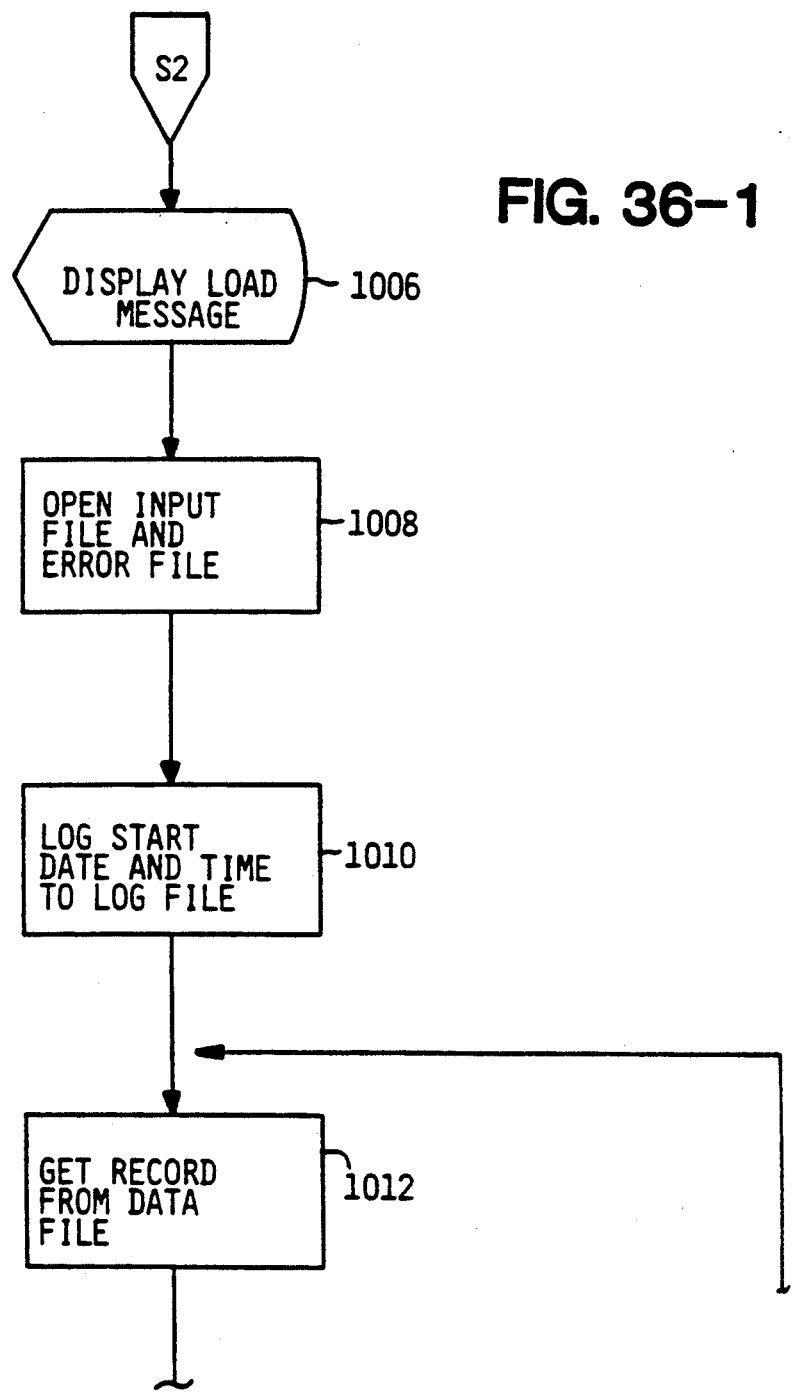
Figures 2, 36:
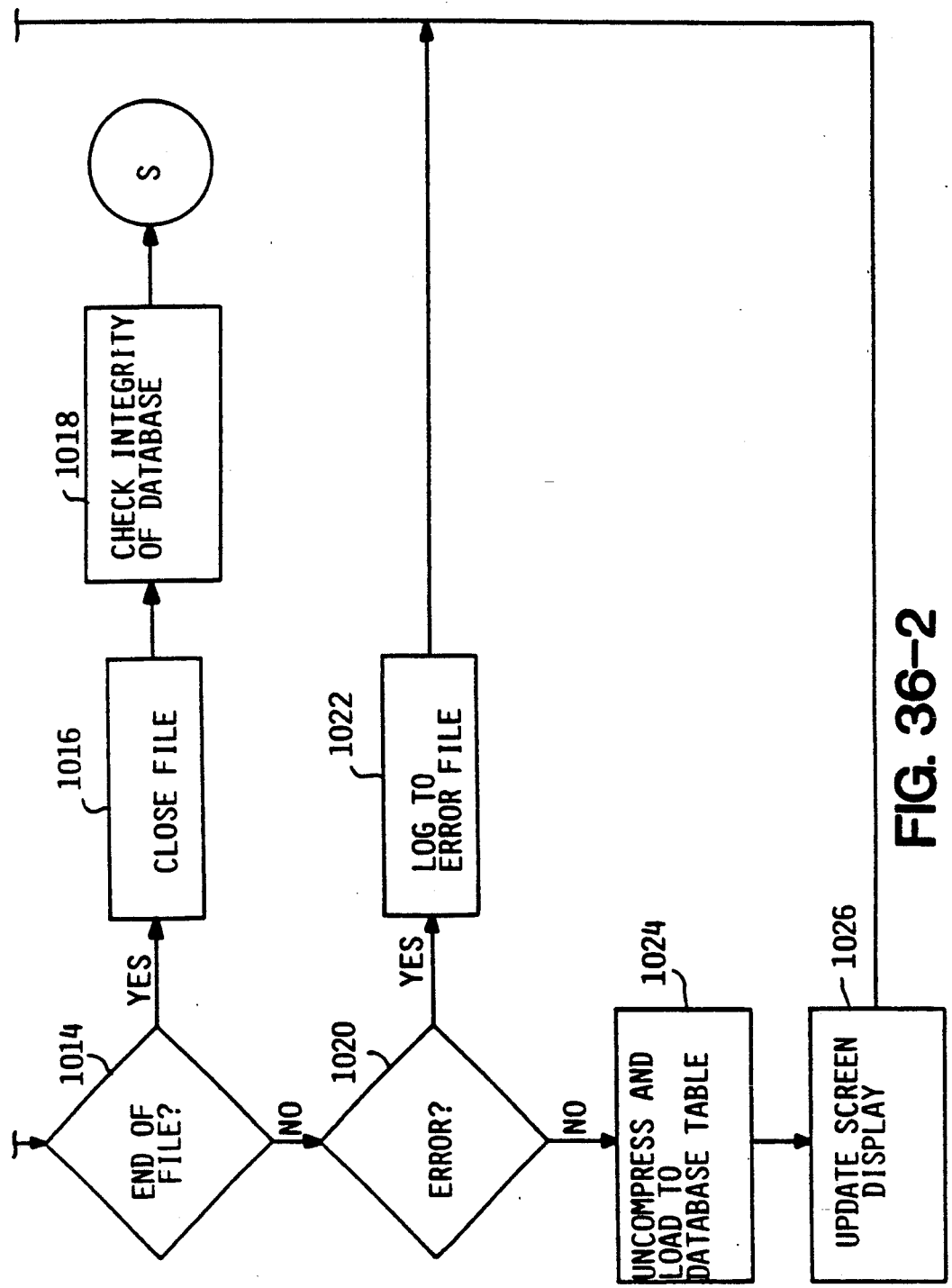

FIGS. 36-1 and 36-2 are a flow chart of the "Load New Data" subsection of the "System Utilities" section for the "User Application Program" segment of FIG. 4. It is entered via program jump S2 from FIG. 35, previously described, whereupon step 1006 will display a message advising the user that the program is being loaded. The system then in step 1008 opens an input file in which will be stored the new data to be loaded and an error file to track all associated error information. The program in step 1010 then writes the start date and time to a log file. The system then in step 1012 fetches from the input file an appropriate record which will subsequently be loaded into the database.

After each such fetch operation the program executes a loop starting with a test 1014 to determine if the fetched data represents an end-of-file condition. If such a condition exists, the load procedure is completed, and accordingly the program in step 1016 will then close the database into which the data has been loaded. Thereafter, in step 1018 it will check the integrity of the newly created database file. And at the conclusion of the database integrity check, the program will end the loading data session and return to the system utilities menu via program jump S leading back to FIGS. 35-1 and 35-2.

If in step 1014, however, an end-of-file condition is not detected, then in step 1020 the program determines if an error has occurred. If so, in step 1022 the error will be logged to the error file previously created in step 1008, and the program loops back to step 1012 to fetch another record.

The data coming from the source file is in a compressed form, as explained above. Therefore, if the program does not encounter an error in step 1020, then in step 1024 it will use its decompression algorithm to expand the fetched data to make it suitable for subsequent use by the R-base program, and only then will load the data to the target database table.

During loading, the screen informs the user of the processing which is going on. In step 1026, therefore, after each record is expanded and loaded, the screen display is updated to reflect the processing just concluded, and the program recycles back to step 1012, continuing to do so until the end-of-file condition is detected by step 1020.

CONCLUSION

It will now be appreciated that the system of this invention provides a means for preparing on diskette telecommunications or similar bills in an optimal format for further processing, display, and analysis under customer control on popularly-available, inexpensive personal computers.

For each participating customer, the appropriately selected billing records are obtained from the telecommunications carrier. In contrast to prior art systems, the system processes not only call detail records, but additional billing records to account for equipment rental charges, monthly service fees, payments, adjustments, taxes, and any other items affecting the amount billed to the customer In addition, all billing records are obtained from the carrier at a stage in the carrier's ordinary billing process after the carrier has posted to the subscriber's account all charges and credits, has performed all billing-related calculations for that subscriber, and is ready to print a paper bill. By selecting this specific stage of carrier bill processing from which to extract billing information, the invention ensures that the information supplied on diskette will exactly correspond to that on the paper bill.

Extensive preprocessing of these billing records is performed to place the records in a form compatible for use with inexpensive personal computers, and to provide flexible, efficient access to the original records and to a variety of summary reports and graphs accumulated therefrom. In a first processing step, preferably performed on a large computer, the records are sorted, edited and reformatted into an optimal organization for further processing on a personal computer. In addition, a variety of preprocessed summary reports and graphs are prepared for rapid retrieval on the customer's computer. By preprocessing these summary items on a computer with greater processing and storage resources, the invention optimally makes the most commonly-needed reports and graphs immediately available upon the user's request, at the relatively modest expense of additional mainframe processing and additional PC database storage requirements. In a second step, preferably performed on a network of smaller computers, the reorganized records and summary reports for each customer are separated, compressed, and recorded on diskettes compatible with each customer's personal computer.

A user application program according to the invention on the customer's personal computer conveniently displays and analyzes the billing information supplied on diskette. The customer may retrieve the detailed billing records in a variety of sorted orders, may select a subset of the records for further analysis, may view the preprocessed summary reports and graphs, and may prepare new summary reports on demand. Previous telephone bills are kept in archive files for repeated analysis. Billing information may be displayed on screen, printed on a printer, or written to an unstructured file for analysis beyond that provided by the user application.

This system thus solves many of the disadvantages encountered in prior-art systems for collecting, processing and analyzing billing information under customer control. Diskette bills and the user application program are optimally compatible with popularly available, inexpensive personal computers, eliminating the need for customers to own or operate large, expensive computers and software. The system provides to users billing information in computer-readable form, eliminating expensive and error-prone data-entry and manual processing steps. The system processes complete billing records and obtains these records from originating carriers at the proper stage to ensure that the diskette bills and analysis produced therefrom exactly correspond to the equivalent paper bills.

The above-described embodiment of the invention is merely one example of a way in which the invention may be carried out. Other ways may also be possible, and are within the scope of the following claims defining the invention.

The invention claimed is:

1. A system for presenting information concerning the actual cost of a service provided to a user by a service provider, said system comprising:
   storage means for storing individual transaction records prepared by said service provider, said transaction records relating to individual service transactions for one or more service customers including said user, and the exact charges actually billed to said user by said service provider for each said service transaction;
   data processing means comprising respective computation hardware means and respective software programming means for directing the activities of said computation hardware means;
   means for transferring at least a part of said individual transaction records from said storage means to said data processing means;
   said data processing means generating preprocessed summary reports as specified by the user from said individual transaction records transferred from said storage means and organizing said summary reports into a format for storage, manipulation and display on a personal computer data processing means;
   means for transferring said individual transaction records including said summary reports from said data processing means to said personal computer data processing means; and
   said personal computer data processing means being adapted to perform additional processing on said individual transaction records which have been at least in part preprocessed by said data processing means utilizing said summary reports for expedited retrieval of data, to present a subset of said selected records including said exact charges actually billed to said user.

2. A system as in claim 1 wherein:
   said preprocessing operations include preparation of summary reports and graphs.

3. A system as in claim 1 wherein:
   said data is reorganized into a table format suitable for loading into an operative data base structure for said personal computer processing means.

4. A system as in claim 3 wherein said data base is RBASE.

5. A system as in claim 1 wherein:
   said data processing means comprises a first and a second data processor, said first data processor being adapted to perform said selection of said records and said second data processor being adapted to perform said preprocessing of said selected records.

6. A system as in claim 5 wherein means are provided for transferring data from said first data processor to said second data processor.

7. A system as in claim 1 wherein said data processing means comprises a single data processor adapted to perform said selection and said preprocessing operations.

8. A system for presenting, under control of a user, usage and actual cost information relating to telecommunications service provided to said user by a telecommunications service provider, said system comprising:
   telecommunications service provider storage means for storing records prepared by a telecommunications service provider relating to telecommunications usage for one or more telecommunications subscribers including said user, and the exact charges actually billed to said user by said service provider for said usage;
   data processing means comprising respective computation hardware means and respective software programming means for directing the activities of said computation hardware means;
   means for transferring at least a part of the records from said service provider storage means to said data processing means;
   said data processing means generating preprocessed summary reports as specified by the user from said telecommunications usage records transferred from said storage means and organizing said summary reports into a format for storage, manipulation and display on a personal computer data processing means;
   means for transferring said telecommunications usage records including said summary reports from said data processing means to said personal computer data processing means; and
   said personal computer data processing means being adapted to perform additional processing on said telecommunications records which have been at least in part preprocessed by said data processing means utilizing said summary reports for expedited retrieval of data, to present a subset of said telecommunications usage records including said exact charges actually billed to said user.

9. A system as in claim 8 wherein said records prepared by said telecommunications carrier comprise for each said telecommunications subscriber all information required for said telecommunications carrier to produce an ordinary telecommunications bill for that telecommunications subscriber.

10. A system as in claim 8 wherein said selected records relating to telecommunications usage and cost comprise at least one telecommunications call detail record corresponding to a unique telecommunications call to be billed to said subscriber, said call having a length determined by said telecommunications carrier.

11. A system as in claim 10 wherein said telecommunications call detail record includes an exact indicia of a charge assessed by said telecommunications carrier to said subscriber for said call.

12. A system as in claim 10 wherein said telecommunications call detail record includes an exact indicia of the length of said call determined by said telecommunications carrier.

13. A system as in claim 10 wherein:
said data processing means creates additional records containing information derived from said preprocessing operations;
an information interchange media means transfers said additional records from said data processing means to said personal computer data processing means;
said personal computer data processing means being adapted to, under the control of a user, perform additional processing on said additional records created by said data processing means; and
to present a subset of said additional records as chosen by said user.

14. A system as in claim 13 wherein each said telecommunications call detail record comprises one or more indicia of a carrier code identifying a carrier through which said call was billed.

15. A system as in claim 14 wherein:
said data processing means, responsive to said carrier code indicia, accumulates for each said telecommunication subscriber a summary of said telecommunications calls billed through said carrier; and
stores said summary in carrier summary records on an intermediate storage means in said data processing means.

16. A system as in claim 15 wherein said additional records comprise at least one carrier summary record created by said data processing means.

17. A system as in claim 13 wherein each said telecommunications call detail record comprises one or more indicia of a site code identifying a customer location from which said call was placed.

18. A system as in claim 17 wherein:
said data processing means, responsive to said site code indicia, accumulates for each said telecommunications subscriber a summary of said telecommunications calls placed from each said customer location; and
stores said summary in site code summary records on an intermediate storage means in said data processing means.

19. A system as in claim 18 wherein said additional records comprise at least one site code summary record created by said data processing means.

20. A system as in claim 13 wherein each said telecommunications call detail record comprises one or more indicia of an originating station number from which said call was placed.

21. A system as in claim 20 wherein:
said data processing means, responsive to said originating station number indicia, accumulates for each said telecommunication subscriber a summary of said telecommunications calls placed from each said origination station number; and
stores said summary in originating station number summary records on an intermediate storage means in said data processing means.

22. A system as in claim 21 wherein said additional records comprise at least one originating station number summary record created by said data processing means.

23. A system as in claim 13 wherein each said telecommunications call detail record comprises one or more indicia of a date when said call was placed.

24. A system as in claim 13 wherein each said telecommunications call detail record comprises one or more indicia of a time when said call was placed.

25. A system as in claim 13 wherein each said telecommunications call detail record comprises one or more indicia of a locality where said call was terminated.

26. A system as in claim 13 wherein each said telecommunications call detail record comprises one or more indicia of a political region where said call was terminated.

27. A system as in claim 13 wherein each said telecommunications call detail record comprises one or more indicia of a terminating station number to which said call was placed.

28. A system as in claim 27 wherein:
said terminating station number indicia includes indicia of a carrier-recognized geographical area to which said call was placed;
said data processing means, responsive to said geographical area indicia, accumulates for each said telecommunications subscriber a summary of said telecommunications calls placed to each said carrier-recognized geographical area; and
stores said summary in geographical area code summary records on an intermediate storage means in said data processing means.

29. A system as in claim 28 wherein said additional records comprise at least one geographical area code summary record created by said data processing means.

30. A system as in claim 13 wherein each said telecommunications call detail record comprises one or more indicia of a length in time of said call.

31. A system as in claim 13 wherein each said telecommunications call detail record comprises one or more indicia of a project accounting code to which said call should be attributed.

32. A system as in claim 31 wherein:
said data processing means, responsive to said project accounting code indicia, accumulates for each said telecommunications subscriber a summary of said telecommunications calls to which each said project accounting code was attributed; and
stores said summary in project accounting code summary records on an intermediate storage means in said data processing means.

33. A system as in claim 32 wherein said additional records comprise at least one project accounting code summary record created by said data processing means.

34. A system as in claim 13 wherein each said telecommunications call detail record comprises one or more indicia of a billing classification code associated with said call by said carrier.

35. A system as in claim 34 wherein:

said data processing means, responsive to said billing classification code indicia, accumulates for each said telecommunications subscriber a summary of said telecommunications calls associated with each said billing classification code; and stores said summary in billing classification code summary records on an intermediate storage means in said data processing means.

36. A system as in claim 35 wherein said additional records comprise at least one billing classification code summary record created by said data processing means.

37. A system as in claim 12 wherein each said telecommunications call detail record comprises one or more indicia of a call cost associated with said call by said carrier.

38. A system as in claim 13 wherein each said telecommunications call detail record comprises one or more indicia of miscellaneous information associated with said call by said carrier.

39. A system as in claim 8 wherein an information interchange media means in the form of a magnetic tape is employed as said means for transferring at least a part of the records from said carrier storage means to said data processing means.

40. A system as in claim 8 wherein an information interchange media means in the form of a magnetic disk is employed as said means for transferring at least a part of the records from said carrier storage means to said data processing means.

41. A system as in claim 8 wherein an information interchange media means in the form of a data communications line is employed as said means for transferring at least a part of the records from said carrier storage means to said data processing means.

42. A system as in claim 8 wherein:

said data processing means includes intermediate means for storing a plurality of said selected records for at least two of said subscribers during said preprocessing operations;

each of said selected records comprises at least indicia identifying each said telecommunications subscriber; and said data processing means is adapted to sort said selected records responsive to said indicia identifying said telecommunications subscriber to group together logically on said intermediate storage means all of said selected records for each said subscriber.

43. A system as in claim 42 wherein:

each of said selected records corresponds to a telecommunications station number and further comprises at least indicia identifying said telecommunications station number; and said data processing means is adapted to further sort said selected records responsive to said indicia identifying said telecommunication station number to group together logically on said intermediate storage means all of said selected records corresponding to each said telecommunications station number.

44. A system as in claim 8 wherein an information interchange media means in the form of a magnetic tape is employed for transferring said selected records from said data processing means to said personal computer data processing means.

45. A system as in claim 8 wherein an information interchange media means in the form of a magnetic tape is employed for transferring said selected records from said data processing means to said personal computer data processing means.

46. A system as in claim 8 wherein an information interchange media means in the form of a data communications line is employed for transferring said selected records from said data processing means to said personal computer data processing means.

47. A method for presenting information on a personal computer data processing means concerning the actual cost of a service provided to a user by a service provider, said method comprising:

storing individual transaction records prepared by said service provider on a storage means, said transaction records relating to individual service transactions for at least one service customer including said user, and the exact charges actually billed to said user by said service provider for each said service transaction;

transferring at least a part of said transaction records from said storage means to a data processing means;

generating preprocessed summary reports as specified by the user from said individual transaction records transferred from said storage means and organizing said summary reports into a format for storage, manipulation and display on a personal computer data processing means;

transferring said preprocessed individual transaction records including said summary reports from said data processing means to at least one personal computer data processing means;

performing additional processing of said individual transaction records on said at least one personal computer data processing means utilizing said summary reports for expedited retrieval of data;

presenting a subset of said individual transaction records chosen via said at least one personal computer data processing means including said exact charges actually billed to said user; and said data processing means and said at least one personal computer processing means comprising respective computation hardware means and respective software programming means arranged for directing the activities of said computation hardware means.

48. A method as in claim 47 wherein said records prepared by said service provider comprise for each said service customer all information concerning telecommunications services provided to said service customer and the applicable billing rates required for said service provider to produce an ordinary telecommunications bill for that service customer.

49. A method as in claim 47 wherein said selected records relate to telecommunications usage and cost and comprise at least one telecommunication call detail record corresponding to a unique telecommunications call to be billed to said service customer, said call having a length determined by said service provider.

50. A method as in claim 49 wherein said telecommunications call detail record includes an exact indicia of a charge assessed by said service provider to said service customer for said call.

51. A method as in claim 49 wherein said telecommunications call detail record includes an exact indicia of the length of said call determined by said service provider.

52. A method as in claim 49 wherein each said telecommunications call detail record comprises one or more indicia of a carrier code identifying a carrier through which said call was billed.

53. A method as in claim 52 wherein:
said data processing means, responsive to said carrier code indicia, accumulates for each said service customer a summary of said telecommunications calls billed through said carrier; and
said summary is stored in carrier summary records on an intermediate storage means in said data processing means.

54. A method as in claim 49 wherein each said telecommunications call detail record comprises one or more indicia of a set code identifying a customer location from which said call was placed.

55. A method as in claim 54 wherein:
said data processing means, responsive to said site code indicia, accumulates for each said service customer a summary of said telecommunications calls placed from each said customer location; and
said summary is stored in site code summary records on an intermediate storage means in said data processing means.

56. A method as in claim 49 wherein each said telecommunications call detail record comprises one or more indicia of an originating station number from which said call was placed.

57. A method as in claim 56 wherein:
said data processing means, responsive to said originating station number indicia, accumulates for each said service customer a summary of said telecommunications calls placed from each said origination station number; and
said summary is stored in originating station number summary records on an intermediate storage means in said data processing means.

58. A method as in claim 49 wherein each said telecommunications call detail record comprises one or more indicia of a date when said call was placed.

59. A method as in claim 49 wherein each said telecommunications call detail record comprises one or more indicia of a time when said call was placed.

60. A method as in claim 49 wherein each said telecommunications call detail record comprises one or more indicia of a locality where said call was terminated.

61. A method as in claim 49 wherein each said telecommunications call detail record comprises one or more indicia of a political region where said call was terminated.

62. A method as in claim 49 wherein each said telecommunications call detail record comprises one or more indicia of a terminating station number to which said call was placed.

63. A method as in claim 62 wherein:
said terminating station number indicia includes indicia of a carrier-recognized geographical area to which said call was placed;
said data processing means, responsive to said geographical area indicia, accumulates for each said service customer a summary of said telecommunications calls placed to each said carrier-recognized geographical area; and
said summary is stored in geographical area code summary records on an intermediate storage means in said data processing means.

64. A method as in claim 49 wherein each said telecommunications call detail record comprises one or more indicia of a length in time of said call.

65. A method as in claim 49 wherein each said telecommunications call detail record comprises one or more indicia of a project accounting code to which said call should be attributed.

66. A method as in claim 65 wherein:
said data processing means, responsive to said project accounting code indicia, accumulates for each said service customer a summary of said telecommunications calls to which each said project accounting code was attributed; and
stores said summary in project accounting code summary records on said intermediate storage means.

67. A method as in claim 49 wherein each said telecommunications call detail record comprises one or more indicia of a billing classification code associated with said call by said service provider.

68. A method as in claim 67 wherein:
said data processing means, responsive to said billing classification code indicia, accumulates for each said service customer a summary of said telecommunications calls associated with each said billing classification code; and
said summary is stored in billing classification code summary records on an intermediate storage means in said data processing means.

69. A method as in claim 49 wherein each said telecommunications call detail record comprises one or more indicia of a call cost associated with said call by said service provider.

70. A method as in claim 49 wherein each said telecommunications call detail record comprises one or more indicia of miscellaneous information associated with said call by said service provider.

71. A method as in claim 47 wherein an information interchange media means in the form of a magnetic tape is employed to transfer said selected records from said storage means to said data processing means.

72. A method as in claim 47 wherein an information interchange media means in the form of a magnetic disk is employed to transfer said selected records from said storage means to said data processing means.

73. A method as in claim 47 wherein an information interchange media means in the form of a data communications line is employed to transfer said selected records from said storage means to said data processing means.

74. A method as in claim 47 wherein an information interchange media means in the form of a magnetic tape is employed to transfer said selected records from said data processing means to said personal computer data processing means.

75. A method as in claim 47 wherein an information interchange media means in the form of a magnetic disk is employed to transfer said selected records from said data processing means to said personal computer data processing means.

76. A method as in claim 47 wherein an information interchange media means in the form of a data communications line is employed to transfer said selected records from said data processing means to said personal computer data processing means.

77. A method as in claim 47 wherein:
said data processing means includes intermediate means for storing during said preprocessing operations a plurality of said selected records for at least two of said service customers;
each of said selected records comprises at least indicia identifying each said service customer; and said data processing means is adapted to sort said selected records responsive to said indicia identifying said service customer to group together logically on said intermediate storage means all of said selected records for each said customer.

78. A method as in claim 77 wherein:

each of said selected records corresponds to a telecommunications station number and further comprises at least indicia identifying said telecommunications station number; and said data processing means is adapted to further sort said selected records responsive to said indicia identifying said telecommunications station number to group together logically on said intermediate storage means all of said selected records corresponding to each said telecommunications station number.

79. A method as in claim 47 wherein said data processing means includes a first and a second data processor and means for transferring selected records from said first data processor to said second data processor, said first data processor being adapted for selecting said records relating to service usage and exact changes from said transferred transaction records and said second data processor being adapted for said preprocessing of said selected records, said second data processor being further adapted to create additional records containing information derived from said preprocessing operations for transfer to said personal computer data processing means.

80. A method as in claim 79 wherein said additional records comprise at least one project accounting code summary record created by said second data processing means.

81. A method as in claim 80 wherein said additional records comprise at least one carrier summary record created by said second data processing means.

82. A method as in claim 81 wherein said additional records comprise at least one billing classification code summary record created by said second data processing means.

83. A method as in claim 81 wherein said additional records comprise at least one geographical area code summary record recorded by said second data processing means.

84. A method as in claim 83 wherein said additional records comprise at least one originating station number summary record created by said second data processing means.

85. A method as in claim 84 wherein said additional records comprise at least one site code summary record created by said second data processing means.

* * * * *

UNITED STATES PATENT AND TRADEMARK OFFICE
CERTIFICATE OF CORRECTION

PATENT NO. : 5,287,270
DATED : February 15, 1994
INVENTOR(S) : Robert M. Hardy, et al It is certified that error appears in the above-indentified patent and that said Letters Patent is hereby corrected as shown below:

```
Column  3, line 65, insert a period --.-- after "subscribers";
Column  6, line 42, delete the quotation mark " " " and
insert a dash -- - --;
Column  6, line 50, delete "is";
Column 11, line 26, change "TBSB010" to --TPSB010--;
Column 11, line 33, insert --1.-- after "Fig.";
Column 11, line 56, change "TBSB020" to --TPSB020--;
Column 17, line 18, delete the comma "," after "that";
Column 20, line 10, change "SBROC03" to --SPRPC03--;
Column 26, line 34, delete "men" and insert --menu--;
Column 30, line 41, insert a period --.-- after "customer";
Column 31, line 18, delete "solves" and insert --avoids--;
```

In the Claim:
Col. 31:
 Claim 1, line 51, insert --arranged-- after "means".
Col. 35:
 Claim 45, line 67, delete "tape" and insert --disk--.

Signed and Sealed this

Sixth Day of June, 1995

Attest:

Attesting Officer

BRUCE LEHMAN

Commissioner of Patents and Trademarks

(12) EX PARTE REEXAMINATION CERTIFICATE (7267th)
United States Patent
Hardy et al.

(10) Number: US 5,287,270 C1
(45) Certificate Issued: Dec. 29, 2009

(54) BILLING SYSTEM

(75) Inventors: Robert M. Hardy, Carmel, IN (US); John M. Cauffman, Indianapolis, IN (US); Lynn S. Cauffman, Indianapolis, IN (US); Robert C. Lovell, Jr., Greenwood, IN (US); Murray B. Frazier, Indianapolis, IN (US); Michael L. Johnson, Indianapolis, IN (US); James W. Dohrenwend, Jr., Indianapolis, IN (US)

(73) Assignee: Centillion Data Systems, LLC, Wilmington, DE (US)

Reexamination Request:
No. 90/007,533, May 5, 2005

Reexamination Certificate for:
Patent No.: 5,287,270
Issued: Feb. 15, 1994
Appl. No.: 07/984,374
Filed: Dec. 2, 1992

Certificate of Correction issued Jun. 6, 1995.

Related U.S. Application Data

(63) Continuation of application No. 07/393,699, filed on Aug. 14, 1989, now abandoned.

(51) Int. Cl.
*G07F 19/00* (2006.01)
*H04M 15/00* (2006.01)

(52) U.S. Cl. .......................... 705/34; 705/417; 705/418
(58) Field of Classification Search .................. None
See application file for complete search history.

(56) References Cited

U.S. PATENT DOCUMENTS

| | | | |
|---|---|---|---|
| 4,028,733 A | 6/1977 | Ulicki | |
| 4,159,468 A | 6/1979 | Barnes et al. | |
| 4,306,219 A | 12/1981 | Main et al. | |
| 4,336,589 A | 6/1982 | Smith et al. | |
| 4,366,481 A | 12/1982 | Main et al. | |
| RE31,182 E | 3/1983 | Crager et al. | |
| 4,468,655 A | 8/1984 | Iwata | |

(Continued)

FOREIGN PATENT DOCUMENTS

DE 3534954 4/1986

OTHER PUBLICATIONS

Brown, Bob. TI, SW Bell unite in EDI billing trial. Network World. Jun. 20, 1988.*

Tanenbaum, Structured Computer Organization, 1970, cover, copyright page, pp. 18–20 and 33.*

(Continued)

*Primary Examiner*—Beverly M. Flanagan

(57) ABSTRACT

Telecommunications or similar bills are prepared on diskette in an optimal format for further processing, display, and analysis on popularly-available, inexpensive personal computers. A telecommunications carrier provides, for participating customers, appropriately selected billing records at the stage in the carrier's ordinary billing process after the carrier has completed all billing activities except actually printing a paper bill. This ensures that the information ultimately supplied on diskette will exactly correspond to that on the paper bill. In a first step, preferably performed on a large computer, the records are sorted, edited and reformatted into an optimal organization for further processing on a personal computer. In addition, a variety of preprocessed summary reports and graphs are prepared for rapid retrieval on the customer's computer. In a second step, preferably performed on a network of smaller computers, the reorganized records and summary reports for each customer are separated, compressed, and recorded on diskettes compatible with each customer's personal computer. A user application program on the customer's computer displays and analyzes the billing information supplied on diskette, including the billing records, preprocessed summary reports and graphs, and prepares new summary reports on demand.

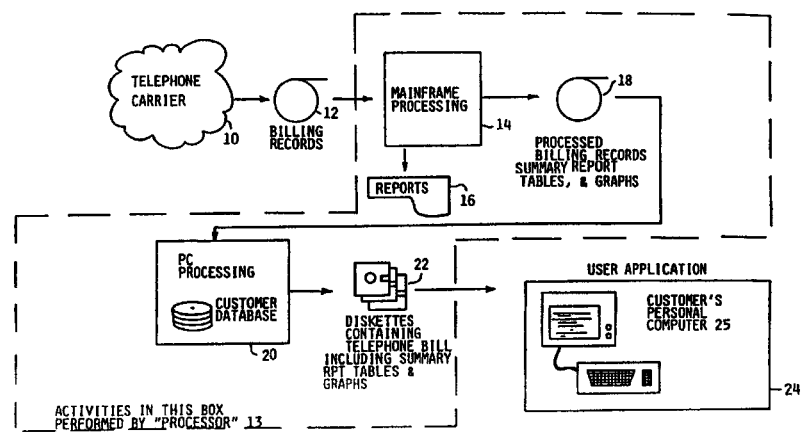

U.S. PATENT DOCUMENTS

| | | | |
|---|---|---|---|
| 4,476,528 | A | 10/1984 | Matsumoto et al. |
| 4,491,725 | A | 1/1985 | Pritchard |
| 4,511,793 | A | 4/1985 | Racanelli |
| 4,523,330 | A | 6/1985 | Cain |
| 4,525,601 | A | 6/1985 | Barnich et al. |
| 4,585,904 | A | 4/1986 | Mincone et al. |
| 4,611,277 | A | 9/1986 | Kemppainen et al. |
| 4,631,666 | A | 12/1986 | Harris et al. |
| 4,634,809 | A | 1/1987 | Paulsson et al. |
| 4,634,845 | A | 1/1987 | Hale et al. |
| 4,642,767 | A | 2/1987 | Lerner |
| 4,652,940 | A | 3/1987 | Sumiyoshi |
| 4,656,656 | A | 4/1987 | Mundy, Jr. et al. |
| 4,689,478 | A | 8/1987 | Hale et al. |
| 4,713,837 | A | 12/1987 | Gordon |
| 4,737,911 | A | 4/1988 | Freeman, Jr. |
| 4,739,509 | A | 4/1988 | Bourg |
| 4,750,201 | A | 6/1988 | Hodgson |
| 4,751,728 | A | 6/1988 | Treat |
| 4,757,267 | A | 7/1988 | Riskin |
| 4,774,664 | A | 9/1988 | Campbell et al. |
| 4,776,004 | A | 10/1988 | Bauer et al. |
| 4,788,718 | A | 11/1988 | McNabb et al. |
| 4,796,180 | A | 1/1989 | Riley |
| 4,799,156 | A | 1/1989 | Shavit et al. |
| 4,813,065 | A | 3/1989 | Segala |
| 4,851,999 | A | 7/1989 | Moriyama |
| 4,858,121 | A | 8/1989 | Barber et al. |
| 4,883,948 | A | 11/1989 | Sunyich |
| 4,906,826 | A | 3/1990 | Spencer |
| 4,914,587 | A | 4/1990 | Clouse |
| 4,926,256 | A | 5/1990 | Nanba |
| 4,928,168 | A | 5/1990 | Iwashita |
| 4,935,956 | A | 6/1990 | Hellwarth et al. |
| 4,979,207 | A | 12/1990 | Baum et al. |
| 5,007,084 | A | 4/1991 | Materna et al. |
| 5,008,929 | A | 4/1991 | Olsen et al. |
| B14,757,267 | A | 5/1991 | Riskin |
| 5,027,388 | A | 6/1991 | Bradshaw et al. |
| 5,047,928 | A | 9/1991 | Wiedemer |
| 5,054,096 | A | 10/1991 | Beizer |
| 5,103,475 | A | 4/1992 | Shuen |
| 5,134,564 | A | 7/1992 | Dunn et al. |
| 5,146,344 | A | 9/1992 | Bennett et al. |
| 5,146,590 | A | 9/1992 | Lorie et al. |
| 5,148,472 | A | 9/1992 | Freese et al. |
| 5,198,975 | A | 3/1993 | Baker et al. |
| 5,218,632 | A | 6/1993 | Cool |
| 5,287,444 | A | 2/1994 | Enescu et al. |
| 5,418,942 | A | 5/1995 | Krawchuk et al. |
| 5,473,739 | A | 12/1995 | Hsu |

OTHER PUBLICATIONS

Frontier Corporation, Defendant's Supplemental Answers to Plaintiff's Interrogatory Nos. 3 and 4 and Second Supplemental Answer to Plaintiff's Interrogatory No. 6, Dec. 19, 2001, Civil Action No. IP98–1748–C–Y/F, U.S. District Court for the Southern District of Indiana, Indianapolis Division.

Vonarx, Mark, "Call Controllers Extend Life of Older Phone Systems", Telephone Engineer & Management, Dec. 1, 1987, pp. cover, 72, 77, vol. 91, No. 23, HBJ Publication.

Brown, Jim, "MBG bill analysis software isolates Tariff 12 glitches; Pack shaves $250,000 from Ford's Tariff 12 bill," Network World, Inc., Sep. 4, 1989, pp. 11–12 (2 pages), Network World, Inc., Dearborn, Michigan.

Computerworld, Inc., Call–monitoring software slashes city's telephone bills, Computerworld, Inc., Communications, Mar. 11, 1985, pp. 99–100 (2 pages), Fort Collins, Colo.

Telephone Engineer & Management, How To Control Phone Costs With an IBM PC, Apr. 15, 1984, pp. 78–79.

Summa Four, Inc., Press Release for the MAXX 5000, NDN No. 022–0009–1362–8, May 20, 1988, Dateline, Manchester, NH.

Coates, Richard E. et al. The Personal Computer Oceanographic Database (PCOD) For ARGOS PTT Data Management, Oceans 87 Proceedings—The Ocean—An International Workplace, Sep. 28–Oct. 1, 1987, pp. 1074–1078.

Telecommunication Products + Technology, Remote operators gain access to statewide records, Jan. 1986, pp. 65–66.

Finke, Wolfgang F., Individual (PC) Data Processing and Mainframe Data Banks—Application Design with Integrated PC–Software Systems, Main Frame Data Banks, and Standard Communication Programs, Mar. 1986, pp. 101–109.

Cantillon, W M A et al, Operating with ACRE, PO Telecommunications Journal, Winter 1979/80, pp. 29–31.

Ferguson, Thomas E., When is a telephone company not a telephone company? Telephony, Jun. 15, 1981, pp. 26–28.

Atlas, Michael, Call Detail Recording: Tracing Its Evolution from Its Beginning in Early 1970s through Today, Telephony—Communications News, Jun. 1987 v24 n6, pp. 54–56 (3 pages).

Robards, Michael, et al, ACRE: a real–time distributed system, Microprocessors and Microsystems, vol. 2, No. 4, Aug. 1978, pp. 195–203.

Telephony, Little ACRE means big savings for the British Post Office, Aug. 27, 1979, pp. 118 and 120–121.

Electronics Weekly, Exchequer comes to Telcoms Management, Mar. 20, 1985, No. 1259, cover and p. 43.

Middle East Electronics, Call detail recording system bills telephone users in Riyadh hotel, Oct. 1982, p. 21.

Trimble, Nancy, Dialing the right call–accounting combination, Telecommunication Products + Technology, Nov. 1985, pp. 68–70, 72, 74.

Schwartz, M.S., Communications Between Local Area Networks and Mainframes in the Texas Department of Human Services Welnet Netowrk, $12^{th}$ Conference on Local Computer Networks, Oct. 5, 1987, pp. 181–190.

Perakis, James A., FE Manual for the Practical Executive, Consolidation Software, Sep. 1986, pp. 31–32.

Walsh, Myles et al, Downloading: Data Center Mainframe to PC's In The Real World, Journal of Systems Management, Aug. 1986, pp. 24–29.

Anderson, Kevin et al., Micro–Mainframe Link Options, Journal of Accounting and EDP, Summer 1987, pp. 64–66.

Stallard, Jim et al., Opening doors with micors: Transamerica Insurance Group, Best's Review—Property Casualty Insurance Edition, vol. 88, No 7, pp. 67–68 (4 pages), Nov. 1987.

Lehman, Dr. John A., Microcomputer Use of Mainframe Databases, Journal of Systems Management, Jan. 1986, pp. 18–22.

Quarmby, Chris, Can your PC communicate with the data base? Accountancy, Feb. 1986, pp. 118–119.

Frantz, John A. et al, An Interface to Distribute Hospital Registration Data, Computer Applications In Medical Care, IEEE Oct. 30, 1982, pp. 920–922.

Kirby, J. David et al, Distributed Processing with a Mainframe–Based Hospital Information System: A Generalized Solution, Symposium On Computer Applications In Medical Care, 1987, pp. 764–770.

Blumenthal, Lee et al, The Use of a Microcomputer as a Front and Processor for Database Management Systems on Large Computers, Computer Applications in Medical Care, IEEE, 1981, pp. 303–306.

Lowe, Henry J., M.D. et al, Remote Access MicroMesh: A microcomputer system for searching the Medline database, Symposium on Computer Applications in Medical Care, Nov. 6, 1988, pp. 535–539.

On–Line Reports, Exploring a New System—A System for Information, Best's Review, pp. 10, 116.

Saltsman, Tom et al, Interfacing the Microcomputer and the Mainframe to Support Visit—Revisit Comparison of Medical Records, and Computer Applications in Medical Care, University of Michigan Hospital, IEEE, 1982, p. 919, Ann Arbor, Michigan.

Cain, M. et al, The Development of Word Processor—Mainframe Computer Interaction, Application in Medical Care, IEEE, 1983, pp. 878–881, Denver, Colorado.

Goldstein, Robert B. et al, Automatic Transmission and Capture of Medical Data From a Mumps System to a RSTS System, Computer Applications in Medical Care, IEEE, 1983, pp. 875–877.

Thompson, N. Joe, Networking Computers: Some Practical Applications, Computer Applications in Medical Care, pp. 872–874, N.C.

Padilla, William J. et al, Mainframe Augmentation with Personal Computers, Computer Applications in Medical Care, 1984, pp. 786–792.

Tolchin, Stephen G. et al, Integrating Heterogenous Systems Using Local Network Technologies and Remote Procedure Called Protocols, Computer Applications in Medical Care, IEEE, 1985, pp. 748–749.

Rosenthal, L. H. et al, DAS II: A Microprocessor–Based Toll Ticketing and Traffic Analysis for the Motorola Pulsar Mobile Telephone Control Terminal, pp. 27–21 to 27–26.

Hagen, J.W., A VHF Radio System for Providing Telephone Subscriber Service in Difficult Access Rural Areas, pp. 27–27 to 27–32.

Harris, Greg, The PC–to–mainframe connection, Information Systems, Healthcare Financial Management, Sep. 1986, pp. 2 and 126.

Brown, Bob et al, AT&T embraces new standard for EDI billing, 1991 Network World, Sep. 23, 1991, p. 7 (2 pages) Basking Ridge, N.J.

Wallace, Bob, AT&T offers EDI billing, new net control services; Unveils Accumaster Net Management Services, 1989 Network World, Sep. 25, 1989, p. 2 (3 pages), Basking Ridge, N.J.

Computerworld, Inc., AT&T call tracking system bow, New Products, Nov. 18, 1985, p. 111.

Network World, Carrier Watch., Oct. 1, 1990, p. 13.

Briere, Daniel, Call detail options help users monitor net traffic, Network World, Inc., May 14, 1990, p. 1 (9 pages).

Dix, John, Belt–tightening time at AT&T, Computerworld., Mar. 11, 1985, pp. 99–100 (2 pages).

Vranizan, Michelle, Pacific Bell to put bills on computer disk, The Orange County Register, Oct. 9, 1990, p. D2 (2 pages).

Lazzareschi, Carla, Pacbell to Put Phone Bills on PC Diskettes: Pacific Bell: To send corporate customers phone bills on personal computer diskette, Los Angeles Times, Nov. 15, 1990, p. D1, Col. 6(2 pages).

Briere, Daniel, WATS the word?, Network World, Inc., Feb. 5, 1990, p. 80 (1 page).

The Tribune, Phones Get Floppy; Pacific Bell bills on computer disks, Oct. 4, 1990, pp. cover, E1, E6.

Bushaus, Dawn, Communications Week, EDI Billing Standard, May 13, 1991, p. 35.

Executive Extension, Inc.'s Supplemental Responses and Objections to Interrogatory Nos. 5, 6, 7, 8, 9, and 10 of Plaintiff Centillion Data Systems, Inc.'s First Set of Interrogatories.

Bond, George, A Database Catalog, BYTE, Oct. 1984, pp. 3, 227–238.

Carpenter, James et al, Statistical Software for Microcomputers, BYTE, Apr. 1984, pp. cover, 137, 234–236, 252, 254, 258, 260, 262, 264, vol. 9, No. 4, McGraw–Hill, Inc.

DeMaria, Rusel, Paradox 1.1, BYTE, Sep. 1986, vol. 11, No. 9, pp. cover, p. 2, 303–304, 306, 308.

Desmarais, Norman, Laser Libraries, BYTE, May 1986, vol. 11, No. 5, pp. cover, 235.

Gane, Chris et al, Structured Systems Analysis: Tools and Techniques, Improved Systems Technologies, Inc., 1979, pp. cover, iv–ix (u pages), Prentice–Hall, Inc., Englewood Cliffs, New Jersey.

Harkness, Richard, FilePro 16 and File Pro 16 Plus, BYTE, Nov. 1986, vol. 11, No. 12, pp. cover, 297–299.

Hendley, Tony, CD–ROM and Optical Publishing Systems, 1987, cover, copyright page, Table of Contents (4 pages), Meckler Publishing Corp. in association with Cimtech/BNBRF, Hatfield, Herts, U.K.

Jacques, Jeffrey M., SPSS/PC+, A high–quality analytical and statistical production tool, BYTE, Nov. 1986, pp. cover, 3, 279–282, vol. 11, No. 12, McGraw–Hill.

Knuth, Donald E., The Art of Computer Programming, vol. III, Sorting and Searching, 1973, Cover an Table of Contents (5 pages), Addison–Wesley Publishing Co., Philippines.

Kruglinski, David, Update on Six Database Managers, BYTE: Guide to the IBM PC, Fall 1984, vol. 9, No. 9, pp. cover, 4, 187–196, McGraw–Hill.

Petursson, Ingvar J., Automation saves the day at PacTel Cellular, Telephony, Oct. 24, 1988, pp. 5, 31, 34.

RBASE:303, Speed by Design, (www.rbase.com/support/TechDocs/303.htm) apparently 1990, Version 3.1, 2 pages.

RBASE:320,Indexes & Ihash Add Speed, (www.rbase.com/support/TechDocs/320.htm, Version 3.1, 5 pages.

RBASE:340, Printing A Bill, (www.rbase.com/support/TechDocs/340htma, Version 3.1, 3 pages.

Saffady, William, Text Storage and Retrieval Systems: A Technology Survey and Product Directory, 1989, cover, © page, Table of Contents, List of Tables, (4 pages), Meckler Corporation, Westport, CT.

Siegel, Jay, Moving Data Between PCs and Mainframes, BYTE, Guide to the IBM PC, Fall 1984, vol. 9, No. 9, pp. cover, 4, 248–255.

Tsichritzis, Dionysios C. et al, Data Models, 1982, Cover, © page, Table of Contents, v–viii) (6 pages), Prentice–Hall, Inc., Englewood Cliffs, New Jersey.

Oracle Corporation, Introduction to SQL*Forms, 1988, Cover © page, Table of Contents (also from Operator's Guide, Release Notes, Designer Reference Version 2.3, from University of Brockport, NY (23 pages).

Meckler, CD–ROMS In Print, 1991, An International Guide, 1991, Cover, , © page, Table of Contents (3 pages), Meckler Publishing, Westport, CT.

Schwerin, Julie B., Record Attendance for MicroSoft CD–Rom conference, Online Review, Jun. 1988, vol. 12, No. 3, pp. Cover, Index, 157–161.

Williams, Martha, MicroComputer Applications, CD–Rom Databases, Gateways, Front Ends, Online Review, Dec. 1988, vol. 12, No. 6, pp. Cover, , © page, Table of Contents (3 pages), Learned Information Ltd., Oxford, England.

Hawkins, Donald T., Online Information Retrieval Bibliography, Eleventh Update, MicroComputer Applications, CD–Rom Databases, Gateways, Front Ends, Supplement to Online Review, 1988, vol. 12, No. 4, cover, , © page, Table of Contents, and S36–S44 (12 pages).

Basso, Egidio et al, Remote Metering System Upgrade Improves Industrial Customer Billing, Transmission & Distribution, Apr. 1989, pp. 44–46, 48.

Graham, Brenda, Billing System Helps Goldnet strike pay did in California, Telephony, vol. 221, No. 24, Dec. 9, 1991, pp. 5, 43–44.

Duggan, Suzanne B., SMDR can be a telco's ace in the hole, Telephony, Jul. 4, 1988, pp. 5, 26–27, 30, vol. 215, No. 1.

Casner, Kenneth, Operator Services with Value Added, Telephone Engineer & Management, Apr. 1, 1988, pp. 62–63.

McHale, Daniel, PC System Series 24–Hour Center, Telephone Engineer & Management, Sep. 15, 1986, pp. 80–81.

Llana, Andres, Jr., Managing the Small System: Call Accounting in the Black, CommunicationAge, Sep. 1986, pp. cover, 55–56.

Brown, Bob et al, Big carriers do battle on billing turf, Network World, Sep. 25, 1989 at 1, vol. 6, No. 38, p. 1, 107 ff.

Weiner, Steve, Phone bill detective, Forbes, Oct. 16, 1989, pp. cover, 263–264.

Perry, William G., Jr., CD–Rom for an Accountant's PC, Financial & Accounting Systems, Summer 1991, vol. 7, No. 1, pp. index, 59–60.

Foley, Mary Jo, Disk Drives: CD–ROM Goes Mainstream, Systems Integration, Dec. 1989, pp. cover, 17–18.

Nichols Barbara J., Data entry for Multiple Center Data Banks—A Microprocessor Approach, Proceedings of the 5$^{th}$ Annual Symposium on Computer Applications in Medical Care, Nov. 1–4, 1981, pp. 307–310, Washington, D.C.

Sociometrics Corporation, NATASHA: National Archive on Sexuality, Health & Adolescence, User's Manual, 1988, Sociometrics Corporation, Palo Alto, CA., cover, , © page, and Table of Contents (5 pages).

Pitta, Julie, Where Lisp slipped, Forbes, Inc., Oct. 16, 1989, p. 262 (2 pages).

Taff, Anita, U.S. Sprint offers PC–based billing control system, Network World, Aug. 21, 1989, vol. 6, No. 33, pp. 4, 7.

Lotus; Intel; Microsoft, *Lotus®/Intel®/Microsoft® Expanded Memory Specification*, Version 4.0 300275–005, Oct. 1987, Lotus Development Corporation, Intel Corporation, Microsoft Corporation, printed from http://faq.qbasicnews.com/?blast=EmsMemorySpecification.

Best's Rev., Exploring a New System—A Search for Information, Aug. 1987, vol. 88, No. 4, pp. cover, 10, 119.

Hall, Richard, L., Maintaining the Home Field Advantage, Best's Rev., Aug. 1987, pp. cover, 2, 115–117.

Walker, James W., Knowledgeman, BYTE, Feb. 1984, vol. 9, No. 2, p. 267.

Stoffels, Bob, Bills on disks, Telephone Engineering & Management, Aug. 1, 1992, vol. 96, No. 15, pp. cover, 14.

Cooke, Lawrence H., *PCs are better than "dumbles"*, ABA Banking Journal, Oct. 1986, p. 20 (2 pages).

Abbott, Jack L., Database Management with Ashton–Tate's dBASE II, BYTE, Jul. 1982, pp. 3, 4, 412–416.

Barley, Kathryn S. et al, A Survey of Data–Base Management Systems for Microcomputers, BYTE, Nov. 1981, p. cover, 3, 4, 208, 210, 212, 214, 218–220, 222, 224, 226, 228, 230, 232, 234.

Wallace, Bob, US Sprint boosts billing features in its FON-View; Also discusses new plans for EDI billing of users, Network World, Inc., Dec. 9, 1991, p. 11.

Perakis, James A., Consolidation Software: It's More Than Just a New Method to Get Through Another Closing Cycle, FE: The Magazine for Financial Executives; Sep. 1986, cover, index, pp. cover, Index, 31–32.

Computergram International, Minigrams, Oct. 4, 1989, pp. CGi0040023 (4 pages).

Borland International, Paradox Relational Database Version 3.5, Personal Programmer Guide, 1985, 1990, cover, , © page, Table of Contents, Borland International, Scotts Valley, CA (4 pages).

Green, Timothy J., Optical Disks: An OA Storage Alternative, Words, Aug./Sep. 1986, pp. 34–35, 47, Words.

Newsbytes News Network, Cable & Wireless improves electronic billing—launches E–BIS service, Nov. 26, 1991, © 1991, 204, 1 page.

Joneleit, Peter, Signaling System 7 rescues antiquated billing system, Telephony, Dec. 2, 1991, pp. 5, 32, 34, 36. vol. 221, No. 23.

Wallace, Bob, Users, telcos ready EDI spec for phone bills, Network World, Inc., Sep. 24, 1990, p. 10 (2 pages).

Borland International, Paradox, Relational Database Version 3.5, User's Guide, 1985, 1990, Cover and Table of Contents (10 pages), Borland International, Scotts Valley, CA.

Clarke, Ann, The British Library's Compact Disc Experiment, 1986, pp. Cover, pp. ii, iv–vi, 1–12, Appendix I–V (53 pages), The British Library Board, Wetherby, Yorkshire, UK.

Oracle, SQL*Plus Reference Guide, Version 2.0, 1986, 1987, Revision History, Preface, Table of Contents, PN 3203–V2.0, Oracle Corporation, Belmont, CA (8 pages).

Micro Data Base Systems, Inc., KnowledgeMan User's Guide, The Universal Knowledge Management System, Jun. 1988, Verson 2.5, MDBS, Cover, pp. 1–3 and Table of Contents (v–xii) (10 pages), MDBS, Inc., Lafayette, Indiana.

Micro Data Base Systems, Inc., KnowledgeMan Reference Manual, The Universal Knowledge Management System, Nov. 1987, Version 2.01, pp. 1–2, MDBS, Inc., Layfayette, Indiana.

Mead Data Central, Inc., Lexis, Billing your clients for Lexis research just got easier . . . , 1988, 2 pp.

Mead Data Central, Inc.. Lexis, Payback™ Weekly Billing Information Service Customers's Guide, Jun. 1988.

Mead Data Central, Inc., Payback Monthly Tape Service Programmer's Guide, Verison 3.0.

British Library, Communications Educational Courses, The 1988 Conference on Telecommunications Billing and Charging, The Mercury System.

Froehlich, Ronald E. Proceedings of the Communications Forum, vol. XXXXII, Book I, Oct. 3, 4, and 5, 1988, Billing Data, pp. cover, vi–viii, 739–741.

Mazzola, Daniel, CTE Automatic Electric, Inc., GTE Automatic Electric World–Wide Communications Journal, vol. 21, No. 1, Jun. 23, 1983, Contents, pp. 45–50.

AT&T Corp., AT&T Corp's Final Witness List, Exhibit List and Contentions, *Centillion Data Systems, Inc. v. AT&T Corp.*, (S.D. Ind., served—Dec. 23, 1997, Civil Action No. IP96–0394–C–B/S).

Marlia Norusis, SPSS/PC+™V2.0 Base Manual © 1988, SPSS Inc., 1709 pages, Bates Nos. CONV 164802–166510.

Garavalia, Ronald, Usage Sensitive Service: Background and Benefits, GTE Automatic Electric World–Wide Communications Journal, 1983, pp. 41–44, GTE Automatic Electric Incorporated, Northlake, Illinois, USA (QCC–569499–569503).

Mazzola, Daniel, An Integrated System Approach for Usage Sensitive Service, GTE Automatic Electric World–Wide Communications Journal, 1983, pp. 45–50, GTE Automatic Electric Incorporated, Northlake, Illinois, USA (QCC–569504–569509).

Crabbe, Edwin, DMTM: A Data Management and Transmission Module, GTE Automatic Electric World–Wide Communications Journal, 1983, pp. 51–56, GTE Automatic Electric Incorporated, Northlake, Illinois, USA (QCC–569510–569515).

Bible, William, Continued Support for Stored Program Control Systems, GTE Automatic Electric World–Wide Communications Journal, 1983, pp. 57–60, GTE Automatic Electric Incorporated, Northlake, Illinois, USA (QCC–569516–569519).

Karl, Maryellen, Case History: Lincoln Telephone and Telegraph, GTE Automatic Electric World–Wide Communications Journal, 1983, pp. 61–64, GTE Automatic Electric Incorporated, Northlake, Illinois, USA (QCC–569520–569523).

Technical Innovation: More Than Just Patents—An Interview with Peter Xiarhos, GTE Automatic Electric World–Wide Communications Journal, 1983, pp. 65–67, Automatic Electric Incorporated, Northlake, Illinois, USA (QCC–569524–569526).

Custom Billing Disk Online User Manual, Pacific Bell, © 1994 (QCC–615252–QCC–615322).

Customized Billing Custom Billing Disk, Pacific Bell, Dec. 15, 1990 (QCC–615323–QCC–615337).

Station Message Detail Recording to Premises (SMDR–P) out of the DMS–100 Central Office Environment, Pacific Bell, Feb. 1, 1989 (QCC–615338–QCC–615384).

Draft Station Message Detail Recording to Premises (SMDR–P) out of the DMS–100 Central Office Environment, Pacific Bell, Dec. 1, 1988 (QCC–615385–QCC–615432).

Network Operations Systems Business Network Management SMDR Interface Specification, Northern Telecom, Mar. 1991, © 1989 Northern Telecom (QCC–615433–QCC–615498).

AT&T Reproduced Message Detail Version 2.0, Nov. 1990 (QCC–615499–QCC–615559).

Xiox Call Accounting Series Professional Software Version 3.3 User's Manual, Xiox Corporation, © 1983–88, 1989 (QCC–615560–QCC–615893).

Xiox Large Business Series Feature Package A Call Accounting System Version 3.10 User's Manual Revision 1.1, Xiox Corporation, Jan. 1, 1988 (QCC–615894–QCC–616250).

Xiox Resale and Billback Series Feature Package B Call Accounting System Version 2.00 User's Manual Revision 2.0, Xiox Corporation, Jan. 1, 1987 (QCC–616251–QCC–616602).

Xiox Call Accounting Series General Business & Professional Software Version 3.5 User's Manual, Xiox Corporation, © 1990 (QCC–6166–3–QCC–617029).

Mead Data Central, Inc., Payback™ Order Form (one page) (LexisNexis 0001).

Notes on Payback The Lexis/Nexis Billing Information Services, four pages (Mar. 1989) (LexisNexis 0002–0005).

Mead Data Central, Payback A Lexis Billing Information Service, 147 pages (Feb. 1989) (LexisNexis 0015–0160).

Mead Data Central, Inc., Payback Weekly Billing Information Service Customer's Guide Version 2.0, 70 pages (Mar. 1989) (LexisNexis 0161–0228).

Richard G. Brutocao, "Telemanagement brings clarity to complex communications environments", Computers in Banking, vol. 6, No. 12, p. S10, Dec. 1989, 3 pages.

Roger Benyon et al., "Emerging computer–telecommunication solutions for growing corporations", Goldhirsh Group, Inc. vol. 7, p. 91, Feb. 1985, 9 pages.

Pam Powers, "Utility firm pushes telcos to bill via EDI; Georgia Power Co. seeks electronic invoicing arrangement with local, long–distance carriers", Network World, Top News Section, p. 1, Jun. 6, 1988, 2 pages.

Jim Brown, "VMX, OPCOM introduce voice–messaging products Newlywed firms use ICA show to unveil wares", Network World, Telecommunications Section, p. 12, May 30, 1988, 2 Pages.

Tony Pompili, Defense; PC Week, vol. 4, No. 28, p. C8, Jul. 14, 1987, 3 pages.

Bob Wallace, "Digilog unwraps its first telemanagement system", Network World, Telecommuniations Section, p. 11, Dec. 11, 1989, 2 pages.

"Product Preview Sneak a peek at equipment slated for 1990," Public Communications Manual, pp. 14 & 47, Dec. 1989.

Qwest Communications International Inc.'s Sixth Supplemental Responses to Plaintiff's First Set of Interrogatories to Defendants Qwest Communications International, Inc. and Qwest Corporation, Case No. 1:04–CV–00073–LJM–WTL, Mar. 16, 2007, pp. 1, 6–8, 23 (redacted).

"Phones are facilities, too," PC Week, vol. 5, No. 45, Nov. 7, 1988, p. 44, 1 page.

Vendors make push for medical mkt., Computer and Software News, vol. 6, No. 31, Aug. 1, 1988, p. 28, 4 pages.

Torrey Byles, "Shipping Agent Gears to Extend Electronic Reach", The Journal of Commerce, Electronics Section, p. 4B, Jul. 19, 1988, 2 pages.

Valeria Long, "Med Billing Service Handles Headaches", Grand Rapids Business Journal, vol. 6, No. 27, Sec. 2, Jul. 5, 1988, p. B–9, 3 pages.

Alfred Knaub, "Everyone wins with EMC: financial management", Computers in Healthcare, vol. 9, No. 7, p. 34, Jul. 1988, 3 pages.

Stephen Lilly "Health Care Firm Expands Into New York", Business First–Columbus, Vo. 4, No. 38, Sec. 1, p. 14, Jun. 13, 1988, 2 pages.

Torrey Byles, "Wal–mart Seeks Quick Response", Journal of Commerce, Electronics Section, p. 4B, Jun. 1, 1988, 2 pages.

Michael Fahey, "Firm blends departments; Drug company Bergen Brunswig increases its efficiency", Network World, Communications Manager Section, p. 25, Nov. 16, 1987, 2 pages.

Don Steinberg, "Avis, Hertz fire technological salvos in fight for market share", PC Week, vol. 4, No. 44, p. C1, Nov. 3, 1987, 3 pages.

Colin P. Kerr, "Building an Ambulatory Clinical Information System in a family practice residency", Journal of Family Practice, vol. 29, No. 5, p. 553, Nov. 1989, 6 pages.

Communications Daily, vol. 9, No. 178, p. 8, Sep. 14, 1989, 2 pages.

Charles Rubin "High–Speed Modems Gain Market Share; Users Benefit From Improved Error Checking and Security", Info World, Trends Section, p. 30, Aug. 5, 1985, 4 pages.

John W. Wilson, "A New Life For Hewlett–Packard's Old Mini", Business Week, Special Report, p. 106, Jul. 15, 1985, 2 pages.

Jim Murphy, "To Business Desk and Technology Editor", PR Newsire, Feb. 12, 1985, 3 pages.

M. Edwards, "Digital PBXs Zero in on the key Role as Hub of Office", Communications News, Vo. 21, No. 12, p. 44, Dec. 1984, 7 pages.

"Medic: on–line goes in–house", Chain Store Age Executive with Shopping Center Age, vol. 63, p. 128, Jan. 1987, 3 pages.

Rob Baker, "The jeans war goes electronic; Levi Strauss Data Interchange Program; T & O Operations Supplement", WWD, Vo. 153, p. 516, Nov. 13, 1986, 5 pages.

David Kull, "Good things in small packages; Strictly Software", Compuer Decisions, vol. 17, p. 34, Sep. 24, 1985, 3 pages.

Tami Bradley, "New Computer Claims System Unveiled by Blue Cross Subsidiary", Wichita Business Journal, vol. 3, No. 41, Section 1, p. 12, Dec. 26, 1988, 2 pages.

"From the telemanagement news desk", Teleconnect, vol. 7, No. 10, p. 116, Oct. 1989, 14 pages.

Bob Wallace, "EDI hot topic among telecom companies", Network World, Telecom Trends Section, p. 15, Sep. 26, 1988, 3 pages.

Leo Gotlieb, "Report on Computers, Videotex Still a Solution Looking for a Problem, but Interest is Reviving", The Globe and Mail, Rob Special Report; p. C16, Mar. 13, 1989, 3 pages.

Douglas Dome,"Progressive Insurance Selects MCI for Voice and Data Network", PR Newswire, May 30, 1989, 2 pages.

Frances J. Turisco et al., Laley Clinic: implementing on order—Entry and Result–Reporting System for Cardiac Testing Using PCS/ADS . . . , Computers in Healthcare, vol. 10, No. 4, p. 27, Apr. 1989, 4 pages.

Joan Gliedman, "Products; DBMS development programs that fall outside traditional product definition", PC Week, vol. 6, No. 10, p. 113, Mar. 13, 1989, 5 pages.

Donald T. Hawkins, "In search of ideal information pricing; includes related information", Online, vol. 13, No. 2, p. 15, Mar. 1989, 14 pages.

Lee Paulus, "CYMA; Electronic media claims coming to CYMA health care software", Business Wire, Inc., Feb. 15, 1989, 1 page.

Anne Rose, "FBS and Central Banks Offers New EDI Service Through", PR Newswire, Jan. 19, 1989, 4 pages.

Bob Bledsoe, "Texas–Instmnts/sprint; (TXN) Spring to use Texas Instrument's CASE product", Business Wire, Nov. 15, 1988, 2 pages.

Bibliographical listing of "The roundup: what the makers want you to know!", Teleconnect, vol. 6, No. 6, p. 106, Jun. 1988.

Don Steinberg, "On–line claims help Maryland Blue Cross battle competition", PC Week, vol. 4, No. 22, p. C1., Jun. 2, 1987.

Qwest, Defendants' Preliminary Witness and Exhibit Lists, dated Jul. 15, 2005, filed in S.D. Ind., Case No. 1:04–CV–00073–LJM–WTL.

DMW Commercial Systems, Inc. Communications Management Software, Jul. 1987, Datapro Research Corp., Delran, N.J., 9 pp., TCOS–349–101 to TCOS–349–109 and TCOS–349–208.

Tanebaum, Andrew S., Structured Computer Organization, 1976, Prentice–Hall, Inc., Englewood Cliffs, N.J., pp. 18–20, 33.

Texas Instruments puts final touch on EDI project; Centralization of electronic data interchange operations improves company's connectivity, 1988 Network World, Aug. 4, 1988.

The Official Dictionary of Telecommunicatons, Networking and the Internet, $17^{th}$ Updated and Expanded Edition, Harry Newton, Call Delay / Call Pickup Service, p. 117.

Telco billing via EDI gains momentum, The World's Knowledge, www.bl.uk.

Amadeo, J'Aime, Oracle Application Tools for MS–DOG: Getting Started, Version 5.1B, 1988 Oracle Corp. PN 5054–V5, 1B.

DCA, IRMAACOM/3270B Preliminary User's Manual, 1988 Digital Communications Associated, Inc., Apharetta, GA.

MOBS, The Knowledgeman User's Guide; Jul. 1985, Version 2.

Moran, Rita; Dimick, Shelley, SQL Loader User's Guide, Version 1.0 1986, Jun. 13, 1987, 1987 Oracle Corp., Belmont, CA.

World Bank, Social Indicators of Development 1989; Data on Diskette with STARS Retrieval System User's Guide, $1^{st}$ printing Jun. 1990. The International Bank for Reconstruction and Development/The World Bank, Washington, DC.

Oracle, RDBMS for MS–DOS Getting Started 1877.

Oracle, Introduction to SQL*ReportWriter, 1988.

DCA, IRMAcom/327OB: Preliminary User's Manual, 1988.

Spitzer, Suzanne M., Micros/Technology, Journal of Accountancy, Sep. 1990, at 123.

Harmer, Stewart and Carter, Robert, Mainframe Plus Micros.

Urness, Kent; On–Line Underwriter, Best's Review, May 1987 at 32.

Unified Billing Systems Call Processing System.

Daniel Briere and Chris Finn, Footing the Bill, Network World, May 25, 1992.

Bob Wallace, AT&T to Introduce Billing Package at ICA ComNet '93, Networld World, May 17, 1993, pp. 2 and 75.

BellSouth: Unveils Diskette Analyzer Bill Service from Telephone Engineer & Management, Aug. 1, 1992, p. 14.

Telephone Bill Management Software Simplifies Bill PAMNG and Budgeting for Multi–Site Businesses from News Release, Mar. 30, 1992, p. 1.

Microtel Unveils LaserExpress USA (SM) from News Release, Oct. 9, 1986, p. 11.

Summa Prophet—Telephone Management Systems.

Summa Software Series Pricing Guide effective Jun. 1, 1990.

Williams, Martha, "MicroComputer Applications, CD–Rom Databases, Gateways Front Ends," Online Review, 1988 Supplement vol. 12, No. 4.

Press Release for MAXX 5000 Apr. 10, 1988 NERAC Document NDN 109–0016–8517–2.

Nigel Dedross, "The Mercury System," The 1988 Conference on Telecommunications Billing and Charging, 1988 (QCC–569459–QCC–569473).

Bernard F. Sergesketter, "Proceedings of the National Communications Forum," National Engineering Consortium, Inc., Oct. 1988 (QCC–569474–QCC–569479).

Maryellen T. Kari, "An Integrated System Approach for Usage Sensitive Service," GTE Automatic Electric World–Wide Communications Journal, Second Quarter 1983 (QCC–569482–QCC–569488).

DMW Commercial Systems, Inc. Communications Management Software, Jul. 1987, Datapro Research Corp., Delran, N.J., 9 pp., TCOS–349–101 to TCOS–349–108 and TCOS–349–205.

TI, SW Bell unite in EDI billing trial, Network World, Jun. 20, 1988.

"Southwestern Bell Telephone Begins Trial Electronic," PR Newswire Association, Inc., Jun. 9, 1988 (QCC–569530–QCC–569531).

Pam Powers, "Utility firm pushes telcos to bill via EDI; Georgia Power Co. seeks electronic invoicing arrangement with local, long–distance carriers," Network World, Jun. 6, 1988.

Bob Wallace, "Carriers, Network Vendors Share Electronic Data Interchange Strategies at Telexpo '88 Show," Network World, Inc., Sep. 26, 1988 (QCC–569576–QCC–569531).

Bob Brown, "Telco Billing via EDI Gains Momentum," Network World, Inc., May 15, 1989 (QCC–569532–QCC–569533).

Bob Brown, "Telco Billing via EDI Gains Momentum," The British Library (QCC–569554).

"US–Sprint; US Spring Offers PC–Based Billing Information System," Business Wire, Inc., Aug. 14, 1989 (QCC 569534–QCC–569535).

Bob Brown, "Texas Instruments Puts Final Touch on EDI Project; Centralization of Electronic Data Interchange Operations Improves Company's Connectivity," Network World, Inc. Apr. 4, 1988 (QCC–569547–QCC–569548).

Harry Newton, "Call Delay / Call Pickup Service," The Official Dictionary of Telecommunications, Networking and the Internet (QCC–589549–QCC–569550).

Qwest Communications International Inc.'s Fourth Supplemental Responses to Plaintiff's First Set of Interrogatories to Defendants Quest Communications International, Inc. and Qwest Corporation.

Griffith, Cary, Billing for Lexis Research Made Easier With Payback, Information Today, May 1989, pp. 13–15.

X12 Standards: Draft Version 2, Release 2, Electronic Data Interchange, Aug. 1988.

Southwestern Bell Telephone Begins Trial Electronic, PR Newswire, Jun. 9, 1988.

Utility firm pushes telcos to bill via EDI; Georgia Power Co. seeks electronic invoicing arrangement with local, long–distance carriers, Network World, Jun. 6, 1988.

EDI hop topic among telecom companies; Carriers, network vendors share electronic data interchange strategies at Telexpo '88 show, Network World, Sep. 26, 1988.

Telco billing via EDI gains momentum, Network World, May 15, 1989.

MAG Tape/Diskette Billing, Teleconnect Company, Inc., Nov. 5, 1987.

US Sprint offers PC–based billing information system, Business Wire, Aug. 14, 1989.

Amended Grounds of Invalidity under CPR rule 17.1(2)(a) and by Order of Judge Fysh QC dated Nov. 8, 2005, *CTI Group (Holdings) Inc.* vs. *British Telecommunications PLC*, Claim No. PAT04041, (Great Britain: Patents County Court filed Oct. 5, 2004) 5 pages.

Cincinnati Bell's Preliminary Invalidity Contentions, with Exhibit A, pp. 1–9, Exhibit 1 to Exhibit A, pp. 1–4, Exhibit B, pp. 1–9; Exhibit 1 to Exhibit B, pp 1–3, Exhibit 2 to Exhibit B, pp. 1–10 and Exhibit C, *Centillion Data Systems,* vs. *Cincinnati Bell, Inc.*, Case No. 1:05CV816; (S.D. Ohio, filed Dec. 19, 2005).

Exhibit A to Cincinnati Bell's Invalidity Contentions, pp. 1–30.

Southern Bell, CMDS System, CMDS 1 Rejected Packs/ Error Messages by Remote, Jan. 20, 1986, 1 page.

Cincinnati Bell Telephone Company, Access Service, Tariff FCC No. 35, Original pp. 211.39–211.41, $1^{st}$ Revised pp. 211.39–211.41, $2^{nd}$ Revised p. 211.41, $3^{rd}$ Revised p. 211.41, $4^{th}$ Revised p. 211.41.

Patricia Keefe, "Can you Afford to Ignore EDI?," *Computerworld*, Jan. 6, 1988, p. 39, Computerworld, Framingham, Massachusetts. Bates numbered QCC–3329087 to QCC–3329092.

Pam Powers, "Coalition to push use of Telecom EDI," *Network World*, Jun. 6, 1988, p. 4, Network World, United States, Bates numbered QCC–3329093.

John Dix, "PBX Advances; System Reaps Call Detail Data," *Network World*, Jun. 23, 1986, p. 11, Network World, Ann Arbor, Michigan. Bates numbered QCC–3329094 to QCC–3329095.

Don Crabb, "Relational*H*I*G*H*E*N*D* Databases," *InfoWorld*, Apr. 18, 1988, p. 53, InfoWorld Media Group, United States Bates numbered QCC–3329096 to QCC–3329111.

Nynex Trace Diskette Billing System documents Bates numbered VZ CENT QWST 00001–10 and VZ CENT QWST 12–33.

Exhibit D, Claim chart regarding TI/SW Bell article combined with SPSS–X and SPSS/PC+. From Qwest Corporation's Fourteenth Supplemental Responses to Plaintiff's First Set of Interrogatories to Defendants, dated Dec. 23, 2008. From *Centillion Data Systems* v. *Qwest Corporation et al.*, Case No. 1:04–cv–0073 U.S.D.C. Southern District of Indiana.

Exhibit E, Claim chart regarding DMW combined with SPSS–X and SPSS=PC+. From Qwest Corporation's Fourteenth Supplemental Responses to Plaintiff's First Set of Interrogatories to Defendants, dated Dec. 23, 2008. From *Centillion Data Systems* v. *Qwest Corporation et al.*, Case No. 1:04–cv–0073 U.S.D.C. Southern District of Indiana.

Exhibit F, Claim chart regarding U.S. Patent No. 4,858,121 combined with "Can you Afford to Ignore EDI?" From Qwest Corporation's Fourteenth Supplemental Responses to Plaintiff's First Set of Interrogatories to Defendants, dated Dec. 23, 2008. From *Centillion Data Systems* v. *Qwest Corporation et al.*, Case No. 1:04–cv–0073 U.S.D.C. Southern District of Indiana.

Exhibit G, Claim chart regarding U.S. Patent No. 4,656,656 combined with "Relational *H*I*G*H*E*N*D* Databases." From Qwest Corporation's Fourteenth Supplemental Responses to Plaintiff's First Set of Interrogatories to Defendants, dated Dec. 23, 2008. From *Centillion Data Systems* v. *Qwest Corporation et al.*, Case No. 1:04–cv–0073 U.S.D.C. Southern District of Indiana.

* cited by examiner

EX PARTE REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1–85 is confirmed.

* * * * *